United States Patent

Matsuura et al.

[11] Patent Number: 5,586,209
[45] Date of Patent: Dec. 17, 1996

[54] OPTICAL BRANCHING DEVICE

[75] Inventors: Yuji Matsuura; Eisuke Sasaoka; Hiroo Kanamori, all of Yokohama, Japan

[73] Assignee: Sumitomo Electric Industries, Ltd., Osaka, Japan

[21] Appl. No.: 333,318

[22] Filed: Nov. 1, 1994

[30]  Foreign Application Priority Data

Nov. 1, 1993 [JP] Japan .................................. 5-273288

[51] Int. Cl.$^6$ .......................................................... G02B 6/26
[52] U.S. Cl. .............................. 385/45; 385/14; 385/43; 385/132; 385/50
[58] Field of Search ............................ 385/43, 45, 132, 385/14, 48, 9, 50

[56]         References Cited

U.S. PATENT DOCUMENTS

| 4,991,926 | 2/1991 | Pavlath .................... 350/96.15 |
| 5,146,518 | 9/1992 | Mak et al. ..................... 385/14 |

FOREIGN PATENT DOCUMENTS

| 61-55612 | 3/1986 | Japan ......................... 385/45 |
| 63-246705 | 10/1988 | Japan ......................... 385/45 |
| 5-11130 | 1/1993 | Japan . |
| 6-18730 | 1/1994 | Japan . |

OTHER PUBLICATIONS

Patent Abstracts of Japan, vol. 4, No. 163 (P-36) (645) Sep. 13, 1980 & JP-A-55 110 205 (Ricoh).

Patent Abstracts of Japan, vol. 6, No. 262 (P-164) Sep. 28, 1982 & JP-A-57 157 207 (KDD).

Zirngibl et al, "Efficient 1×16 Optical Power Splitter Based on InP", Electronics Letters, vol. 28, No. 13, Jun. 18, 1992, pp. 1212–1213.

Rolland et al, "Optimization of Strongly Guiding Semiconductor Rib Waveguide Y–Junctions", IEEE Photonics Technology Letters, vol. 2, No. 6, Jun. 1990, New York, US, pp. 404–406.

*Primary Examiner*—John Ngo
*Attorney, Agent, or Firm*—Cushman Darby & Cushman, L.L.P.

[57]            ABSTRACT

An optical branching device comprising: a substrate; a first core member formed on the substrate, having a first edge face; a second core member formed on the substrate, tapering toward the first edge face of the first core member, having a second edge face facing the first edge face at a given space; and a third core member formed on the substrate, tapering toward the first edge face of the first core member, having a third edge face facing the first edge face at a given space.

11 Claims, 32 Drawing Sheets

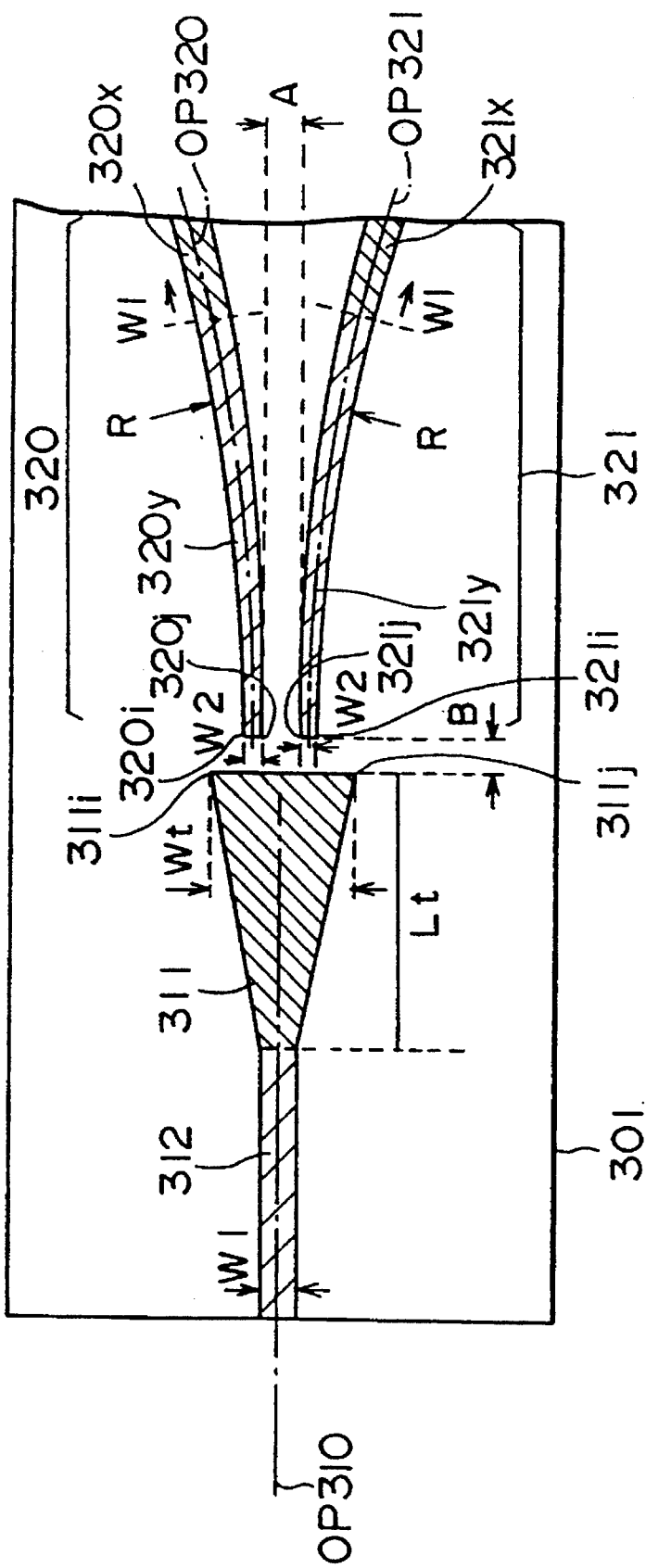

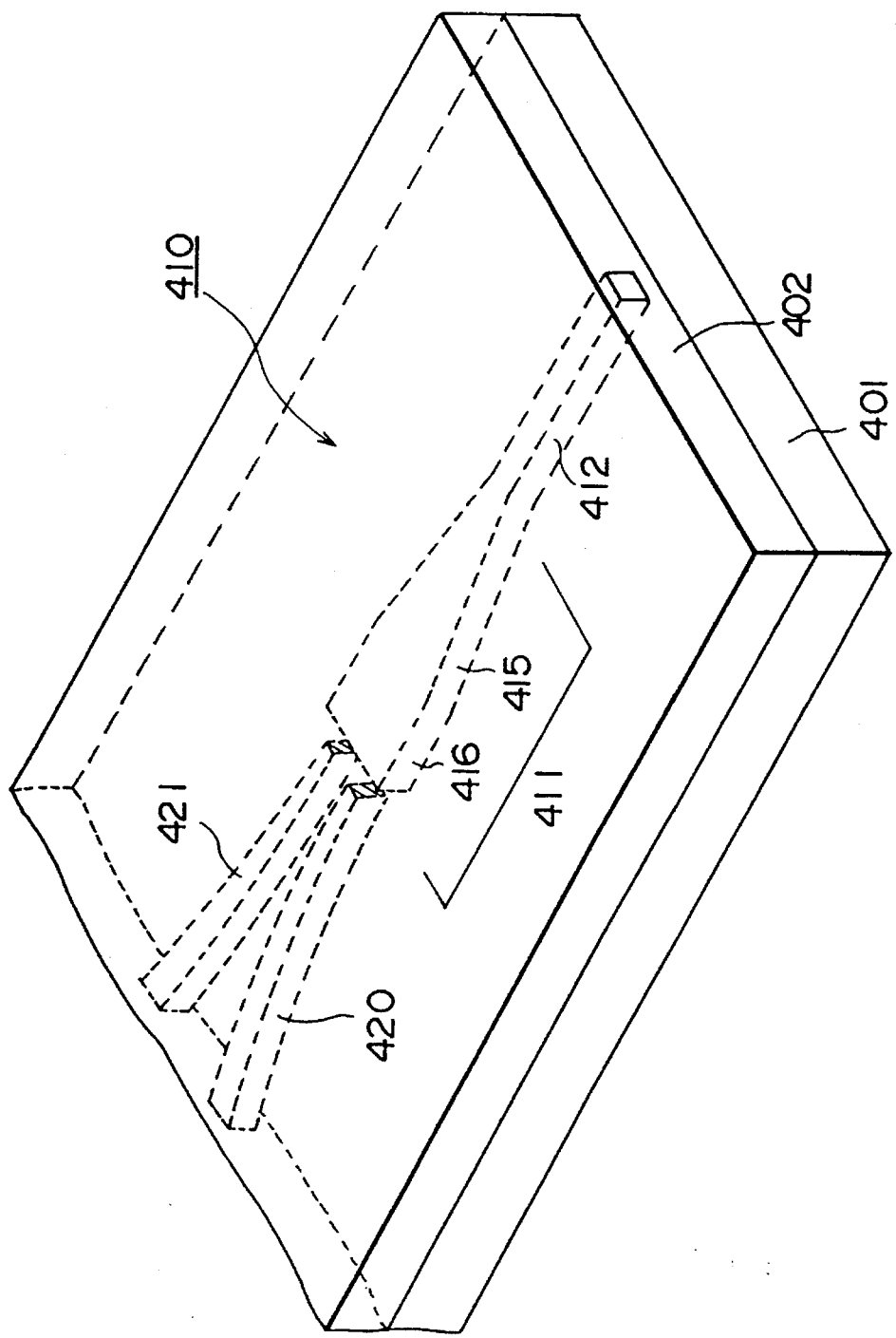

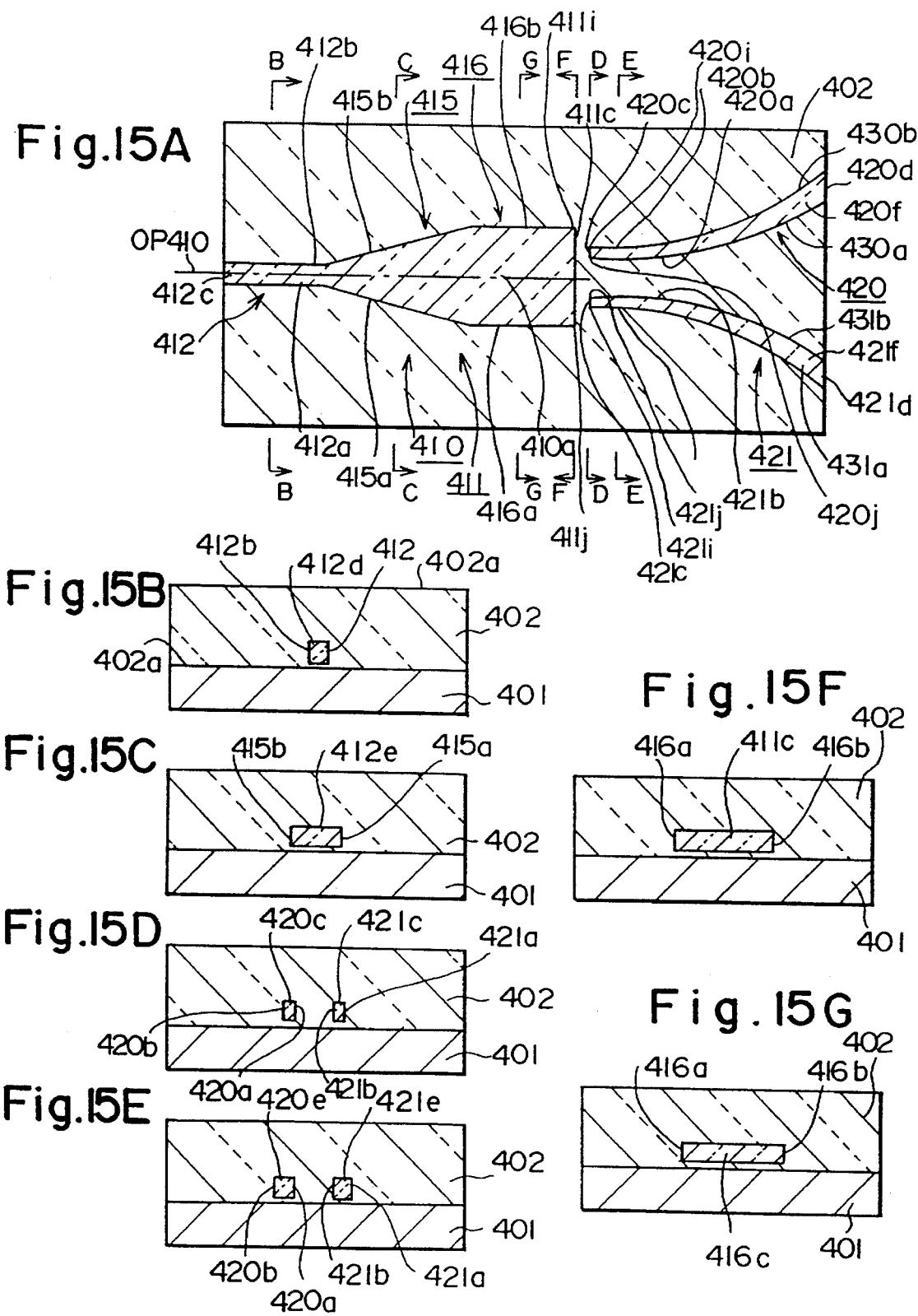

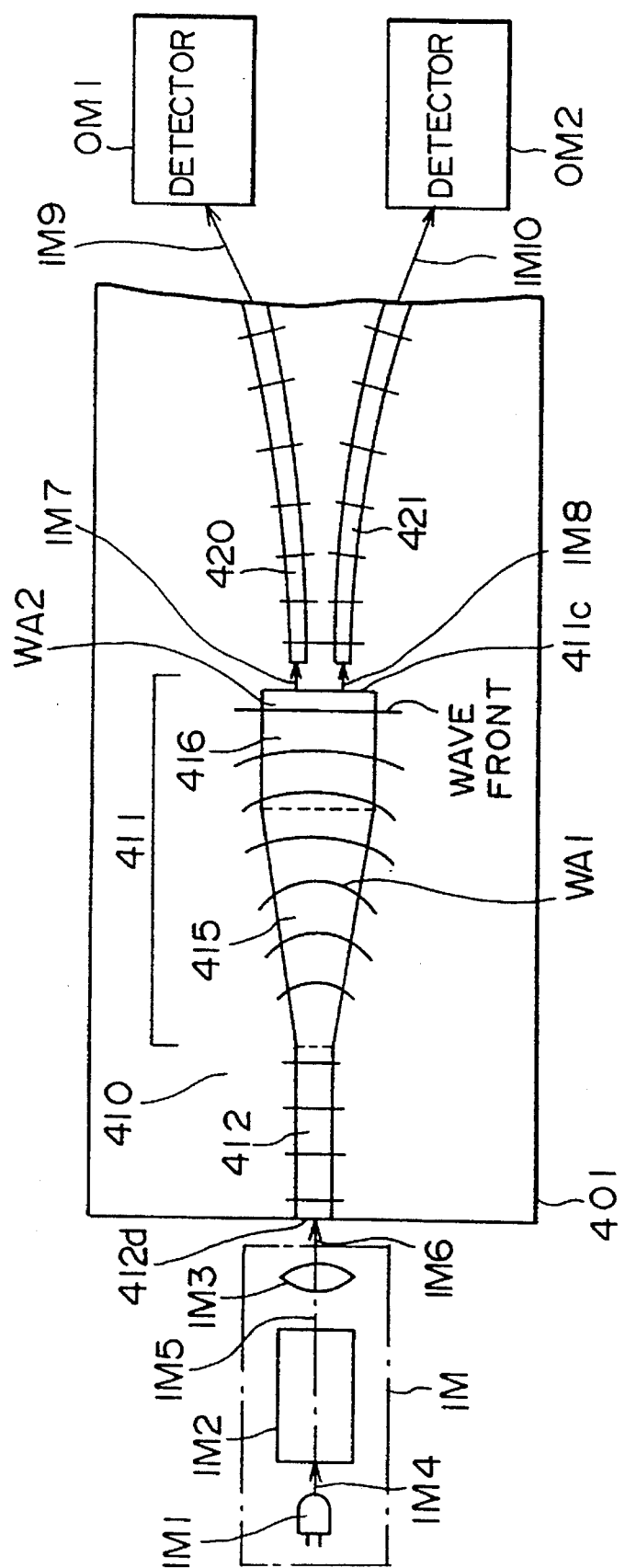

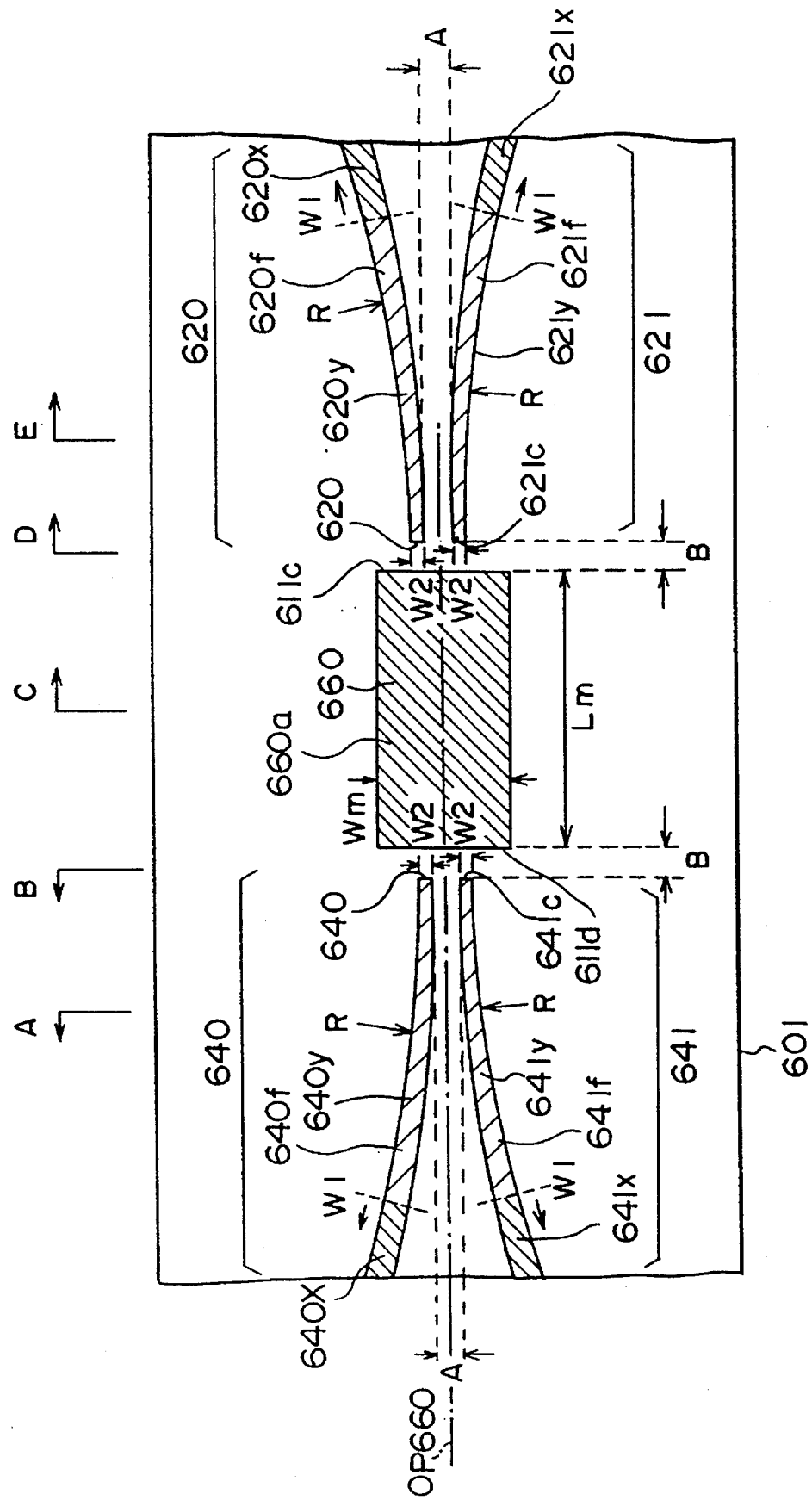

OPTICAL BRANCHING DEVICE

BACKGROUND OF THE INVENTION

1. Field of the Invention

The present invention relates to an optical component available for use in the field of optical communication, optical signal processing and the like, and particularly to an optical branching device or branch waveguide.

2. Related Background Art

In the fields of optical communication and optical signal processing, waveguide type optical branching devices are often utilized responding to demands for miniaturization of optical components. A representative optical branching device is described in Japanese Patent Application Laid-open No. HEI 5-11130 (11130/1993). Also, directional coupler is described in Journal of Lightwave Technology 10(2): 1843–1849, December 1992.

SUMMARY OF THE INVENTION

Conventional optical branching devices have no satisfactory coupling efficiency. The optical branching device of the present invention has adequate processing stability, and further offers a lowered loss at the branching section.

The optical branching device according to the present invention comprises a substrate as well as a first core member, a second core member, and a third core member.

The first core member is formed on the substrate.

The second core member is also formed on the substrate. The second core member tapers toward the first core member.

The third core member is also formed on the substrate. The third core member tapers toward the first core member. In addition, the distance between the second core member and third core member lowers toward the first core member.

In this optical branching device, the first core member is a first multimode waveguide, while the second core member is a first single mode waveguide, and the third core member is a second single mode waveguide. The first core member comprises a tapered waveguide.

The first core member may be provided with a first edge face, the second core member may be provided with a second edge face facing the first edge face at a given space, and the third core member may be provided with a third edge face facing the first edge face at a given space.

In the optical branching device of the present invention, since the widths of two single mode waveguides lower gradually in the direction from the proximal side to the multimode waveguide, the distance between the centers of the two single mode waveguides lowers accordingly. In other words, since both the second core member and third core member are tapered, if the space between the second core member and third core member is constant, the optical axis of the second core member at the second edge face, and the optical axis of the third core member at the third edge face may be situated closely.

Accordingly, at the second edge face of the second core member, the light transmitted in this second core member has an electric field distribution in the radial direction of the core. The peak position of the electric field distribution (the first peak position) corresponds to the position of the axis of the second core member. At the third edge face of the third core member, the light transmitted in this third core member has an electric field distribution in the radial direction of the core. The peak position of the electric field distribution (the second peak position) corresponds to the position of the axis of the third core member. With the first peak and the second peak situated closely, improvements are obtained in the coupling efficiency of the light transmitted between the first core member and second core member as well as in the coupling efficiency of the light transmitted between the first core member and third core member. As a result, according to the present invention, it is possible to input guided light which has been branched or coupled, with a minimum loss at the branching section.

The optical branching device according to the present invention comprises a cladding member encircling a core member(s). The cladding member comprises a first surface. The first surface is parallel to the interface between the cladding member and substrate. The refractive index difference between the cladding member and core member(s) is preferably 0.3% or more. The first core member, second core member and third core member are embedded in the cladding member.

Specifically, the first core member is provided with a first edge face, first perpendicular section, second perpendicular section and first horizontal section. The first perpendicular section is defined by intersection with the first plane perpendicular to the first surface. The second perpendicular section is defined by intersection with the second plane located between the first edge face and first plane and which is perpendicular to the first surface. The first horizontal section is defined by intersection with the third plane parallel to the first surface.

The second core member is embedded in the cladding member.

The second core member comprises a second edge face, third perpendicular section and second horizontal section. The second edge face opposes the first edge face of the first core member at a first distance. The third perpendicular section is defined by intersection with a fourth plane perpendicular to the first surface. The second horizontal section is defined by intersection with the third plane. Here, since the second core member tapers, the area of the second edge face is smaller than the area of the third perpendicular section.

The third core member is embedded in the cladding member.

The third core member comprises a third edge face, fourth perpendicular section and third horizontal section. The third edge face opposes the first edge face of the first core member at a second distance. The fourth section is defined by intersection of the third core member with a fourth plane. The third horizontal section is defined by intersection of the third core member with the third plate. As the third core member tapers, the area of the third edge face is smaller than the area of the fourth perpendicular section.

In short, an optical component comprising this type optical branching device comprises a substrate, first tapered waveguide, second waveguide, and third waveguide. The substrate comprises a substrate surface. On the substrate surface there is formed a cladding member. The substrate surface is parallel to the first surface. The first tapered waveguide is formed on the substrate surface. The first tapered waveguide comprise a fourth waveguide, and a second tapered waveguide which is contiguous with this fourth waveguide.

The fourth waveguide comprises a first edge face including a plane crossing the substrate surface, a fifth side including a plane crossing the substrate surface, and a sixth side parallel to the fifth side. The second tapered waveguide is contiguous with the fourth waveguide. The second tapered waveguide diverges toward the fourth waveguide. Specifically, the width of the second tapered waveguide increases toward the fourth waveguide. The width direction (vector W) is defined to be the direction which is perpendicular to both the direction perpendicular to the substrate (direction of the thickness of the substrate: vector T), and the direction of travel of the light propagated in the waveguide (vector L) (vector TxL: the vector product of vector T and vector L).

The second waveguide is formed on the substrate surface. The second waveguide tapers toward the first edge face. The third waveguide is formed on the substrate surface. The third waveguide tapers toward the first edge face.

Since the first tapered waveguide comprises a second tapered waveguide, and a fourth waveguide which is contiguous therewith, the area of the first edge face is larger than the area of the first perpendicular section, while the area of the second perpendicular second is equal to the area of the first section. In other words, the length of the intersection of the first horizontal section and the first edge face (Wt) is greater than the total (W1+W2+A) of the length of the intersection of the second horizontal section and second edge face (W1), length of the intersection of the third horizontal section and third edge face (W2), and the distance between the second edge face and third edge face (A).

The first core member is in the form which exits light with a flat wave front through the first edge face. The second edge face and third edge face are parallel to the wave front of the light output from the first edge face. Here, the first distance is shorter than the total of the second distance and the wavelength of the light transmitted in the second core member, but longer than the difference between the second distance and the wavelength of the light transmitted in the second core member.

The second waveguide comprises a waveguide of constant width and a waveguide of variable width which is contiguous with this waveguide of constant width. The waveguide of constant width has a given width. The waveguide of variable width is contiguous with the waveguide of constant width, and tapers toward the first edge face. The width of the waveguide of variable width preferably ranges from ½ to ⅘ the width of the waveguide of constant width.

This optical branching device may be used as a directional coupler. The core member comprises a fourth edge face. The fourth edge face opposes the first edge face. The optical branching device comprises a fourth core member and fifth core member. The fourth core member is embedded in the cladding member. The fourth core member comprises a fifth edge face facing the fourth edge face of the first core member at a given space.

The fifth core member is embedded in the cladding member. The fifth core member comprises a sixth edge face facing the fourth edge face of the first core member at a given space.

Also, to prevent interference between the light transmitted in the second core member and the light transmitted in the third core member, the optical branching device may be provided with a light-shielding member between the second core member and third core member.

Of the above-noted types of waveguide type optical branching device, the one whose multimode waveguide is a tapered waveguide comprising a tapered section and straight section has the following functions as well as those mentioned above. Specifically, in the case of transmitting guided light from the multimode waveguide to single mode waveguide, the guided light with a wave front which has been spread radially is input into the single mode waveguide after restoration to a plane wave front at the straight section. With this restoration, it is possible to output branched guided light with a minimum level of radiation of the guided light at the edge face of the multimode waveguide to which no waveguide edge face is opposite, due to the reduction of the terminal width of the single mode waveguide.

Of the waveguide type optical branching devices according to the present invention, in the type wherein two single mode waveguides are connected to either terminal of the multimode waveguide, since the widths of the two single mode waveguides gradually lower toward the multimode waveguide, the distance between the centers of the two single mode waveguide becomes smaller. With this configuration, the two peaks of the electric field distributions of the two single mode waveguides at the terminals are located close to each other, resulting in an increased coupling efficiency of the electric field distributions at the branching section which allows output of branched or coupled guided light with a minimum loss of light at the branching section.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIG. 9 is an illustration of the optical branching device shown in FIG. 8A;

FIG. 14 is a perspective view of an optical branching device according to another embodiment of the present invention;

FIG. 15A is a section view of the device shown in FIG. 14, taken along the plane indicated by the arrows H—H in the drawing;

FIG. 15B is a section view of the device shown in FIG. A, taken along the plane indicated by the arrows B—B in the drawing;

FIG. 15C is a section view of the device shown in FIG. 15A, taken along the plane indicated by the arrows C—C in the drawing;

FIG. 15D is a section view of the device shown in FIG. 15A, taken along the plane indicated by the arrows D—D in the drawing;

FIG. 15E is a section view of the device shown in FIG. 15A, taken along the plane indicated by the arrows E—E in the drawing;

FIG. 15F is a section view of the device shown in FIG. 15A, taken along the plane indicated by the arrows F—F in the drawing;

FIG. 15G is a section view of the device shown in FIG. 15A, taken along the plane indicated by the arrows G—G in the drawing;

FIG. 31 illustrates the manner of travelling of a wave front;

FIG. 33 is a section view of the device shown in FIG. 32, taken along the plane indicated by the arrows H—H in FIG. 32;

DESCRIPTION OF THE PREFERRED EMBODIMENTS

Figure 1:
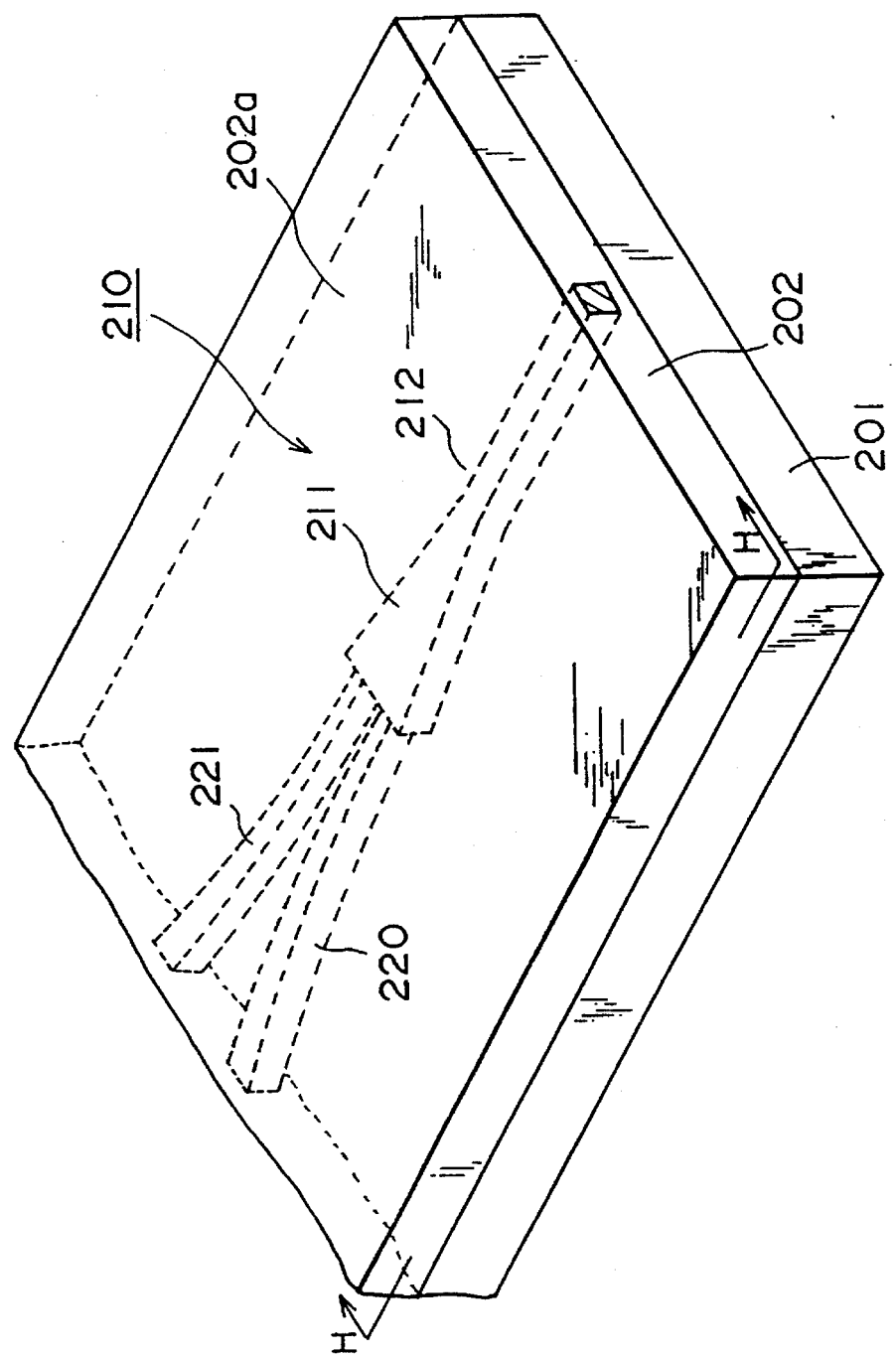
FIG. 1 is a perspective view of an optical branching device according to an embodiment of the present invention.

The embodiments of the present invention and related optical branching devices will now be explained in detail with reference to the accompanying drawings. Incidentally, like elements in the drawings will be indicated by like identical reference characters, avoiding repeated explanation.

The present inventors have made a study of light waveguides for a long time. The following is an explanation regarding several types of optical branching devices well known in their lavatory.

Figure 25:
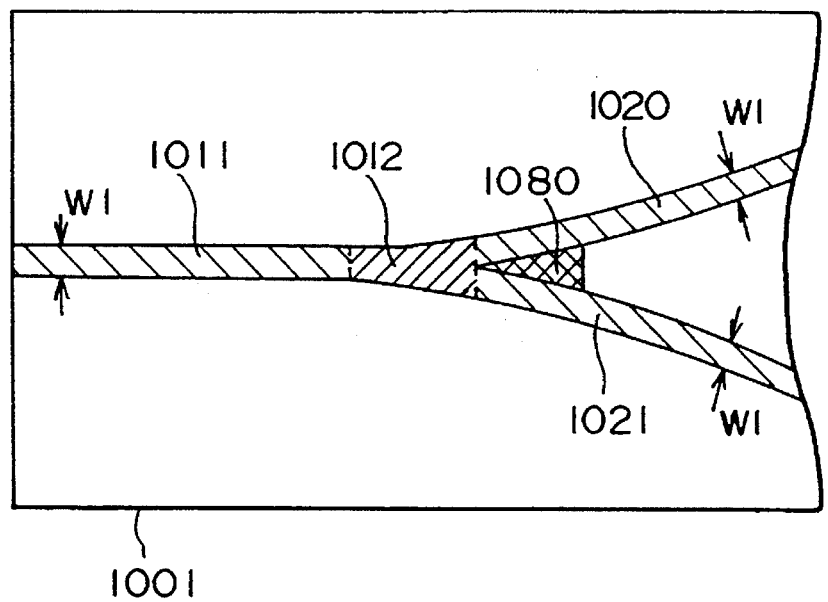
FIG. 25 is a horizontal section view of a Y-shaped waveguide type optical branching device (Y-shaped device)

FIG. 25 is a horizontal section view of a Y-shaped waveguide type optical branching device (Y-shaped device). The optical branching device shown in FIG. 25 will be referred to as type A waveguide. Type A waveguide comprises a substrate 1001, straight single mode waveguide 1011 formed on the substrate 1001, a multimode tapered waveguide 1012 connected to the waveguide 1011, and single mode waveguides 1020, 1021 which are branch waveguides connected to the waveguide 1012.

That is, the Y-shaped device shown in FIG. 25 (type A) is a device for branching and coupling guided light transmitted via the single mode waveguide 1011 or the single mode waveguides 1020, 102, by passing through the multimode waveguide 1012.

Figure 26:
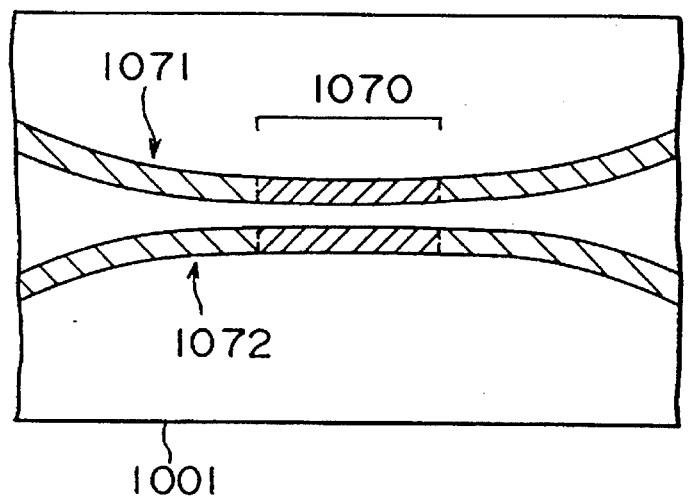
FIG. 26 is a section view of another waveguide type optical branching device.

FIG. 26 is a section view of another type of waveguide type optical branching device. The optical branching device shown in FIG. 26 will be referred to as type B waveguide. Type B waveguide comprises a substrate 1001, and single mode waveguides 1071, 1072 formed on the substrate 1001. The single mode waveguides 1071, 1072 are located close and in parallel at the joints.

The present inventors have found that these type A, type B waveguides should be improved from the following points of view.

To fabricate type B device with a desired branching ratio, the process step must be controlled so that the space very precisely matching the designed size is provided between the joints 1070 of the waveguides 1071, 1072.

The present inventors prepared some samples of type B waveguide. As a result, some defectives were prepared. For this reason, the inventors diagnosed the detectives. Microscopic observation of the samples revealed that the space between the joints 1070 of the waveguides 1071, 1072 did not have the designed size. The present inventors believe that one reason for this accident is incomplete etching during the preparation of the joints 1070. Yields of the device of FIG. 26 when produced on a large scale should be increased.

Figure 27:
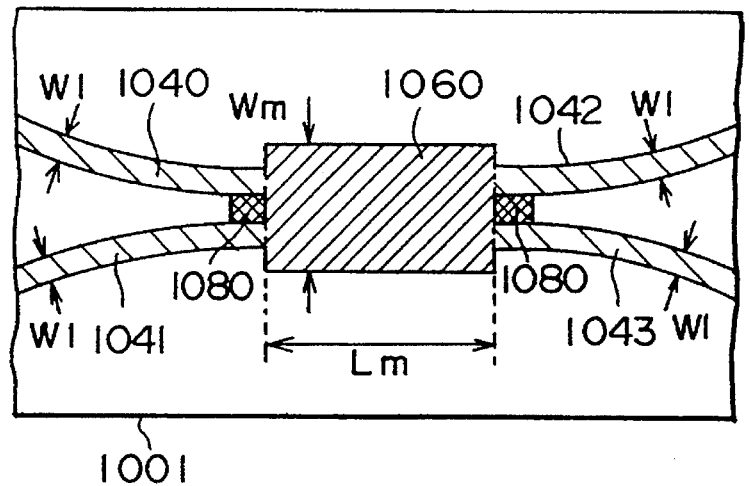
FIG. 27 is a section view of an optical branching device which is a modification of the optical branching device shown in FIG. 26, wherein the joints 1070 are replaced by a linear multimode waveguide 1060.

The waveguide of FIG. 27 is an optical branching device fabricated by replacing the joints 1070 of the directional coupler of FIG. 26 by a straight multimode waveguide 1060. Connected to the respective terminals are bent single mode waveguides 1040, 1041 or 1042, 1043. The waveguide shown in FIG. 27 will be referred to as type C waveguide.

Type C device exhibits excellent processing stability because it has no joining structure of type B device wherein two single mode waveguides are located close in parallel. Accordingly, type C waveguide is produced in higher yields than type B waveguide.

The present inventors have further noted that in the Y-shaped device of FIG. 25, the tip of the sharp gap section 80 at the branching section tends to become round, not sharpen. This change causes an increase in the loss of light at the branching section. This loss in light lowers the yields of conforming products.

Figure 28:
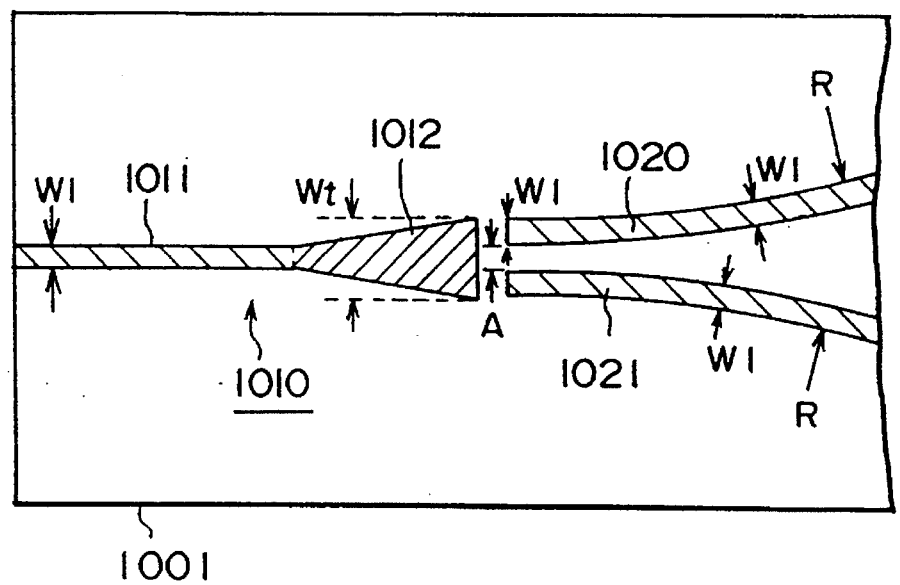
FIG. 28 is a section view of another modification of the optical branching device shown in FIG. 26, which has an improved coupling efficiency, and is excellent.

FIG. 28 is a section view of an excellent optical branching device with an increased coupling efficiency, an improved version of the above-noted device. Even this type optical branching device, however, should be improved. This type waveguide will be referred to as type D waveguide.

In an attempt to increase the coupling efficiency of the electric field distribution at the side of multimode waveguide 1060, and the same distribution at the side of the single mode waveguides 1040–1043 at the branching section, the present inventors reduced the size of the distance of the single mode waveguides on a trial basis. The results were, however, that the waveguide constituents (core materials) invaded the gap section 1080 near the branching section, causing rounding (deformation).

Rounding of the gap section 1080 brings about discontinuity of the mode and increases the coupling loss. Excessively reduced gap between the single mode waveguides contributes to an increased coupling loss. With conventional preparation technology, it is difficult to have the gap reduced to one micrometer or less. Therefore, excess reduction in the gap is not preferable from the point of view of improving the processing stability and yields.

As noted above, for types A and D waveguides, the lowering of the loss and the improvement in processing stability are essential.

The waveguide type optical branching device of the present invention is provided as a waveguide type optical branching device with satisfactory processing stability, and further reduced loss at the branching section. An explanation will now be made of an optical branching device according to an embodiment of the present invention.

Figure 2A:
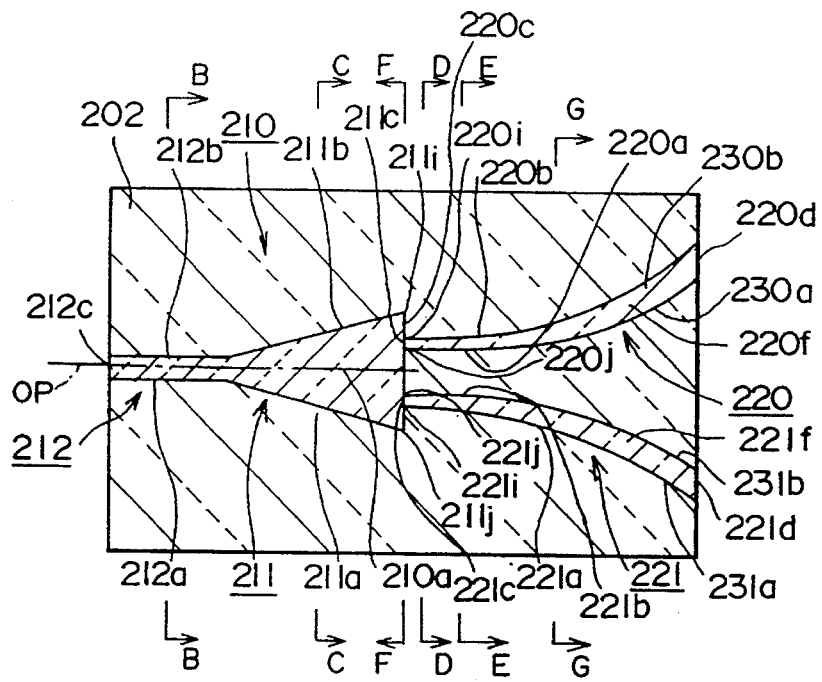
FIG. 2A is a section view of the device shown in FIG. 1, taken along the plane indicated by the arrows H—H in the drawing.
Figure 2B:
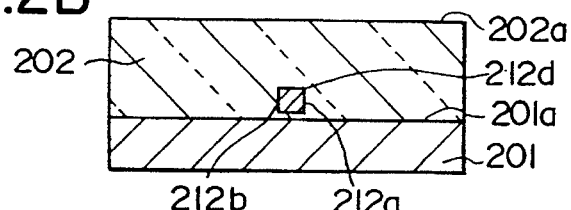
FIG. 2B is a section view of the device shown in FIG. 2A, taken along the plane indicated by the arrows B—B in the drawing.
Figure 2C:
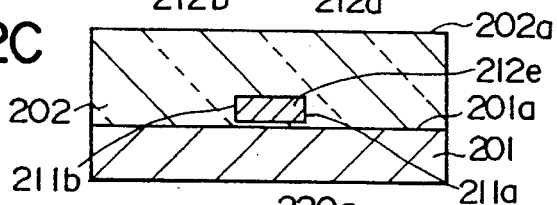
FIG. 2C Is a section view of the device shown in FIG. 2A, taken along the plane indicated by the arrows C—C in the drawing.
Figure 2D:
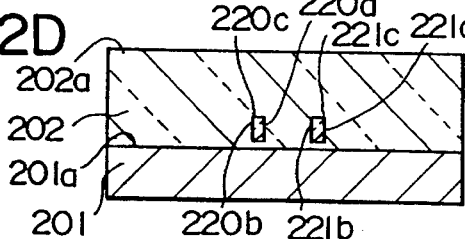
FIG. 2D is a section view of the device shown in FIG. 2A, taken along the plane indicated by the arrows D—D in the drawing.
Figure 2E:
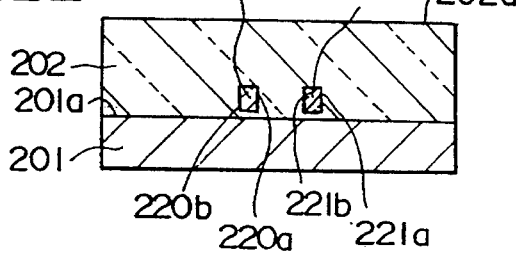
FIG. 2E is a section view of the device shown in FIG. 2A, taken along the plane indicated by the arrows E—E in the drawing.
Figure 2F:
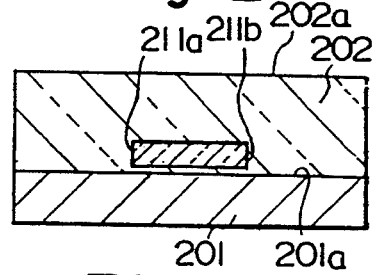
FIG. 2F is a section view of the device shown in FIG. 2A, taken along the plane indicated by the arrows F—F in the drawing.
Figure 2G:
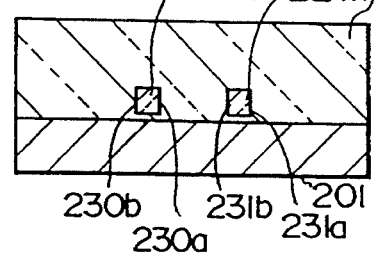
FIG. 2G is a section view of the device shown in FIG. 2A, taken along the plane indicated by the arrows G—G in the drawing.
Figure 3:
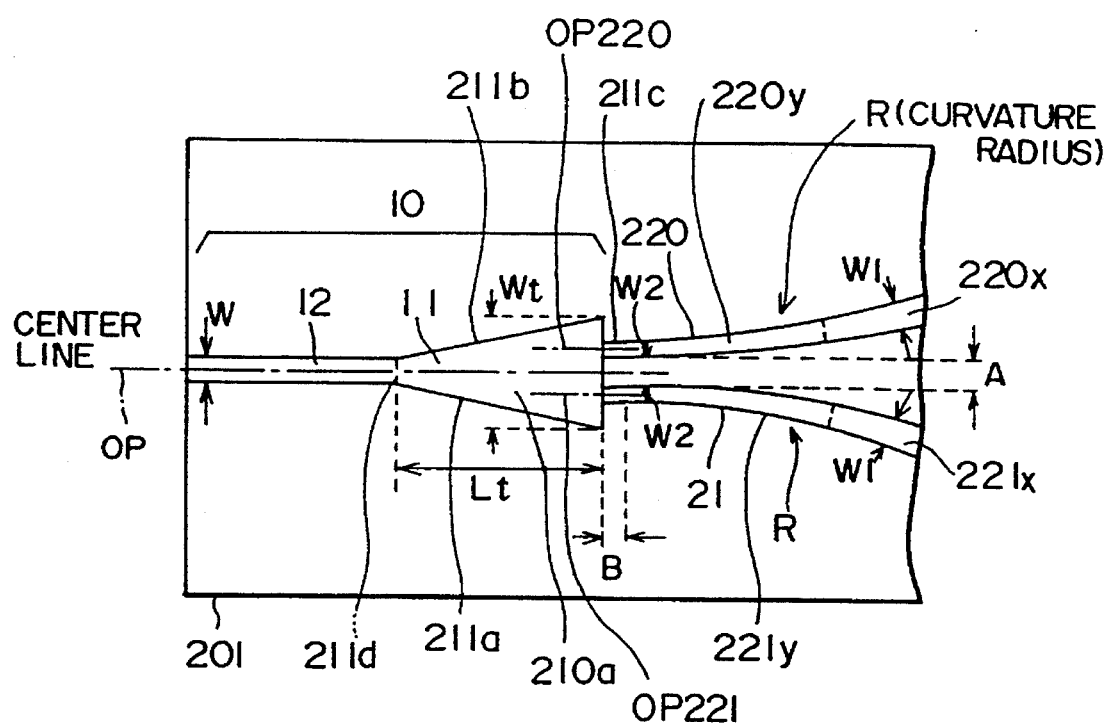
FIG. 3 is an illustration of the optical branching device shown in FIG. 2A.

FIG. 1 is a perspective view of an optical branching device according to an embodiment of the present invention. FIG. 2A is a section view of the device shown in FIG. 1, taken along the plane indicated by the arrows H—H in the drawing. FIG. 2B is a section view of the device shown in FIG. 2A, taken along the plane indicated by the arrows B—B in the drawing. FIG. 2C is a section view of the device shown in FIG. 2A, taken along the plane indicated by the arrows C—C in the drawing. FIG. 2D is a section view of the device shown in FIG. 2A, taken along the plane indicated by the arrows D—D in the drawing. FIG. 2E is a section view of the device shown in FIG. 2A, taken along the plane indicated by the arrows E—E in the drawing. FIG. 2F is a section view of the device shown in FIG. 2A, taken along the plane indicated by the arrows F—F in the drawing. FIG. 2G is a section view of the device shown in FIG. 2A, taken along the plane indicated by the arrows G—G in the drawing. FIG. 3 is a section view of the device shown in FIG. 2A.

The waveguide type optical branching device according to the present embodiment comprises a silicon substrate 201, a cladding member 202 formed on the supporting substrate 201, a first core member (first tapered waveguide) 210, a second core member (second waveguide) 220, and a third core member (third waveguide) 221.

The first core member 210 is embedded in the cladding member 202. The second core member 220 is embedded in the cladding member 202 as well. Also, the second core member 220 in contiguous with a first edge face 211c of the first core member 210. The interface (second edge face) between the first edge face 211c and the second core member 220 is indicated with 220c. The third core member 221 is also embedded in the cladding member 202. The third core member 221 is contiguous with a first edge face 211c of the first core member 210. The interface (third edge face) between the first edge face 211c and the third core member 221 is indicated with 220c.

The cladding member 202 (cladding 2, cladding layer 202) has a first surface 202a. The first surface 202a is parallel to the main surface 201a of the substrate 201. The main surface 201a is defined by an interface between the substrate 201 and cladding member 202. "Direction of the width" is defined to be the direction perpendicular to both the direction perpendicular to the first surface 202a, and to the direction of light propagation. "Direction of the thickness" is defined to be the direction perpendicular to the first surface 202a. The first core member 210 has a light transmission path 212 of given width and thickness, and a core section 211, which is contiguous with the light transmission path 212, of a tapered type whose width increases as the distance from the light transmission path 212 does. The width of the light transmission path 212 is defined by the distance between the side 212a and side 212b in FIG. 2A.

The first core member 210 has a first perpendicular section 212d which is defined by intersection with a first plane (plane indicated by the arrows B—B in FIG. 2A) which is perpendicular to the first surface 202a. The first core member 210 has a second perpendicular section 212e which is defined by intersection with a second plane (plane indicated by the arrows C—C in FIG. 2A) perpendicular to the first surface 202a and located between the fist edge face 211c and first plane (B—B plane). The first core member 210 has a first horizontal section (210a in FIG. 2A) which is defined by intersection with a third plane (plane indicated the arrows H—H in FIG. 1) parallel to the first surface 202a.

The second core member 220 has a third perpendicular section 220e which is defined by intersection with a fourth plane (plane indicated by the arrows E—E in FIG. 2A) which is perpendicular to the first surface 202a. The second core member 220 has a second horizontal section (220f in FIG. 2A) which is defined by intersection with the third plane (H—H plane).

The third core member 221 has a fourth perpendicular section 221e which is defined by intersection with the fourth plane (E—E plane). The third core member 221 has a third horizontal section 221f which is defined by intersection with the third plane (H—H plane).

In other words, the branch waveguide assembly shown in FIGS. 1–3 comprises a substrate 1, a first tapered waveguide 210, a second waveguide 220 and a third waveguide 221.

The second core member 220 tapers toward the first core member 210. The third core member 221 tapers toward the first core member 210 as well. In addition, the distance between the second core member 220 and third core member 221 lowers toward the first core member 210. In this optical branching device, the first core member 210 includes a first multimode waveguide 210, while the second core member 220 includes a first single mode waveguide 220, and the third core member 221 includes a second single mode waveguide 221. The first core member 210 comprises a tapered waveguide 211.

Since both the second core member 220 and third core member 221 are tapered, if the space between the second core member 220 and third core member 221 is constant, the optical axis OP220 of the second core member 220 at the second edge face 220c, and the optical axis of OP221 the third core member 221 at the third edge face 221c may be situated closely.

Accordingly, at the second edge face 220c of the second core member 220, the light transmitted in this second core member 220 has an electric field distribution in the radial direction of the core 220. The peak position of the electric field distribution (the first peak position) corresponds to the position of the axis OP220 of the second core member 220. At the third edge face 221c of the third core member 221, the light transmitted in this third core member 221c has an electric field distribution in the radial direction of the core 221. The peak position of the electric field distribution (the second peak position) corresponds to the position of the axis of the third core member 221. With the first peak and the second peak situated closely, improvements are obtained in the coupling efficiency of the light transmitted between the first core member 210 and second core member 220 as well as in the coupling efficiency of the light transmitted between the first core member 210 and third core member 221. As a result, according to the present invention, it is possible to input guided light which has been branched or coupled, with a minimum loss at the branching section.

The second core member 220 comprises a second edge face (interface) 220c, third perpendicular section (220e) and second horizontal section 220f.

The second edge face 220c opposes the first edge face 211c of the first core member (first tapered waveguide) 210. The third perpendicular section 220e is defined by intersection with a fourth plane (E—E plane) perpendicular to the first surface 202a. The second horizontal section 220f is defined by intersection with the third plane (H—H plane). Here, since the second core member 220 tapers, the area of the second edge face 220c is smaller than the area of the third perpendicular section 220e. The second core member 220 comprises a section 220h which is defined by intersection with the plane (G—G plane) parallel to the fourth plane. The third perpendicular section 220e is situated between the interface 220c and the section 220h. The area of the section 220h is larger than the area of the third perpendicular section 220e.

The third core member 221 is embedded in the cladding member 202. The third core member 221 comprises a third edge face 221c, fourth perpendicular section 221e and third horizontal section 221f. The third edge face (interface) 221c opposes the first edge face 211c of the first core member 210. The fourth perpendicular section 221e is defined by intersection of the third core member 221 with a fourth plane (E—E plane). The third horizontal section 221f is defined by intersection of the third core member 221 with the third plate (H—H). As the third core member 221 tapers, the area of the third edge face 221c is smaller than the area of the fourth perpendicular section 221e. The third core member 221 comprises a section 221h which is defined by intersection with the plane (G—G plane) parallel to the fourth plane (E—E). The fourth perpendicular section 221e is situated between the interface 221c and the section 221h. The area of the section 221h is larger than the area of the fourth perpendicular section 221e.

The substrate 201 has a substrate surface 201a.

The first tapered waveguide 210 is formed on the substrate surface 201a, and has a first edge face 211c. The second waveguide 220 is formed on the substrate surface 201a. The second waveguide 220 has an interface 220c with the first edge face 211c, a first side 220a including a plane crossing the substrate surface 201a, and a second side 220b facing the first side 220a.

The third waveguide 221 is formed on the substrate surface 201a. The third waveguide 221 has an interface 221c with the first edge face 211c, a third side 221a including the place crossing the substrate surface 201a, and a fourth side 221b facing the third side 221a. The fourth side 221b is located between the first side 220a and the third side 221a. The first side 220a is located between the second side 220b and the fourth side 221b.

The width of the first edge face 211c is identical to the length of the first edge face 211c along the direction (direction of the width) perpendicular to both the direction of the normal to the substrate surface 201a (direction of the thickness), and the direction of the normal to the first edge face 211c (direction of the optical axis). The width (Wt) of the first edge face 211c is greater than the distance between the second side 220c and the third side 221c.

The first core member 210 is located so that the light input into the first core member 210 through the interface 212c is propagated in the direction along the first horizontal section 210a across the first perpendicular section 212d and second perpendicular section 212e, and output from the first edge face 211c.

The second core member is located so that the light output from the first edge face 211c is input into the second core member 220 through the second interface 220c, and is propagated in the direction along the second horizontal section 220f across the third perpendicular section 220e, and output at the second edge face 220d of the second core member 220.

The third core member 221 is located so that the light output from the first edge face 211c is input into the third core member 221 through the third edge face 221c, and is propagated in the direction along the third horizontal section 221f across the fourth perpendicular section 221e, and output from the third core member 221.

In this connection, the area of the first edge face 211c is larger than the area of the first perpendicular section 212d. This is because the first core member 210 has a tapered section 211 which diverges toward the direction of the second and third core members 220, 221. The tapered section 211 has sides 211a, 211b which forms given angles with the optical axis OP (center line) of the first core member 210.

In other words, the intersections 211a, 211b between the two sides perpendicular to the first surface 202a of the tapered section (tapered waveguide) 211, and the third plane (H—H plane) form given angles with the optical axis OP (center line) of the first core member 210 in the third plane.

As the first core member 210 comprises the tapered section 211, the density of the energy (power) of the optical signal input into the first core member 210 at the edge face (fourth edge face) 212c decreases gradually as the light travels passing through the first perpendicular section 212d toward the first edge face 211c.

The light output from the edge face 211c of the first core member 210 is input into the second core member 220 at the second edge face 220c, and into the third core member 221 at the third edge face 221c. The present inventors have found, based on their previous research, that for the improvement in coupling efficiency of light propagated between two optical components it is effective to make the opposing edge faces of the respective optical components perpendicular to the direction of light propagation. The first edge face 211c according to the present embodiment is perpendicular to the direction of movement of the light passing through the first edge face 211c. Therefore, the interface 220c is perpendicular to the direction of movement of the incident light to the interface 220c. The interface 221c is perpendicular to the direction of movement of the incident light to the interface 221c. As a result, the first edge face 211c is opposite to the interface 220c, whereas the first edge face 211c is parallel to the interface 220c. The first edge face 211c is opposite to the interface 221c, whereas the first edge face 211c is parallel to the third edge face 221c.

The second core member 220 has sides 220a, 220b perpendicular to the first surface 202a. The side 220a and side 220b are parallel to the direction of movement of the light propagated in the second core member 220. In this connection, the side 220a and side 220b faces each other, while the side 220a and side 220b runs in parallel with each other. Accordingly, the sides 220a and side 220b are perpendicular to both the first surface 202a and the second edge face 220b.

Similarly, the third core member 221 has sides 221a, 221b which are perpendicular to the first surface 202a. The side 221a and side 221b are parallel to the direction of movement of the light propagated in the third core member 221. In turn, the side 221a and side 221b are opposite to each other, whereas the side 221a and side 221b are parallel to each other. Thus, the side 221a and side 221b are perpendicular to both the first surface 202a and third edge face 221c.

The second waveguide 220 comprises a waveguide of constant width 220x which has a given width, and a waveguide of variable width 220y which is contiguous with the waveguide of constant width 220x. The waveguide of variable width 220y tapers toward the first edge face 211c, and the width of the waveguide of variable width 220y ranges from ½ to ⅘ the width of the waveguide of constant width 220x.

The third waveguide 221 comprises a waveguide of constant width 221x which has a given width, and a waveguide of variable width 221y which is contiguous with the waveguide of constant width 221x. The waveguide of variable width 221 tapers toward the first edge face 211c, and the width of the waveguide of variable width 221y ranges from ½ to ⅘ the width of the waveguide of constant width 221x.

An intersection (cross line) 220i is an intersection of the second interface 220c and second side face 220b. An intersection (cross line) 221i is an intersection of the third interface 221c and third side face 221a.

An intersection (cross line) 220j is an intersection of the second interface 220c and first side face 220a. An intersection (cross line) 221j is an intersection of the third interface 221c and fourth side face 221b. An intersection (cross line) 211i is an intersection of the first edge face 211c and the side face 211b. An intersection (cross line) 211j is an intersection of the first edge face 211c and the side face 211a. The distance between the line 211i and line 211j is Wt (μm), the distance between the line 220i and line 221j is (2W+A) (μm), distance Wt is greater than (2W+A). The distance (A) is defined by the space between the second core member 220 and third core member 221. More precisely, the distance (A) is defined by the distance between the line 220j and line 221j.

The distance between the second core member 220 and the third core member 221 increases with distance from the first core member 210. This is because the second core member 220 comprises bent sides 230a, 230b bending apart from the third core member 221. The bent side 230a is adjacent to the plane 220a, whereas the bent side 230b to the plane 220b. The curvature radius of the bent side 230a is R, and also the curvature radius of the bent side 230b approximates R. The third core member 221 has bent sides 231a, 231b bending apart from the second core member 220. The bent side 231a is contiguous with the plane 221a, whereas the bent side 231b to the plane 221b. The curvature radius of the bent side 231a is R, and also the curvature radius of the bent side 231b approximates R. The second core member 220 and the third core member 221 are S-shaped waveguides.

The light output from the second edge face 220c and input into the second core member 220 is then output through the edge face 220d of the second core member 220. The light output from the third edge face 221c and input into the third core member 221 is then output through the edge face 221d of the third core member 221. In this connection, the optical distance from the input edge face 220c to the output edge face 220d of the second core member 220 is equal to the optical distance between the input edge face 221c and the output edge face 221d of the third core member 221. As a result, in cases where beams of the light input from the first core member 210 into the core members 220, 221 are output from the core members 220, 221, the beams of the light branched by the core members 220, 221 are in the same phase upon output from the edge faces 220d, 221d. Since the beams of the output light from the edge faces 220d, 221d are in one phase, the phase matching of the respective beams are easy to perform for coupling of the output light, etc.

Figure 4:
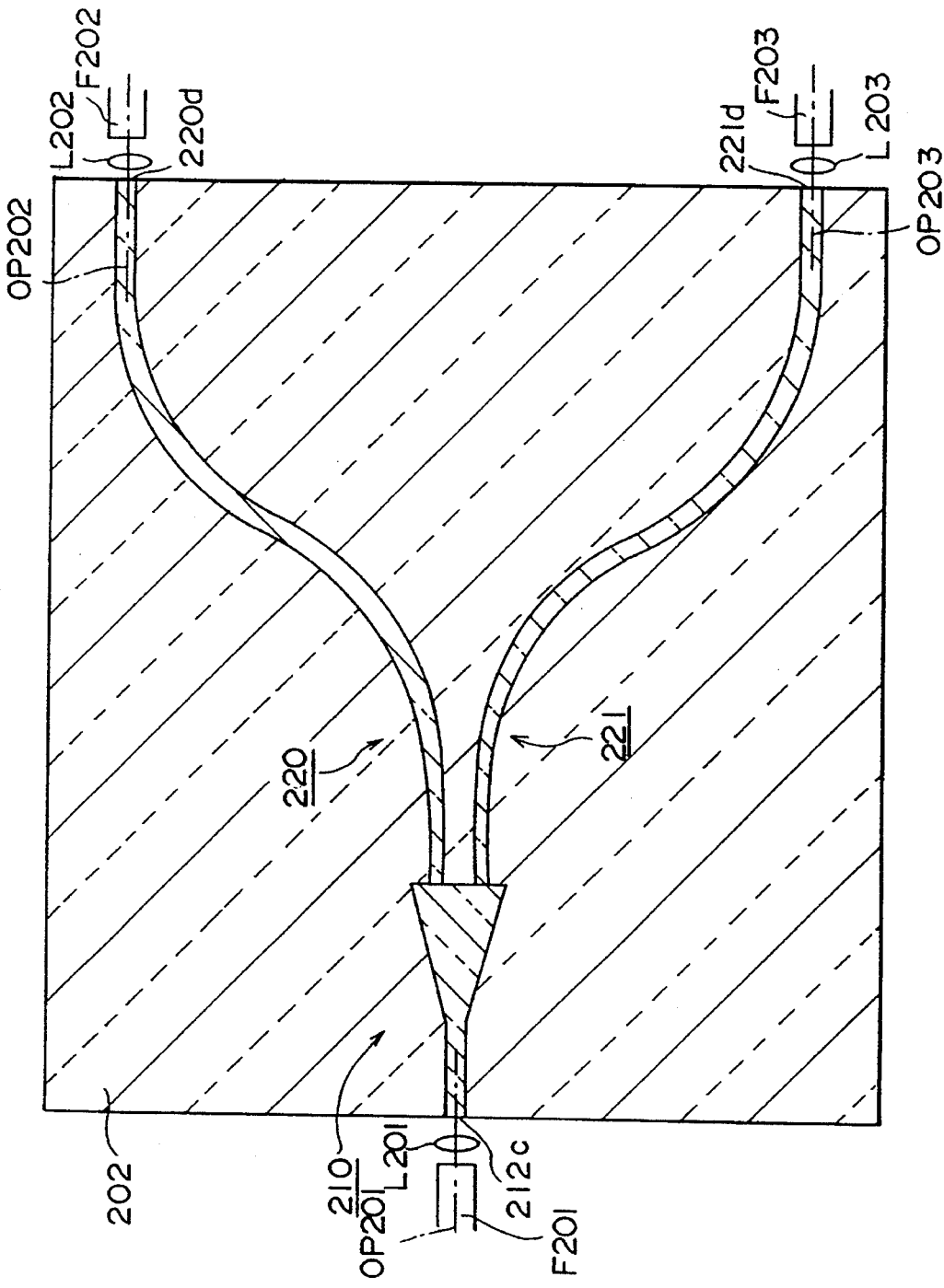
FIG. 4 is a section view of a modification of the optical branching device shown in FIG. 2A with improvements made on the edges 220d, 221d of the second core member 220 and third core member 221.

FIG. 4 shows a modification of the optical branching device shown in FIG. 2A with improvements made on the edge faces 220d, 221d of the second core member 220 and third core member 221. The edge faces 220d, 221d of the optical branching device shown in FIG. 2A is exposed. The direction of the normal to the exposed edge face 220d forms a given angle with the direction of movement of the light (direction of the optical axis) propagated in the third core member 221. Also, the direction of the normal to the exposed edge face 221d forms a given angle with the direction of movement of the light propagated in the third core member 221. As mentioned above, the present inventors have noted, based on their previous research, that for the improvement in coupling efficiency of light propagated between two optical components it is effective to make the opposing edge faces of the respective optical components perpendicular to the direction of light propagation (direction of the optical axis). For this finding, as shown in FIG. 4, the optical branching device according to the present embodiment is positioned so that the output edge face 220d of the second core member 220 is perpendicular to the optical axis OP202 (indicated by an alternating long and short dash line) of the second core member 220. Optical fiber F202 is located opposite to the edge face 220d of the second core member 220 via a lens L202. Additionally, the third core member 221 is located so that the output edge face 221d of the third core member 221 is perpendicular to the optical axis OP203 (indicated by an alternating long and short dash line) of the third core member 221. Optical fiber F203 is located opposite to the edge face 221d of the third core member 221 via a lens L203. Additionally, the first core member 210 is located so that the input edge face 212c of the first core member 210 is perpendicular to the optical axis OP201 (indicated by an alternating long and short dash line) of the first core member 221. Optical fiber F201 is located opposite to the edge face 212c of the first core member 210 via a lens L201.

Figure 5:
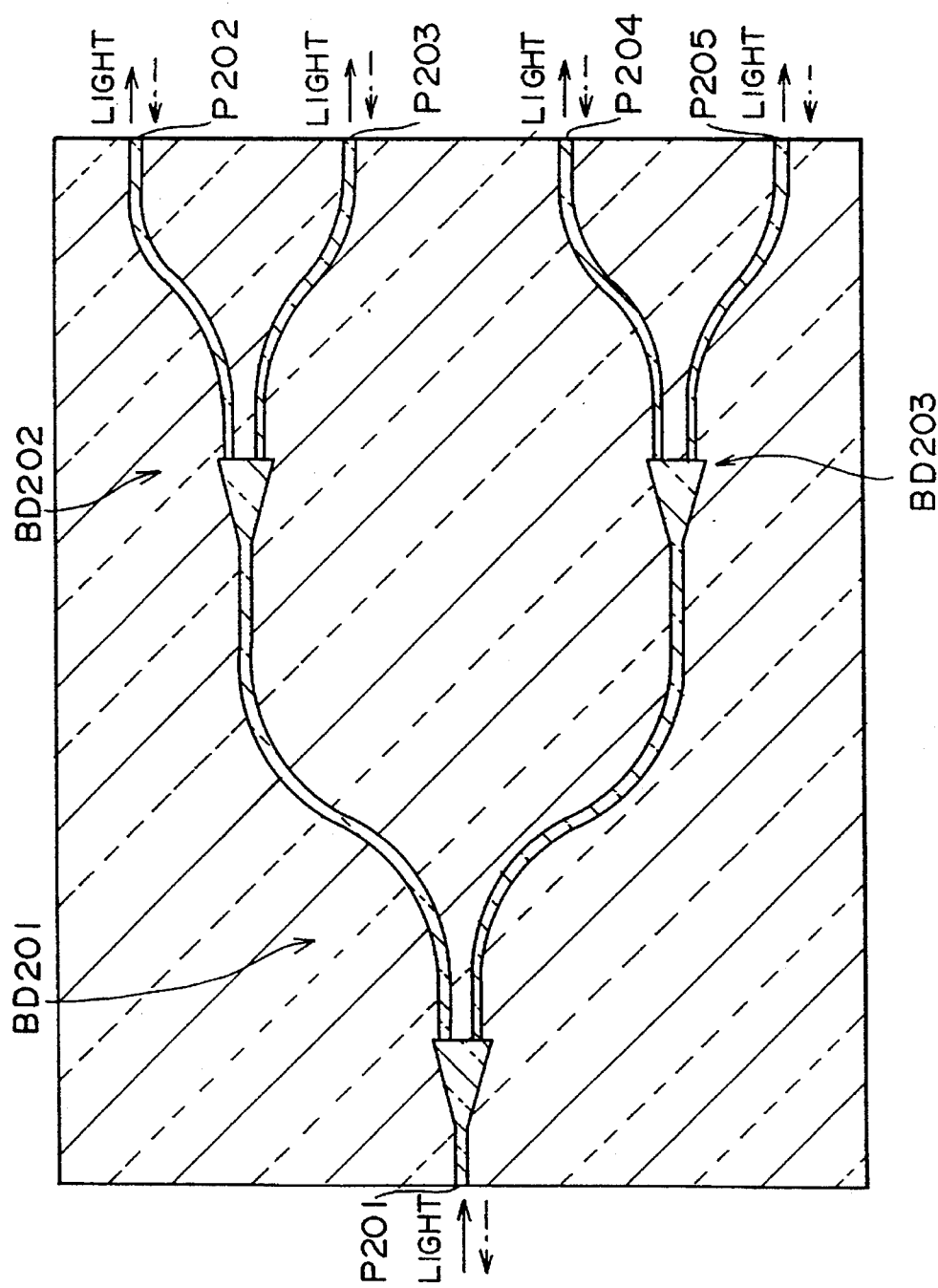
FIG. 5 is a section view of an optical branching device assembly with a 1×4 structure which consists of 3 connected optical branching devices BR201, BR202 and BR203 of the type shown in FIG. 4.

FIG. 5 is an optical branching device assembly with a 1×4 structure which consists of 3 connected optical branching devices BR201, BR202 and BR203 of the type shown in FIG. 4. This optical branching device assembly comprises the first optical branching device BR201, the second optical branching device BR202 whose input edge face 212c is connected to the output edge face 220d of the first optical branching device BR201, and the third optical branching device BR203 whose input edge face 212c is connected to the output edge face 221d of the first optical branching device BR201.

The optical signal (indicated by a solid arrow in the drawing) input into the first optical branching device BR201 through the edge face P201 is divided with this optical branching device, and output through the edge faces P202, P203 of the second optical branching device BR202, and through the edge faces P204, P205 of the third optical branching device BR203. Conversely, the respective optical signals (indicated by alternating long and short dash arrows) input at the edge faces P202–P205 are coupled with the optical branching device, and output from the edge face P201.

Figure 6:
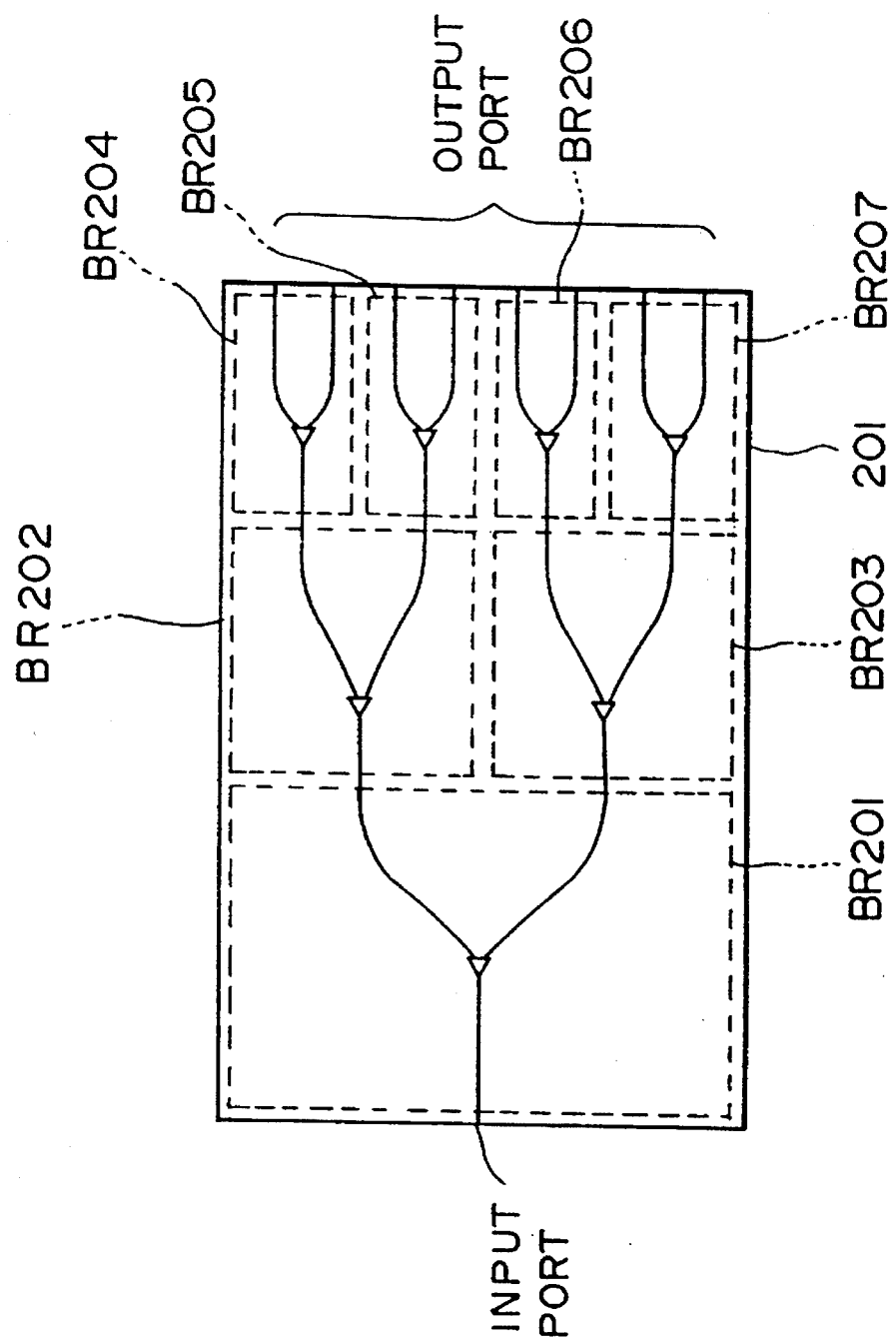
FIG. 6 is a section view of an optical branching assembly with a 1×8 structure which consists of 7 connected optical branching devices BR201, BR202, BR203, BR204, BR205, BR206 and BR207 of the type shown in FIG. 4.

FIG. 6 is an optical branching device assembly with a 1×8 structure which consists of 7 connected optical branching devices BR201, BR202, BR203, BR204, BR205, BR206 and BR207 of the type shown in FIG. 4. This optical branching device assembly comprises the first optical branching device BR201 with an input edge face (input port), the second optical branching device BR202 whose input edge face 12c is connected to the output edge face 220d of the first optical branching device BR201, and the third optical branching device BR203 whose input edge face 212c is connected to the output edge face 221d of the first optical branching device BR201.

In addition, this optical branching device assembly comprises the fourth optical branching device BR204 whose input edge face 212c is connected to the output edge face 220d of the second optical branching device BR202, the fifth optical branching device BR205 whose input edge face 212c is connected to the output edge face 221d of the second optical branching device BR201, the sixth optical branching device BR206 whose input edge face 212c is connected to the output edge face 220d of the third optical branching device BR203, and the seventh optical branching device BR207 whose input edge face 212c is connected to the output edge face 221d of the third optical branching device BR203.

Accordingly, this optical branching device assembly may branch single light beam input into the assembly, into eight beams, and reversely may couple eight beams input into this assembly into single beam. In this connection, all the optical branching devices BR201, BR202, BR203, BR204, BR205, BR206, and BR207 are formed on the same substrate 101.

Hereunder, an optical branching device according to another embodiment of the present invention will be explained.

Figure 7:
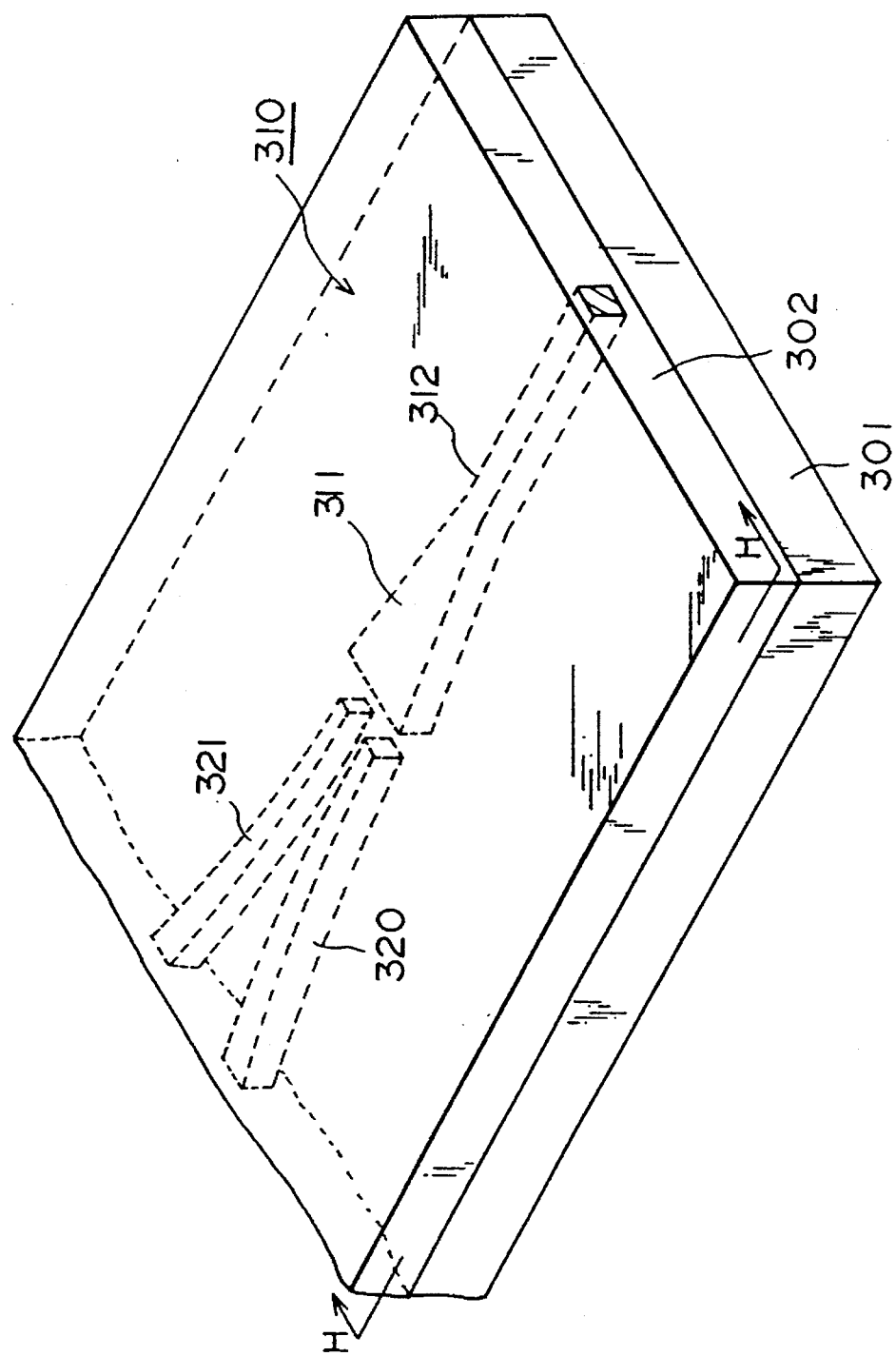
FIG. 7 is a perspective view of an optical branching device according to another embodiment of the present invention.

An optical branching device comprise waveguide present invention is shown in FIGS. 7–9. This is a roughly Y-shaped branching and coupling device (Y-shaped device) for branching or coupling guided light transmitted along the single mode waveguide 312 or 320, 321, via the multimode tapered waveguide 311. The optical branching device according to the present embodiment is constructed so that the second and third core members 220, 221 of the optical branching device shown in FIG. 1 are separated from the first core member 210.

One type of the waveguide type optical branching devices of the present invention comprises one multimode waveguide 310, and two single mode waveguides 320, 321. The single mode waveguides 320, 321 are located close at the edge faces 320c, 321c at the side of the multimode waveguide 310. The edge faces 320c, 321c oppose either terminal 311c of the multimode waveguide 310 at a given space (B).

At least one of the two single mode waveguides 320, 321 gradually tapers in the direction from the proximal end to the multimode waveguide 311. Namely, the space between the centers of the two single mode waveguides 320, 321 is smaller than the case of the optical branching device shown in FIG. 28.

Here, the multimode waveguide 310 comprises a single mode waveguide of constant width 312, and a tapered waveguide 311 connected to either terminal thereof. This taper waveguide 311 may be such type as provided with a tapered section which is connected to the waveguide of constant width, and a straight section which is connected to the tapered section and is of roughly the same width as the terminal of the tapered section, as described later. Further, as mentioned below, this type waveguide may be provided with two single mode waveguides facing the other terminal of the multimode waveguide at a given space, wherein their terminals are located close to each other at the side of waveguide multimode waveguide.

The .optical branching device comprises a multimode waveguide, and two single mode waveguides which are connected to either terminal of the multimode waveguide, and are located close to each other at the terminals near the multimode waveguide, and is characterized in that at least one of the two single mode waveguide tapers in the direction from the proximal end to the multimode waveguide to reduce the space between the centers of the two single mode waveguides.

This waveguide type optical branching device may be provided with two additional single mode waveguides which are connected to the other terminal of the multimode waveguide, and situated close to each other at the terminals near the multimode waveguide. The above-noted waveguide type optical branching device may be of such type where the terminal widths of the single mode waveguides near the multimode waveguide may be reduced to ½–⅘ the proximal width.

Of the optical branching devices of the present invention, the one with either terminal of the multimode waveguide being opposite to the edge faces of the two single mode waveguides has a branching structure wherein the multimode waveguide is separated from the two single mode waveguides, thereby allowing branching and coupling of guided light without provision of a hard-to-process gap section at the branching section. As a result, there is provided easier processing of the branching section, and excellent processing stability.

Furthermore, since the widths of the two single mode waveguides gradually lower in the direction from the proximal ends to the multimode waveguide, the space between the centers of the two single mode waveguides becomes smaller. With this configuration, the two peaks of the electric field distributions at the terminals of the single mode waveguides become closer, resulting in an increased coupling efficiency of the electric field distributions at the branching section. This means that with a minimum loss at the branching section the guided light may be branched, coupled, and output.

Of the above-noted types of waveguide type optical branching device, the one whose multimode waveguide is a tapered waveguide comprising a tapered section and straight section has the following functions as well as those mentioned above. Specifically, in the case of transmitting guided light from the multimode waveguide to single mode waveguide, the guided light with a wave front which has been spread radially is input into the single mode waveguide after restoration to a plane wave front at the straight section. With this restoration, it is possible to output branched guided light with a minimum level of radiation of the guided light at the edge face of the multimode waveguide to which no waveguide edge face is opposite, due to the reduction of the terminal width of the single mode waveguide.

Of the waveguide type optical branching devices according to the present invention, in the type wherein two single mode waveguides are connected to either terminal of the multimode waveguide, since the widths of the two single mode waveguides gradually lower toward the multimode waveguide, the distance between the centers of the two single mode waveguide becomes smaller. With this configuration, the two peaks of the electric field distributions of the two single mode waveguides at the terminals are located close to each other, resulting in an increased coupling efficiency of the electric field distributions at the branching section which allows output of branched or coupled guided light with a minimum loss of light at the branching section.

As is shown in FIG. 7, a transparent material layer comprising SiO$_2$, for example, is formed on the upper surface of a substrate composed of, e.g. silicon. This transparent material layer is made up with a highly refractive core or single mode waveguide 312, a multimode tapered waveguide 311 and single mode waveguides as branches (hereunder, referred to as branch waveguides) 320, 321, and a low refractive cladding 302 with the core embedded therein. Incidentally, all the waveguides 311, 312, 320 and 321 are formed in the direction of transmission of light in the members.

The tapered waveguide 311 is connected to the single mode waveguide 312. The two edge faces 320c, 321c of the branch waveguides 320, 321 faces the edge face of the tapered waveguide 311 at a given space.

The two-dimensional configuration of the single mode waveguide 312 in the direction of the surface of the substrate is linear, whereas tapered waveguide 311 tapers in a two-dimensional manner, wherein the width diverges in the direction from the single mode waveguide 312 to the branching section. Also, the widths of the branch waveguides 320, 321 gradually decrease in the direction from the proximal ends 320d, 321d to the tapered waveguide 312.

Referring to FIG. 9, the structure of the optical branching device shown in FIGS. 7 and 8 will be detailed. As shown in FIG. 9, the tapered waveguide 311 has a terminal width Wt, a length Lt, and is connected to the single mode waveguide 312 of a width W1. The edge faces 320c, 321c of the single mode waveguides 320, 321 near the branching section face the terminal of the tapered waveguide 311 at a given space B. In turn, the branch waveguides 320, 321 are located close, but at a space A, at the terminals near the branching section, in such a manner that the space gradually increases symmetrically with regard to the center line of the tapered waveguide 311, in the direction of transmission of light. For simultaneous accomplishment of excellent processing stability and reduced loss of light, the space B between the edge face of the tapered waveguide 311 and the edge faces of the branch waveguides 320, 321 are preferred to be approximately 2–8 µm.

The space B(1) between the edge faces 311c and 320c, and the space B(2) between the edge faces 311c and 321c have a following equation.

$$B(2)-\lambda \leq B(1) \leq B(2)+\lambda,$$

where $\lambda$ is wavelength of the guided light traveling through the core member 310. Then the space B(1) is substantially equal to B(2). The wavelength $\lambda$ of the guided light using in present embodiment is 1.55 µm. In other words, the first space B(1) is not greater than the total of the space of said second space B(2) and the wavelength ($\lambda$) of the light propagated in said second core member 320, and not smaller than the difference between said second space B(2) and the wavelength ($\lambda$) of the light propagated in said second core member 320.

The branch waveguides 320, 321 are constructed with proximal ends of constant width 320x, 321x to which there are connected single mode waveguide 320y, 321y having a peripheral curvature radius R and a width which gradually lowers toward the tapered waveguide 311. Here, both of the proximal ends 320x, 321x are bent single mode waveguides whose widths are W1, and curvature radii are R. In this connection, the terminal widths of the branch waveguides 320, 321 at the side of the first edge face 311c is W2. The widths of the branch waveguides 320, 321 decrement by 3 µm per mm-travelling along the center of the optical axis in the direction from the proximal ends 320x, 321x to the tapered waveguide 12.

Focusing now on the width of the single mode waveguide, for light transmission while inducing the adequate function of confining the electric field under single mode conditions, and suppressing radiation from the waveguide to an acceptable extent, the width (W) of the waveguide is desired to be set so that the normalized frequency V of the waveguide satisfies the following requisite:

$$(\text{\textonethird})\pi \leq V \leq (\text{\textonehalf})\pi \qquad (1)$$

wherein
$V=(\pi \cdot W/\lambda) \cdot (N_1^2-N_2^2)^{1/2}$
where
W=width of the waveguide
k=wavelength of guided light
$N_1$=Refractive index of the core
$N_2$=Refractive index of the cladding For the device according to the present invention which is shown in FIG. 9, the widths of the proximal ends 320x, 321x and the single mode waveguide 312 are set to meet the requisite represented by the above-noted formula (1). The values of widths of the proximal ends 320x, 321x and the single mode waveguide 312 each are W1. This type device is clearly differentiated from the device of FIG. 25 in that the former has a branching structure wherein the tapered waveguide 311 is separated form the branch waveguides 320, 321, and in that the terminal widths (=W2) of the branch waveguides 320, 321 is smaller than the width (=W1) of the proximal ends 320x, 321x and the single mode waveguide 312.

The device according to the present embodiment will de detailed hereunder.

The optical branching device according to the present invention has a structure wherein the second and third core members 320, 321 are separated from the first core member 310. The second core 320 member and third core member 321 taper toward the first edge face 311c.

Figure 8A:
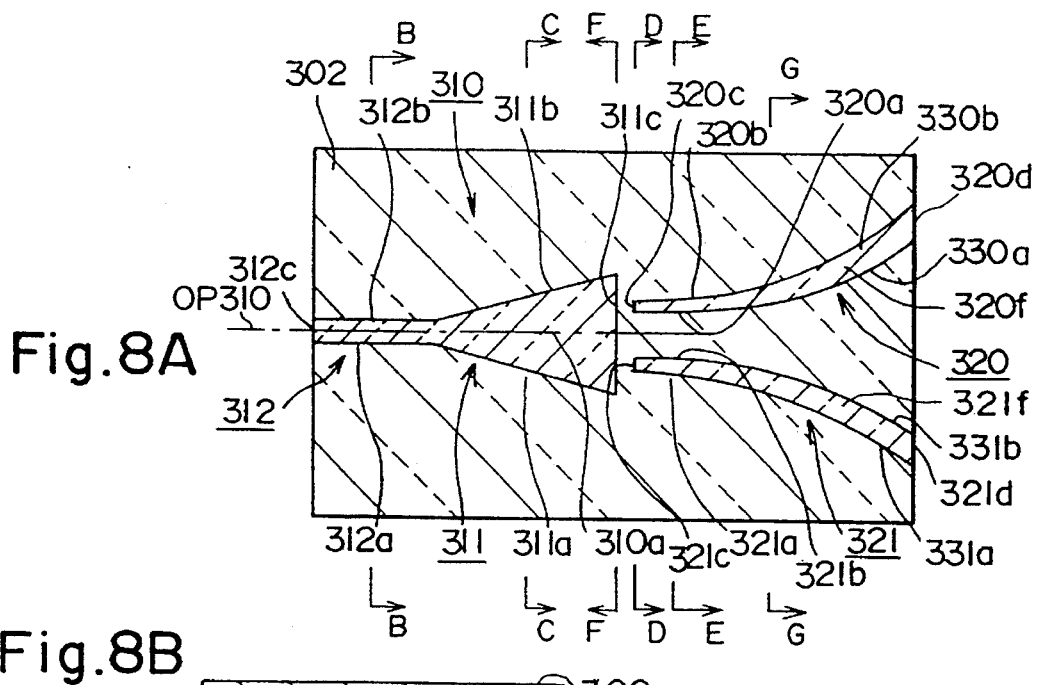
FIG. 8A is a section view of the device shown in FIG. 7 taken along the plane indicated by the arrows H—H in the drawing.
Figure 8B:
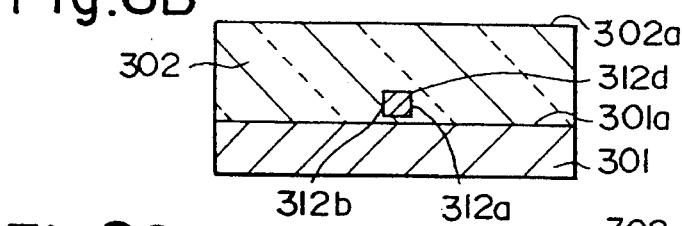
FIG. 8B is a section view of the device shown in FIG. 8A, taken along the plane indicated by the arrows B—B in the drawing.
Figure 8C:
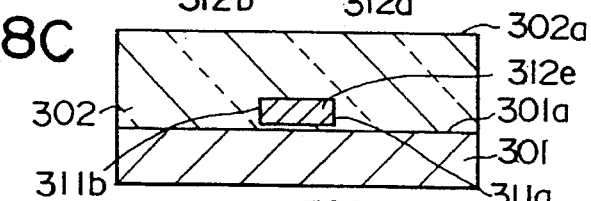
FIG. 8C is a section view of the device shown in FIG. 8A, taken along the plane indicated by the arrows C—C in the drawing.
Figure 8D:
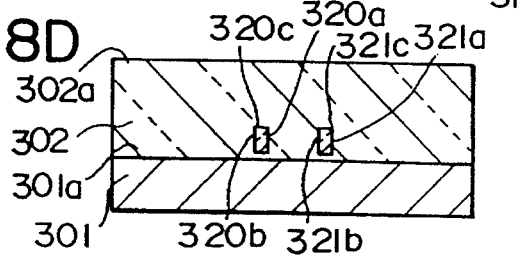
FIG. 8D is a section view of the device shown in FIG. 8A, taken along the plane indicated by the arrows D—D in the drawing.
Figure 8E:
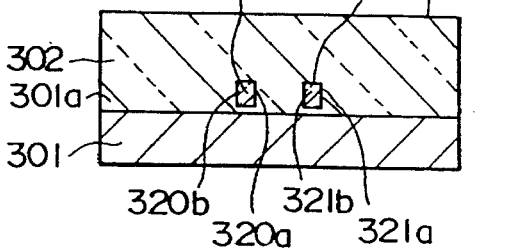
FIG. 8E is a section view of the device shown in FIG. 8A, taken along the plane indicated by the arrows E—E in the drawing.
Figure 8F:
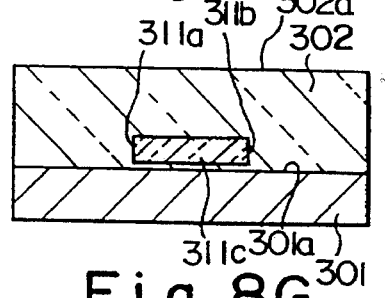
FIG. 8F is a section view of the device shown in FIG. 8A, taken along the plane indicated by the arrows F—F in the drawing.
Figure 8G:
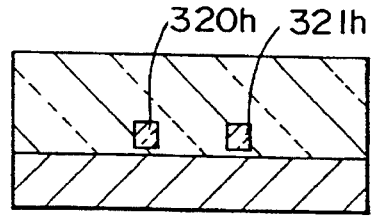
FIG. 8G is a section view of the device shown in FIG. 8A, taken along the plane indicated by the arrows G—G in the drawing.

FIG. 7 is a perspective view of this optical branching device according to another embodiment of the present invention. FIG. 8A is a section view of this device, taken along the plane indicated by the arrows H—H in the drawing. FIG. 8B is a section view of the device shown in FIG. 8A, taken along the plane indicated by the arrows B—B in the drawing. FIG. 8C is a section view of the device shown in FIG. 8A, taken along the plane indicated by the arrows C—C in the drawing. FIG. 8D is a section view of the device shown in FIG. 8A, taken along the plane indicated by the arrows D—D in the drawing. FIG. 8E is a section view of the device shown in FIG. 8A, taken along the plane indicated by the arrows E—E in the drawing. FIG. 8F is a section view of the device shown in FIG. 8A, taken along the plane indicated by the arrows F—F in the drawing. FIG. 8G is a section view of the device shown in FIG. 8A, taken along the plane indicated by the arrows G—G in the drawing. FIG. 9 is a section view of the optical branching device shown in FIG. 8A.

The waveguide type optical branching device (optical branching device) according to the present embodiment comprises a silicon substrate 301, a cladding member 302 formed on the supporting substrate 301, a first core member (first tapered waveguide) 310, a second core member (second waveguide) 320, and a third core member (third waveguide) 321.

The first core member 310 is embedded in the cladding member 302. The second core member 320 is embedded in the cladding member 302 as well. Also, the second core member 320 has a second edge face 320c facing the edge face 311c of the first core member 310 at a first space. The third core member 321 is also embedded in the cladding member 302. The third core member 321 has a third edge face 321c facing the edge face 311c of the first core member 310 at a second space.

The cladding member 302 (cladding 302, cladding layer 302) has a first surface 302a. The first surface 302a is parallel to the main surface 301a of the substrate 301. "Direction of the width" is defined to be the direction perpendicular to both the direction perpendicular to the first surface 302a, and to the direction of light propagation. "Direction of the thickness" is defined to be the direction perpendicular to the first surface 302a. The first core member 310 has a light transmission path 312 of given width and thickness, and a core section 311, which is contiguous with the light transmission path 312, of a tapered type whose width increases with distance from the light transmission path 12. The width 312 of the light transmission path 312 is defined by the distance between the side 312a and side 312b in FIG. 8A.

The first core member 310 has a first perpendicular section 312d which is defined by intersection with a first plane (plane indicated by the arrows B—B in FIG. 8A) which is perpendicular to the first surface 302a. The first core member 310 has a second perpendicular section 312e which is defined by intersection with a second plane (plane indicated by the arrows C—C in FIG. 8A) perpendicular to the first surface 302a and located between the fist edge face 311c and first plane (B—B plane). The first core member 310 has a first horizontal section (310a in FIG. 8A) which is defined by intersection with a third plane (plane indicated the arrows H—H in FIG. 7) parallel to the first surface 302a.

The second core member 320 has a third perpendicular section 320e which is defined by intersection with a fourth plane (plane indicated by the arrows E—E in FIG. 8A) which is perpendicular to the first surface 302a. The second core member 320 has a second horizontal section (320f in FIG. 8A) which is defined by intersection with the third plane (H—H plane).

The third core member 321 has a fourth perpendicular section 321e which is defined by intersection with the fourth plane (E—E plane). The third core member 321 has a third horizontal section 321f which is defined by intersection with the third plane (H—H plane).

In other words, the branch waveguide assembly shown in FIGS. 7–9 comprises a substrate 1, a first tapered waveguide 310, a second waveguide 320 and a third waveguide 321.

The second core member 320 tapers toward the first core member 310. The third core member 321 tapers toward the first core member 310 as well. In addition, the distance between the second core member 320 and third core member 321 lowers toward the first core member 310. In this optical branching device, the first core member 310 is a first multimode waveguide 310, while the second core member 320 is a first single mode waveguide 320, and the third core member 321 is a second single mode waveguide 321. The first core member 310 comprises a tapered waveguide 311.

Since both the second core member 320 and third core member 321 are tapered, if the space between the second core member 320 and third core member 321 is constant, the optical axis of the second core member 320 at the second edge face 320c, and the optical axis of the third core member 321 at the third edge face 321c may be situated closely.

Accordingly, at the second edge face 320c of the second core member 320, the light transmitted in this second core member 320 has an electric field distribution in the radial direction of the core 320. The peak position of the electric field distribution (the first peak position) corresponds to the position of the axis of the second core member 320. At the third edge face 321c of the third core member 321, the light transmitted in this third core member 321c has an electric field distribution in the radial direction of the core 321. The peak position of the electric field distribution (the second peak position) corresponds to the position of the axis of the third core member 321. With the first peak and the second peak situated closely, improvements are obtained in the coupling efficiency of the light transmitted between the first core member 310 and second core member 320 as well as in the coupling efficiency of the light transmitted between the first core member 310 and third core member 321. As a result, according to the present invention, it is possible to input guided light which has been branched or coupled, with a minimum loss at the branching section.

The second core member 320 comprises a second edge face 320c, third perpendicular section (320e) and second horizontal section 320f.

The second edge face 320c opposes the first edge face 311c of the first core member (first tapered waveguide) 310. The third perpendicular section 320e is defined by intersection with a fourth plane (E—E plane) perpendicular to the first surface 302a. The second horizontal section 320f is defined by intersection with the third plane (H—H plane). Here, since the second core member 320 tapers, the area of the second edge face 320c is smaller than the area of the third perpendicular section 320e. The second core member 320 comprises a section 320h which is defined by intersection with the plane (G—G plane) parallel to the fourth plane. The third perpendicular section 320e is situated between the interface 320c and the section 320h. The area of the section 320h is larger than the area of the third perpendicular section 320e.

The third core member 321 is embedded in the cladding member 302. The third core member 321 comprises a third edge face 321c, fourth perpendicular section 321e and third horizontal section 321f. The third edge face (interface) 321c opposes the first edge face 311c of the first core member 310. The fourth perpendicular section 321e is defined by intersection of the third core member 321 with a fourth plane (E—E plane). The third horizontal section 321f is defined by intersection of the third core member 321 with the third plate (H—H). As the third core member 321 tapers, the area of the third edge face 321c is smaller than the area of the fourth perpendicular section 321e. The third core member 321 comprises a section 321h which is defined by intersection with the plane (G—G plane) parallel to the fourth plane (E—E). The fourth perpendicular section 321e is situated between the interface 321c and the section 321h. The area of the section 321h is larger than the area of the fourth perpendicular section 321e.

The substrate 301 has a substrate surface 301a.

The first tapered waveguide 310 is formed on the substrate surface 301a, and has a first edge face 311c. The second waveguide 320 is formed on the substrate surface 301a. The second waveguide 320 has an interface 320c with the first edge face 311c, a first side 320a including a plane crossing the substrate surface 301a, and a second side 320b facing the first side 320a.

The third waveguide 321 is formed on the substrate surface 301a. The third waveguide 321 has an interface 321c with the first edge face 311c, a third side 321a including the place crossing the substrate surface 301a, and a fourth side 321b facing the third side 321a. The fourth side 321b is located between the first side 320a and the third side 321a. The first side 320a is located between the second side 320b and the fourth side 321b.

The width of the first edge face 311c is identical to the length of the first edge face 311c along the direction (direction of the width) perpendicular to both the direction of the normal to the substrate surface 301a (direction of the thickness), and the direction of the normal to the first edge face 311c (direction of the optical axis). The width (Wt) of the first edge face 311c is greater than the distance between the second side 320c and the third side 321c.

The first core member 310 is located so that the light input into the first core member 310 through the interface 312c is propagated in the direction along the first horizontal section 310a across the first perpendicular section 312d and second perpendicular section 312e, and output from the first edge face 311c.

The second core member is located so that the light output from the first edge face 311c is input into the second core member 320 through the second interface 320c, and is propagated in the direction along the second horizontal section 320f across the third perpendicular section 320e, and output at the second edge face 320d of the second core member 320.

The third core member 321 is located so that the light output from the first edge face 311c is input into the third core member 321 through the third edge face 321c, and is propagated in the direction along the third horizontal section 321f across the fourth perpendicular section 321e, and output from the third core member 321.

In this connection, the area of the first edge face 311c is larger than the area of the first perpendicular section 312d. This is because the first core member 310 has a tapered section 311 which diverges toward the direction of the second and third core members 320, 321. The tapered section 311 has sides 311a, 311b which forms given angles with the optical axis OP 310 (center line) of the first core member 310.

In other words, the intersections 311a, 311b between the two sides perpendicular to the first surface 302a of the tapered section (tapered waveguide) 311, and the third plane (H—H plane) form given angles with the optical axis OP310 (center line ) of the first core member 310 in the third plane.

As the first core member 310 comprises the tapered section 311, the density of the energy (power) of the optical signal input into the first core member 310 at the edge face (fourth edge face) 312c decreases gradually as the light travels passing through the first perpendicular section 312d toward the first edge face 311c.

The light output from the edge face 311c of the first core member 310 is input into the second core member 320 at the interface 320c, and into the third core member 321 at the third edge face 321c.

The first edge face 311c of the optical branching device according to the present embodiment is perpendicular to the direction of movement of the light passing through the first edge face. Accordingly, the second edge face 320c is perpendicular to the direction of movement of the incident light to the second edge face 320c. The third edge face 321c is perpendicular to the direction of movement of the incident light to the third edge face 321c. As a result, the first edge face 311c is opposite to the second edge face 320c, whereas the first edge face 311c is parallel to the second edge face 320c. The first edge face 311c is opposite to the third edge face 321c, whereas the first edge face 311c is parallel to the third edge face 321c.

The second core member 320 has sides 320a, 320b perpendicular to the first surface 302a. The side 320a and side 320b are parallel to the direction of movement of the light propagated in the second core member 320. In this connection, the side 320a and side 320b faces each other, while the side 320a and side 320b runs in parallel with each other. Accordingly, the sides 320a and side 320b are perpendicular to both the first surface 320a and the second edge face 320b.

Similarly, the third core member 321 has sides 321a, 321b which are perpendicular to the first surface 302a. The side 321a and side 321b are parallel to the direction of movement of the light propagated in the third core member 321. In turn, the side 321a and side 321b are opposite to each other, whereas the side 321a and side 321b are parallel to each other. Thus, the side 321a and side 321b are perpendicular to both the first surface 302a and third edge face 321c.

The second waveguide 320 comprises a waveguide of constant width 320x which have a given width and a waveguide of variable width 320y which is contiguous with this waveguide of constant width 320x. The waveguide of variable width 320y tapers toward the first edge face 311c. The width of the waveguide of variable width 320y preferably ranges from ½ to ⅘ the width of the waveguide of constant width.

The third waveguide 321 comprises a waveguide of constant width 321x which have a given width and a waveguide of variable width 321y which is contiguous with this waveguide of constant width 321x. The waveguide of variable width 321y tapers toward the first edge face 311c. The width of the waveguide of variable width 321y preferably ranges from ½ to ⅘ the width of the waveguide of constant width.

An intersection (cross line) 320i is an intersection of the second edge face 320c and second side face 320b. An intersection (cross line) 321i is an intersection of the third edge face 321c and third side face 321a.

An intersection (cross line) 320j is an intersection of the second edge face 320c and first side face 320a. An intersection (cross line) 321j is an intersection of the third edge face 321c and fourth side face 321b. An intersection (cross line) 311i is an intersection of the first edge face 311c and the side face 311b. An intersection (cross line) 311j is an intersection of the first edge face 311c and the side face 311a. The distance between the line 311i and line 311j is Wt (μm), the distance between the line 320i and line 321j is (2W+A) (μm), distance Wt is greater than (2W+A). The distance (A) is defined by the space between the second core member 320 and third core member 321. More precisely, the distance (A) is defined by the distance between the line 320j and line 321j.

The distance between the second core member 320 and the third core member 321 increases with distance from the first core member 310 does. This is because the second core member 320 comprises bent sides 330a, 330b bending apart from the third core member 321. The bent side 330a is contiguous with the plane 320a, whereas the bent side 330b with the plane 320b. The curvature radius of the bent side 330a is R, and also the curvature radius of the bent side 330b approximates R. The third core member 321 has bent sides 331a, 331b bending apart from the second core member 320. The bent side 331a is adjacent to the plane 321a, whereas the bent side 331b to the plane 321b. The curvature radius of the bent side 331a is R, and also the curvature radius of the bent side 331b approximates R. The second core member 320 and the third core member 321 are S-shaped waveguides.

Figure 10:
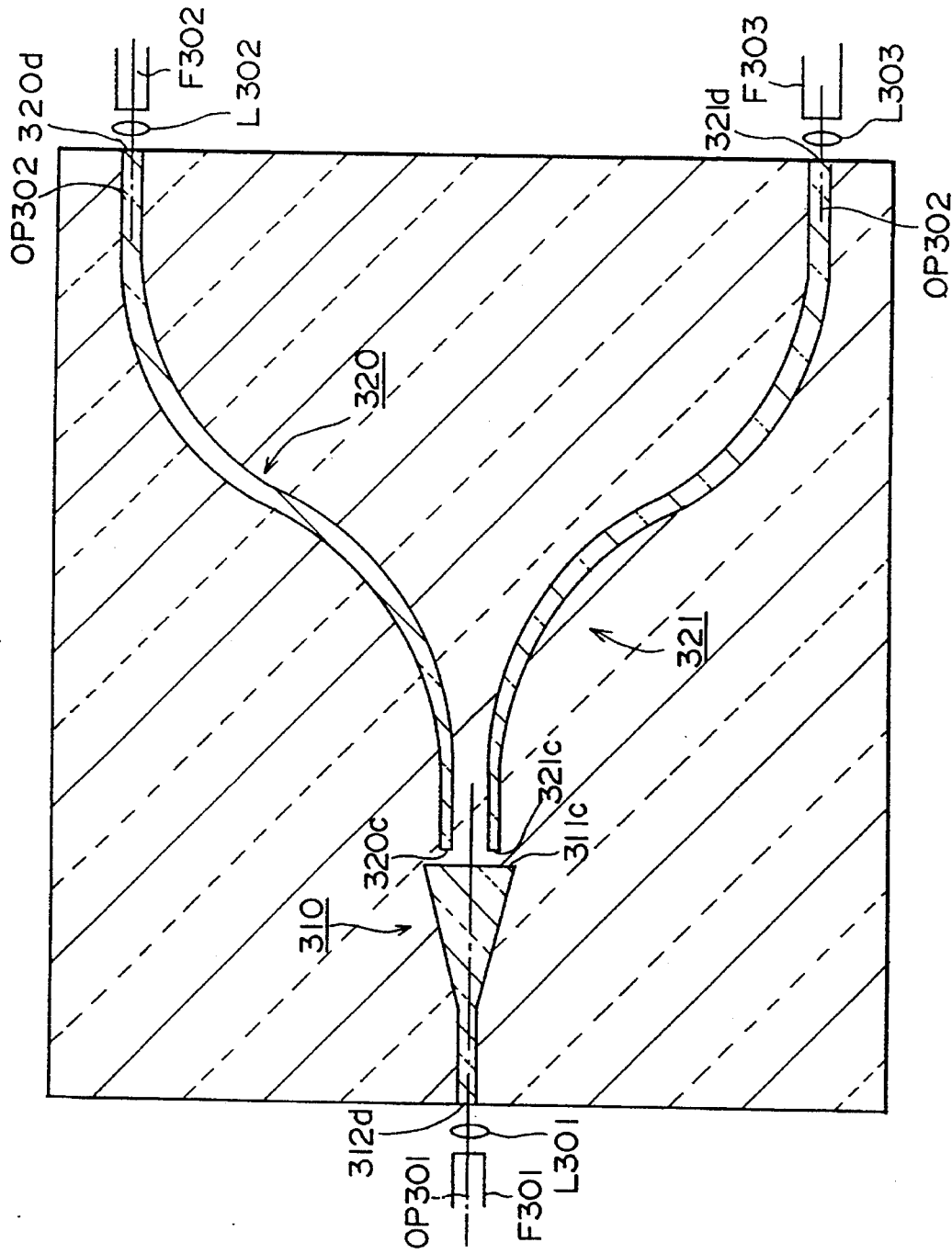
FIG. 10 is a section view of a modification of the optical branching device shown in FIG. 8A with improvements made on the edges 320d, 321d of the second core member 320 and third core member 321.

The light output from the second edge face 320c and input into the second core member 320 is then output through the edge face 320d of the second core member 320. The light output from the third edge face 321c and input into the third core member 321 is then output through the edge face 321d of the third core member 321. In this connection, the optical distance from the input edge face 320c to the output edge face 320d of the second core member 320 is equal to the optical distance between the input edge face 321c and the output edge face 321d of the third core member 321. As a result, in cases where light input from the first core member 310 into the core members 320, 321 are output from the core members 320, 321, the beams of the light branched by the core members 320, 321 are in the same phase upon output from the edge faces 320d, 321d. Since the beams of the output light from the edge faces 320d, 321d are in one phase, the phase matching of the respective beams are easy to perform for coupling of the output light, etc. FIG. 10 shows a modification of the optical branching device shown in FIG. 8A with improvements made on the edge faces 320d, 321d of the second core member 320 and third core member 321. The edge faces 320d, 321d of the optical branching device shown in FIG. 8A is exposed. The direction of the normal to the exposed edge face 320d forms a given angle with the direction of movement of the light (direction of the optical axis) propagated in the third core member 321. Also, the direction of the normal to the exposed edge face 321d forms a given angle with the direction of movement of the light propagated in the third core member 321. As mentioned above, the present inventors have noted, based on their previous research, that for the improvement in coupling efficiency of light propagated between two optical components it is effective to make the opposing edge faces of the respective optical components perpendicular to the direction of light propagation (direction of the optical axis).

Considering the above-noted fact, as shown in FIG. 10, the optical branching device according to the present embodiment is positioned so that the output edge face 320d of the second core member 320 is perpendicular to the optical axis OP302 (indicated by an alternating long and short dash line) of the second core member 320. Optical fiber F302 is located opposite to the edge face 320d of the second core member 320 via a lens L302. Additionally, the third core member 321 is located so that the output edge face 321d of the third core member 321 is perpendicular to the optical axis OP303 (indicated by an alternating long and short dash line) of the third core member 321. Optical fiber F303 is located opposite to the edge face 321d of the third core member 321 via a lens L303. Additionally, the first core member 310 is located so that the input edge face 312c of the first core member 310 is perpendicular to the optical axis OP301 (indicated by an alternating long and short dash line) of the first core member 321. Optical fiber F301 is located opposite to the edge face 312c of the first core member 310 via a lens L301.

Figure 11:
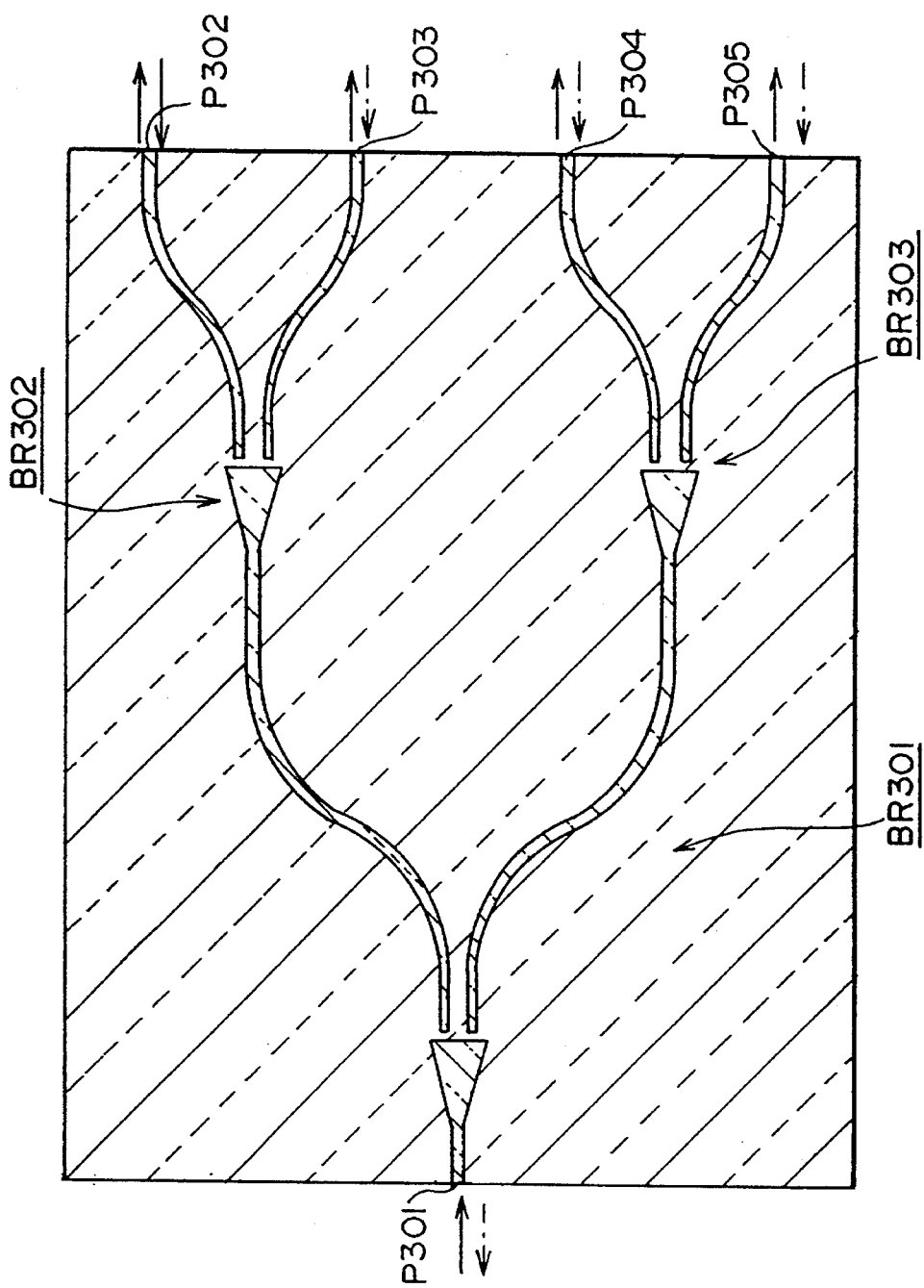
FIG. 11 is a section view of an optical branching device assembly with a 1×4 structure which consists of 3 connected optical branching devices BR301, BR302 and BR303 of the type shown in FIG. 10.

FIG. 11 is an optical branching device assembly with a 1×4 structure which consists of 3 connected optical branching devices BR1, BR2 and BR3 of the type shown in FIG. 4. This optical branching device assembly comprises the first optical branching device BR301, the second optical branching device BR302 whose input edge face 312c is connected to the output edge face 320d of the first optical branching device BR301, and the third optical branching device BR303 whose input edge face 312c is connected to the output edge face 321d of the first optical branching device BR301. Thus, an end of the S-shaped waveguide comprises the tapered waveguide.

The optical signal (indicated by a solid arrow in the drawing) input into the first optical branching device BR301 through the edge face P301 is divided with this optical branching device, and output through the edge faces P302, P303 of the second optical branching device BR302, and through the edge faces P304, P305 of the third optical branching device BR303. Conversely, the respective optical signals (indicated by alternating long and short dash arrows) input at the edge faces P302–P305 are coupled with the optical branching device, and output from the edge face P301.

Figure 12:
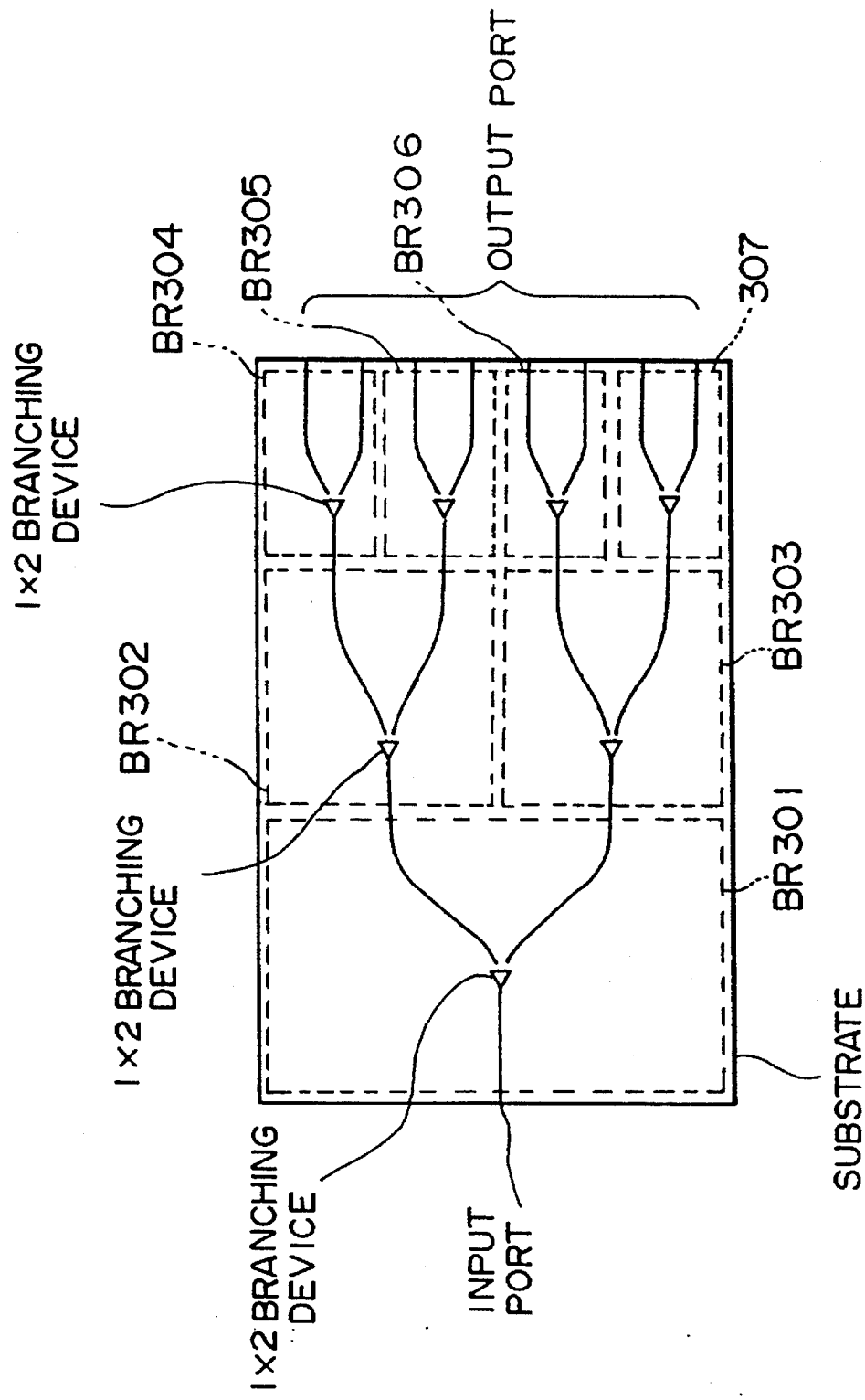
FIG. 12 is a section view of an optical branching assembly with a 1×8 structure which consists of 7 connected optical branching devices BR301, BR302, BR303, BR304, BR305, BR306 and BR307 of the type shown in FIG. 10.

FIG. 12 is an optical branching device assembly with a 1×8 structure which consists of 7 connected optical branching devices BR301, BR302, BR303, BR304, BR305, BR306 and BR307 of the type shown in FIG. 4. This optical branching device assembly comprises the first optical branching device BR301 with an input edge face (input port), the second optical branching device BR302 whose input edge face 312c is connected to the output edge face 320d of the first optical branching device BR301, and the third optical branching device BR303 whose input edge face 312c is connected to the output edge face 321d of the first optical branching device BR301.

In addition, this optical branching device assembly comprises the fourth optical branching device BR304 whose input edge face 312c is connected to the output edge face 320d of the second optical branching device BR302, the fifth optical branching device BR305 whose input edge face 312c is connected to the output edge face 321d of the second optical branching device BR302, the sixth optical branching device BR306 whose input edge face 312c is connected to the output edge face 320d of the third optical branching device BR303, and the seventh optical branching device BR307 whose input edge face 312c is connected to the output edge face 321d of the third optical branching device BR303.

Accordingly, this optical branching device assembly may branch single light beam input into the assembly, into eight beams, and reversely may couple eight beams input into this assembly, into single beam. In this connection, all the optical branching devices BR301, BR302, BR303, BR304, BR305, BR306, and BR307 are formed on the same substrate 1.

For comparison with the present embodiment, the device of FIG. 28 (Comparison) is explained.

The device of FIG. 28 (Comparison) comprises a linear single mode waveguide 1011 formed on the substrate 1001, a multimode tapered waveguide 1012 connected thereto, and single mode waveguides 1020, 1021 as branches facing the edge face of the tapered waveguide 1012 at a space A. The device shown in FIG. 28 differs from the device of the present embodiment regarding the widths of the optical waveguides 320, 321.

The Y-shaped device of the present embodiment differs from the Y-shaped device of FIG. 27 in that the former has a branching structure where the tapered waveguide 311 is separated from the branch waveguides 320, 321. With this aspect, need for the sharp gap section 80 shown in FIG. 27 is eliminated, and this elimination facilitates the processing of the branching section. As a result, the optical branching device of the present embodiment may be prepared in high yields on a large scale for the construction of a large scale communication system, etc.

The branch waveguide 1020, 1021 of the device of FIG. 28 has a constant width (=W1), whereas the device of the present embodiment comprises the branch waveguides 320, 321 having smaller terminal widths than the widths of the proximal ends 320, 321x.

For the foregoing reasons, at the branching section of the device of the present embodiment, the electric field distribution of the terminals 320c, 321c of the branch waveguides 320, 321 match the electric field distribution of the terminal 311c of the multimode waveguide 311.

For a detailed explanation, at such points as the branching section of the optical branching device of the present embodiment which is susceptible to undergo drastic changes in the shape of the waveguide, with a greater coupling efficiency of the electric field distribution of guided light, at the terminal 311c of the multimode waveguide 311, and the terminals 320c, 321c of the branch waveguides 320, 321, the loss of guide light due to branching or coupling becomes less.

Figure 13A:
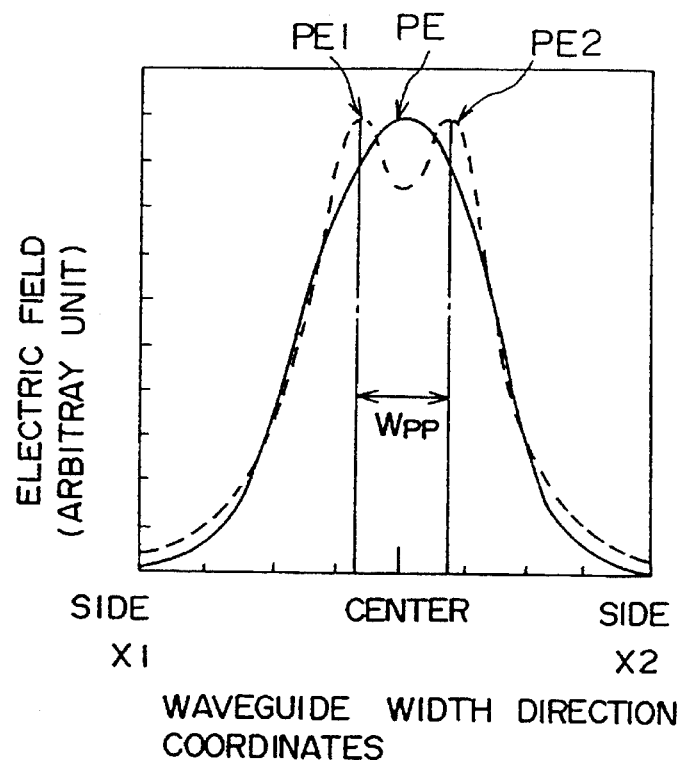
FIG. 13A is a graph showing the electric field distribution of guided light at the terminal of the first core member 310 or at the coordinate Y1 and the electric field distribution of guided light at the terminals of the second and third core members 320, 321 or at the coordinate Y2, shown in FIG. 13B.
Figure 13B:
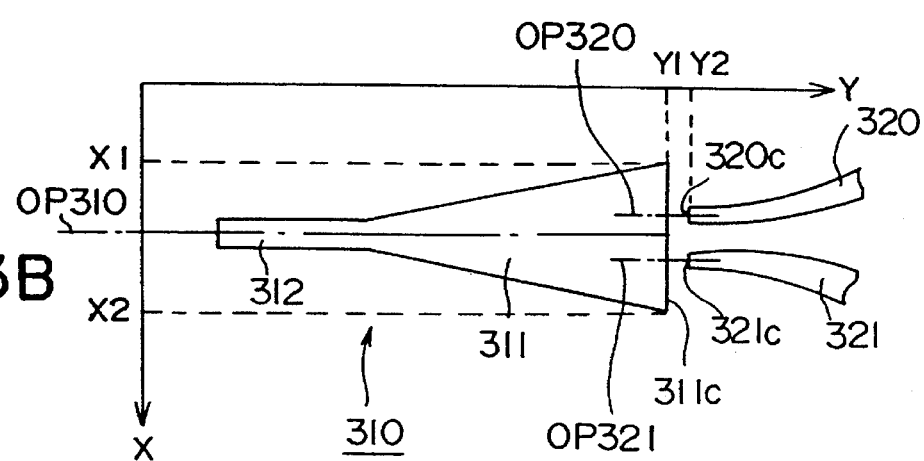
FIG. 13B is an extractive illustration of FIGS. 7–9, with coordinate axes, which shows only the first core member 310, second core member 320 and third core member 321 of the optical branching device shown in FIGS. 7–9.

FIG. 13B is an extractive illustration of FIGS. 7–9, which shows only the first core member 310, second core member 320 and third core member 321 of the optical branching device assembly shown in FIGS. 7–9. FIG. 13B includes coordinate axes. FIG. 13A is a graph showing the electric field distribution of guided light at the terminal of the first core member 310 or at the coordinate Y1, and the electric field distribution of guided light at the terminals of the second and third core members 320, 321 or at the coordinate Y2, shown in FIG. 13B. In FIG. 13A, the electric field distribution of guided light at the coordinate Y1 is shown by a solid line, whereas the electric field distribution of guided light at the coordinate Y2, by a dotted line. The coordinates X1 and X2 shown in FIG. 13A correspond to the position coordinates X1 and X2 of FIG. 13B. Here "guided light" means light propagated through the core members 310, 320 and 321 of the optical branching device in question. Here, the widths of the terminals 320c, 321c of the second and third core members 320, 321 are half the widths of the terminals 1020c, 1021c of the second and third core members 1020, 1021 shown in FIG. 28, respectively.

Each electric field distribution shown in FIG. 13A is normalized for power with the optical power carried over each guided mode set at 1. Here, it is assumed that excitation is effected only in the lowest mode in either of the non-branch waveguide 310 and branch waveguides 320, 321. The electric field distribution after optical branching is determined by synthesis of the electric field distributions for the respective branch waveguides 320, 321.

Figure 30A:
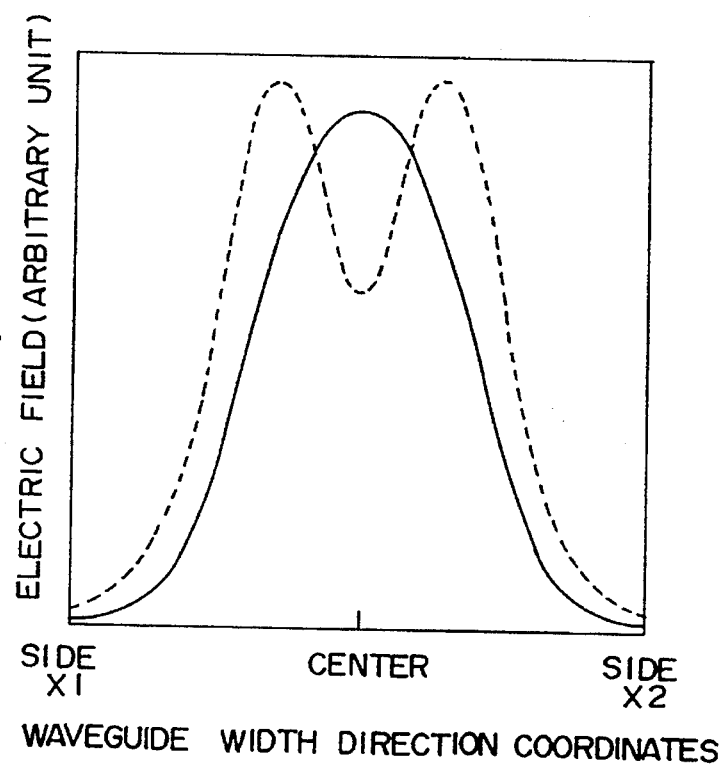
FIG. 30A is a graph showing the electric field distribution of guided light at the terminal of the first core member 1010 or at the coordinate Y1 and the electric field distribution of guided light at the terminals of the second and third core members 1020, 1021 or at the coordinate Y2, shown in FIG. 30B.

FIG. 30A shows the electric field distribution of the comparison optical branching device assembly shown in FIG. 28. In the optical branching device assembly shown in FIG. 28, the terminal width (Wt) of the tapered waveguide 1012 added to the straight waveguide 1011 is equal to the total (2W+A) of the subtotal (2W) of the widths of the branch waveguides 1020, 1021 (each W), and the distance (A) between the branch waveguides 1020, 1021 at the branching section.

Figure 30B:
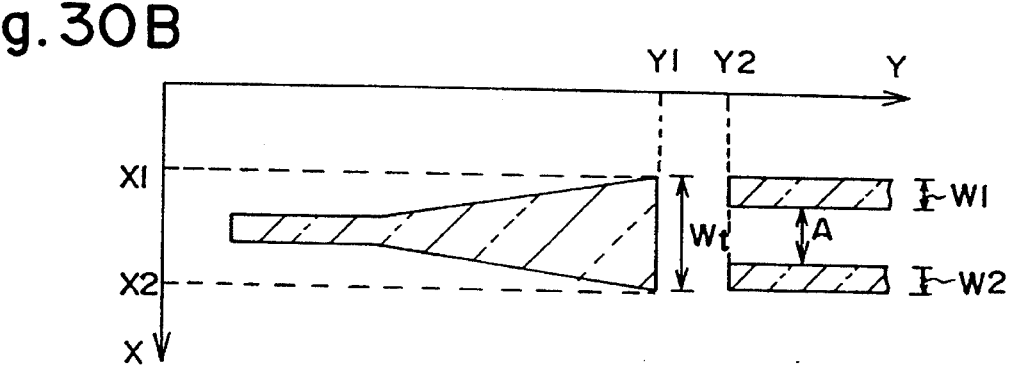
FIG. 30B is an extractive illustration of FIG. 28, with coordinate axes, which shows only the first core member 1010, second core member 1020 and third core member 1021 of the optical branching device shown in FIG. 28.

FIG. 30B is an extractive illustration of FIG. 28, which shows only the first core member 1010, second core member 1020 and third core member 1021 of the optical branching device assembly shown in FIG. 28. FIG. 30B includes coordinate axes.

FIG. 30A is a graph showing the electric field distribution of guided light at the terminal of the first core member 1010 or at the coordinate Y1, and the electric field distribution of guided light at the terminals of the second and third core members 1020, 1021 or at the coordinate Y2, shown in FIG. 30B. In FIG. 30A, the electric field distribution of guided light at the coordinate Y1 is shown by a solid line, whereas the electric field distribution of guided light at the coordinate Y2, by a dotted line. The coordinates X1 and X2 shown in FIG. 30A correspond to the position coordinates X1 and X2 in FIG. 30B, respectively. Here "guided light" means light propagated through the core members 1010, 1020 and 1021 of the optical branching device in question. Each distribution shown in FIG. 30A is shown normalized so that the optical power is set at 1. Here, it is assumed that excitation is effected only in the lowest mode in either of the non-branch waveguide 1010 and branch waveguides 1020, 1021. The widths of the branch waveguides 1020, 1021 are constant. The electric field distribution after optical branching is determined by synthesis of the electric field distributions of the respective branch waveguides 1020, 1021.

Apparently form FIG. 13A, with the second core member 320 tapering toward the first edge face 311c and the third core member 321 tapering toward the first edge face 311c, the electric field distribution at the terminals 320c, 321c of the second core material 320 and third core material 321 overlaps the electric field distribution at the terminal 311c of the tapered waveguide 311 to a higher degree than with the optical branching device shown in FIG. 28. In short, the overlapping area of the electric fields before and after the optical branching increases. For the foregoing reasons, the coupling efficiency defined by the overlap integral of electric field distributions increases. Thus, the radiation of guided light through the branch waveguides 320, 321 is suppressed, and the loss of light upon optical branching lowers as compared with the case of using the comparison waveguide type optical branching device.

As is apparent form FIG. 13A, with smaller widths of the terminals 320c, 321c of the branch waveguides 320, 321 than the widths of the proximal ends 320x, 321x, the distance between the centers of the branch waveguides 320, 321 (between the optical axes) is shortened, and the two peaks PE1, PE2 of the electric field distributions (dotted line) at the side of the branch waveguides 320, 321 come close, and match the electric field distribution at the side of the multimode waveguide 311 to a satisfactory extent.

Thus, the area of the overlapping portions of the electric fields increases, and the coupling efficiency defined by the overlap integral of the electric field distribution at the side of the branch waveguides 320, 321 and at the side of the multimode waveguide 311 is improved. Consequently, output of guided light after branching or coupling may be performed with a minimum coupling loss at the branching section.

In other words, at the second edge face 320c of the second core member 320, the light transmitted in this second core member has an electric field distribution in the radial direction of the core 320. The peak position of the electric field distribution (position of first peak PE1) corresponds to the position of the axis OP320 of the second core member 320. At the third edge face 321c of the third core member 321, the light transmitted in this third core member 321c has an electric field distribution in the radial direction of the core 321. The peak position of the electric field distribution (position of second peak PE2) corresponds to the position of the axis OP321 of the third core member 321. With the first peak and the second peak situated closely, improvements are obtained in the coupling efficiency of the light transmitted between the first core member 310 and second core member 320 as well as in the coupling efficiency of the light transmitted between the first core member 310 and third core member 321. As a result, according to the present invention, it is possible to input guided light which has been branched or coupled, with a minimum loss at the branching section.

On the other hand, with the device of FIG. 28 without branch waveguides 320, 321 of reduced terminal widths, in order to locate the electric field distribution of the branch waveguides closer to the electric field distribution of the multimode waveguide, it may occur that the distance between the branch waveguides 1020, 1021 (=A) be made shorter to shorten the distance between the centers of waveguide waveguides 1020, 1021. However, excessive shortening of the distance may lower the processing stability, and yields.

To achieve prevention of reduction in yields while ensuring satisfactory processing stability and lower loss, preferably the distance between the second waveguide 320 and the third waveguide 321 is 2–4 μm.

In contrast to the comparison, the Y-shaped device of the embodiment of the invention is constructed in such a manner that the widths of the terminals 320c, 321c of the branch waveguides 320, 321 are smaller than the widths of the proximal ends 320x, 321x. Accordingly, it is possible to reduce the distance between the centers of the waveguides 320, 321 (between the centers of the cores of the device), without shortening the distance between the branch waveguides 320, 321. The distance between the second waveguide 320 and the third waveguide 321, as short as 2–4 μm, facilitates the processing.

As compared with the optical branching device shown in FIG. 28, the optical branching device of the present embodiment, provides a lower loss of guide light when branched or coupled.

Next, an explanation will be made of an optical branching device according to an embodiment of the present invention.

Figure 16:
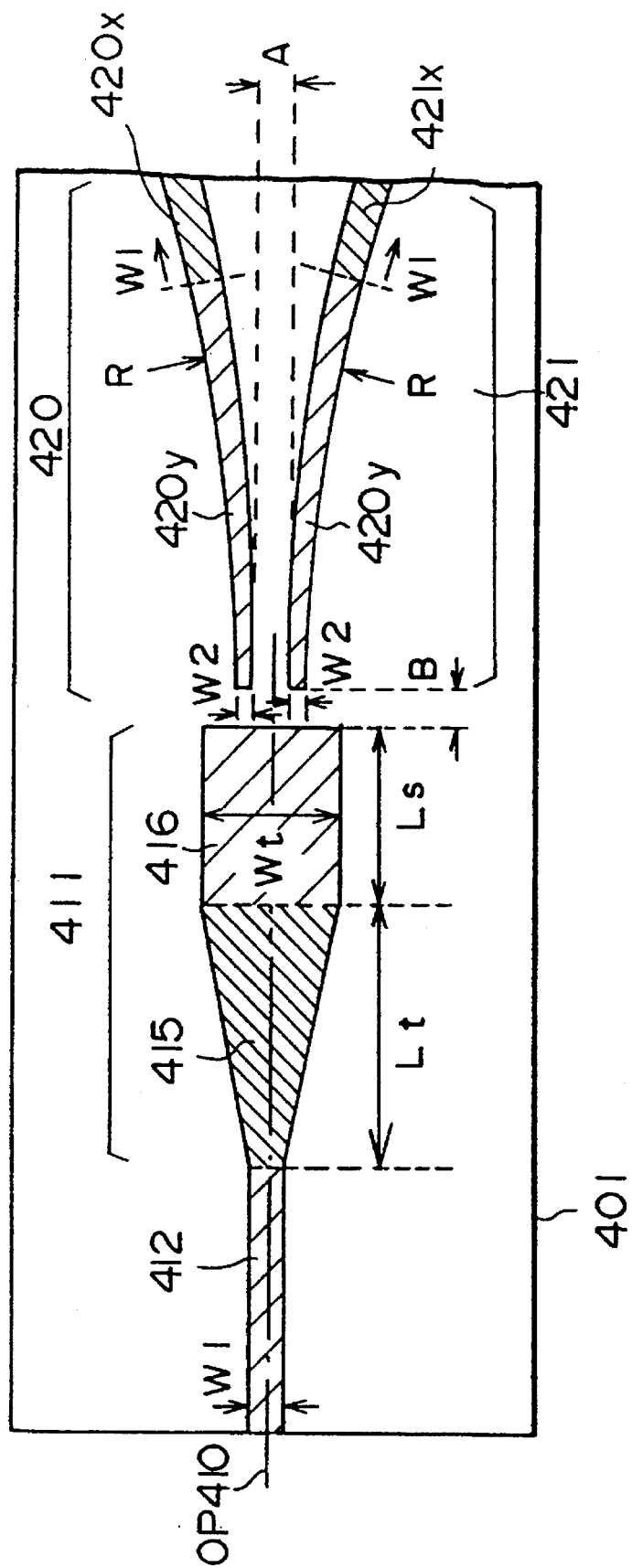
FIG. 16 is an illustration of the optical branching device shown in FIG. 15A.

FIG. 14 is a perspective view of an optical branching device according to an embodiment of the present invention. FIG. 15A is a section view of this device, taken along the plane indicated by the arrows H—H in FIG. 14. FIG. 15B is a section view of the device shown in FIG. 15A, taken along the plane indicated by the arrows B—B in the drawing. FIG. 15C is a section view of the device shown in FIG. 15A, taken along the plane indicated by the arrows C—C in the drawing. FIG. 15D is a section view, of the device shown in FIG. 15A, taken along the plane indicated by the arrows D—D in the drawing. FIG. 15E is a section view of the device shown in FIG. 15A, taken along the plane indicated by the arrows E—E in the drawing. FIG. 15F is a section view of the device shown in FIG. 15A, taken along the plane indicated by the arrows F—F in the drawing. FIG. 15G is a section view of the device shown in FIG. 15A, taken along the plane indicated by the arrows G—G in the drawing. FIG. 16 is a section view of the device shown in FIG. 15A.

As shown in FIGS. 14–16, this Y-shaped device comprises a tapered section of a terminal width Wt to which a straight section 416 with a width Wt and a length Ls is connected. With this configuration, in the case where guided light is transmitted from the tapered waveguide 411 to the branch waveguides, the guided light may be input into the branch waveguides 420, 421, after the wave front which has spread radially through the tapered section 415, is restored to a plane.

This restoration contributes to a further reduction of the loss upon optical branching, by suppressing the radiation of the guided light at the site which has no opposing edge faces of the waveguides due to the reduced terminal widths of the branch waveguides 420, 421; this site is produced because now the edge face of the tapered waveguide 412 is wider than the total of the terminal widths of the branch waveguides 420, 421, and the space between the branch waveguides 420, 421.

This waveguide type optical branching device is constructed with such a structure that to the terminal 411c of the tapered waveguide 411 (first tapered waveguide) is added a straight section 411 of roughly the same width as of the terminal 311c of the tapered section 411.

With this structure, the guided light whose wave front has spread radially in the tapered section 115 may be input into branch waveguides 120, 121 after being restored to a plane.

FIG. 31 illustrates the manner of travelling of the wave front. The above-noted restoration contributes to suppression of the radiation (reflection, diffraction) of guided light at the section of the edge face of the tapered waveguide 411 near the branching section which is provided for increasing the terminal width (the section having a width larger than the total of the terminal widths of the branch waveguides 420, 421, and the distance between the branch waveguides 420, 421), thereby enabling a further reduction in the radiation loss at the branching section.

An input means IM shown in FIG. 31, comprises: a light source IM1, an optical fiber IM2 so arranged that a light beam IM4 output from the light source IM1 enters thereto, and a lens IM3 so arranged that a light IM5 output from the optical fiber IM2 enters thereto. A light IM6 output from the lens IM3 enters into the first core member 410 through the forth edge face 412d of the first core member 410. The light IM6 travels through the first core member 410, and outputs from the first edge face 411c. A light IM7 output from the first edge face 411c inputs into the second core member 420 through the second edge face 420c. A light IM8 output from the first edge face 411c inputs into the third core member 421 through the third edge face 421c. A light IM9 output from the second core member 420 inputs into a first optical detector OM1, and is detected with the first detector OM1. A light IM10 output from the third core member 421 inputs into a second optical detector, and is detected with the second optical detector.

A more detailed explanation will be made regarding the optical branching device according to the present embodiment.

As FIGS. 14–16 shows, the optical branching device according to the present embodiment comprises a silicon substrate 401, a cladding member 402 formed on the supporting substrate 401, a first core member 410, a second core member 420, and a third core member 421.

The first core member 410 is embedded in the cladding member 402. The second core member 420 is embedded in the cladding member 402 as well. Also, the second core member 420 has a second edge face 420c facing the edge face 411c of the first core member 410 at a first space B. The third core member 421 is also embedded in the cladding member 402. The third core member 421 has a third edge face 421c facing the edge face 411c of the first core member 410 at a second space B. Here, the first space B and the second space B are designed to be identical. The space B(1) between the edge faces 411c and 420c, and the space B(2) between the edge faces 411c and 421c have a following equation.

$$B(2)-\lambda \leq B(1) \leq B(2)+\lambda,$$

where λ is wavelength of the guided light traveling through the core member 410. Then the space B(1) is substantially equal to B(2). The wavelength λ of the guided light using in present embodiment is 1.55 μm. In other words, the first space B(1) is not greater than the total of the space of said second space B(2) and the wavelength (λ) of the light propagated in said second core member 420, and not smaller than the difference between said second space B(2) and the wavelength (λ) of the light propagated in said second core member 420.

The cladding member 402 (cladding 402, cladding layer 402) has a first surface 402a. The first surface 402a is parallel to the main surface 401a of the substrate 401. The main surface 401a is defined by the interface between the cladding member 402 and substrate 401. "Direction of the width" is defined to be the direction perpendicular to both the direction perpendicular to the first surface 402a, and to the direction of light propagation. "Direction of the thickness" is defined to be the direction perpendicular to the first surface 402a. The first core member 410 has a light transmission path 412 of given width and thickness, a core section 415, which is contiguous with the light transmission path 412, of a tapered type whose width increases as the distance from the light transmission path 112 does, and a second core section 416 adjacent to the core section 415.

The width 412 of the light transmission path 412 is defined by the distance between the side 412a and side 412b in FIG. 15A.

The first core member 410 has a fifth perpendicular section 412d which is defined by intersection with a plane (plane indicated by the arrows B—B in FIG. 15A) which is perpendicular to the first surface 402a.

The first core member 410 has a first perpendicular section 412e which is defined by intersection with a first plane (plane indicated by the arrows C—C in FIG. 15A) perpendicular to the first surface 402a.

The first core member 410 has a second perpendicular section 416c which is defined by intersection with a second plane (plane indicated by the arrows G—G in FIG. 15A) perpendicular to the first surface 402a and located between the first edge face 411c and first plane (B—B plane).

The first core member 410 has a first horizontal section (410a in FIG. 15A) which is defined by intersection with a third plane (plane indicated the arrows H—H in FIG. 14) parallel to the first surface 402a.

The second core member 420 has a third perpendicular section 420e which is defined by intersection with a fourth plane (plane indicated by the arrows E—E in FIG. 15A) which is perpendicular to the first surface 402a. The second core member 420 has a second horizontal section (420f in FIG. 15A) which is defined by intersection with the third plane (H—H plane). The third core member 421 has a fourth perpendicular section 421e which is defined by intersection with the fourth plane (E—E plane). The third core member 421 has a third horizontal section 421f which is defined by intersection with the third plane (H—H plane).

The first core member 410 is located so that the light input into the first core member 410 through the edge face 412c is propagated in the direction along the first horizontal section 410a across the first perpendicular section 412e and second perpendicular section 416c, and output from the first edge face 411c.

Here, it is assumed that the sections are parallel to the first edge face 411c, and perpendicular to the direction of movement of guided light.

The second core member 420 is located so that the output light from the first edge face 411c is input into the second core member 420 through the second edge face 420c, and is propagated in the direction along the second horizontal section 120f across the third perpendicular section 420e, and output at the second edge face 420d of the second core member 420. The third core member 421 is located so that the output light from the first edge face is input into the third core member 421 through the third edge face 421c, and is propagated in the direction along the third horizontal section 421f across the fourth perpendicular section 421e, and output from the third core member 421.

In this connection, the area of the first edge face 411c is larger than the area of the first perpendicular section 412e. This is because the first core member 410 has a tapered section 415 which diverges toward the direction of the second and third core members 420, 421. The tapered section 415 has sides 415a, 415b which form given angles with the optical axis OP410 (center line) of the first core member 410.

In other words, the intersections 415a, 415b between the two sides 415a, 415b perpendicular to the first surface 402a of the section (liner waveguide) 415, and the third plane (H—H plane) form given angles with the optical axis OP410 (center line ) of the first core member 410 in the third plane.

In other words, this branch waveguide comprises a substrate 401 with a substrate surface 401a, a first tapered waveguide 410, a second waveguide 420 and a third waveguide 421.

The first tapered waveguide 410 comprises a forth waveguide 416, and a second tapered waveguide 415 which is contiguous therewith. The first tapered waveguide 410 is formed on the substrate surface 401a.

The forth waveguide 416 has a first edge face 411c including a plane which crosses the substrate surface 401a, a fifth side 416a including a plane which crosses the substrate surface 401a, and a sixth side 111c parallel to the fifth side 416a.

The second tapered waveguide 415 is contiguous with the forth waveguide (straight waveguide) 416. The second tapered waveguide 415 diverges toward the forth waveguide 416. The second waveguide 420 is formed on the substrate surface 401a. The second waveguide 420 has a second edge face 420c facing the first edge face 411c at a given space.

The third waveguide 421 is formed on the substrate surface 401a. The third waveguide 421 has a third edge face 421c facing the first edge face 411c at a given space. As the first core member comprises the tapered section 415, the density of the energy (power) of the optical signal input into the first core member 410 at the edge face 412c decreases gradually as the light travels passing through the first perpendicular section 412d toward the first edge face 411c.

The output light from the edge face 411c of the first core member 410 is input into the second core member 420 through the second edge face 420c, and into the third core member 421 through the third edge face 421c. The present inventors have found, based on their previous research, that for the improvement in coupling efficiency of light propagated between two optical components it is effective to make the opposing edge faces of the respective optical components perpendicular to the direction of light propagation. The first edge face 411c of the optical branching device according to the present embodiment is perpendicular to the direction of movement of the light passing through the first edge face 411c. Also, the second edge face 420c is perpendicular to the direction of movement of the incident light to the second edge face 420c. The third edge face 121c is perpendicular to the direction of movement of the incident light to the third edge face 421c. As a result, the first edge face 411c is opposite to the second edge face 420c, whereas the first edge face 411c is parallel to the second edge face 420c. The first edge face 411c is opposite to the third edge face 421c, whereas the first edge face 411c is parallel to the, third edge face 421c.

For a further improvement in the optical coupling efficiency of the optical branching device, the area of the second perpendicular section 416c is made identical to the area of the first edge face 411c for the optical branching device according to the present embodiment. In other words, the width of the second perpendicular section 416c is identical to the width (Wt) of the first section 111c.

More particularly, as shown in FIG. 15, the light input into the first core member 410 gradually loses its optical power density (energy density) as it travels from the first perpendicular section 412e to the first edge face 411c, while the wave front of the light fans out in the first horizontal section 410a. In the case where the area of this second perpendicular section 116c is equal to the area of the first edge face 411c, the wave front becomes parallel to the first edge face during its propagation from the second perpendicular section 416c to the first edge face 411c.

As a result, the directivity of the light output from the first edge face 411c is increased, which results in an increased coupling efficiency of the light entering the second core member 420 and third core member 421.

In addition, as the second edge face 420c and third edge face 421c are parallel to the wave front WA2 leaving the first edge face 411c, the optical coupling efficiency is increased.

In summary, the first core member 410 has the first edge face 411c which aids in lowering the energy density of the input light, and is in the form which makes the wave front WA1 of the light parallel to the first edge face 411c for its exit through the first edge face 411c. The second core member 420 has the second edge face 420c facing the first edge face 411c at a given space, and the third core member 421c has a third edge face 421c facing the first edge face 411c at a given space (B).

The light travels through the light transmission path (core) 412 of a given width (core size). The light transmission path 412c is a part of the first core member 410 which is adjacent to the tapered waveguide 415, and has the same sectional area as the minimum sectional area of the first perpendicular section 412e.

The second core member 420 has sides 420a, 420b perpendicular to the first surface 402a. The side 420a and side 420b are parallel to the direction of movement of the light propagated in the second core member 420. In this connection, the side 420a and side 420b faces each other, while the side 420a and side 420b run in parallel with each other. Accordingly, the sides 420a and side 420b are perpendicular to both the first surface 420a and the second edge face 420b.

Similarly, the third core member 421 has sides 421a, 421b which are perpendicular to the first surface 402a. The side 421a and side 421b are parallel to the direction of movement of the light propagated in the third core member 421. In turn, the side 421a and side 421b are opposite to each other, whereas the side 421a and side 421b are parallel to each other. Thus, the side 421a and side 421b are perpendicular to both the first surface 402a and third edge face 421c.

The space between the second core member 420 and the third core member 421 increases as their distance from the first core member 410 does. This is because the second core member 420 comprises bent sides 430a, 430b bending apart from the third core member 421. The bent side 430a is contiguous with the plane 120a, whereas the bent side 130b to the plane 420b. The curvature radius of the bent side 430a is R, and also the curvature radius of the bent side 430b is almost R. The third core member 421 has bent sides 431a, 431b bending apart from the second core member 420. The bent side 131a is adjacent to the plane 421a, whereas the bent side 431b to the plane 421b. The curvature radius of the bent side 431a is R, and also the curvature radius of the bent side 431b is almost R.

The light output from the second edge face 420c and input into the second core member 420 is then output through the edge face 420d of the second core member 420. The light output from the third edge face 421c and input into the third core member 421 is then output through the edge face 421d of the third core member 421. In this connection, the optical distance from the input edge face 420c to the output edge face 420d of the second core member 420 is equal to the optical distance between the input edge face 421c and the output edge face 421d of the third core member 421. As a result, in cases where beams of the light input from the first core member 410 into the core members 420, 421 are output from the core members 420, 421, the beams of the light branched by the core members 420, 421 are in the same phase upon output from the edge faces 420d, 421d. Since the beams of the output light from the edge faces 420d, 421d are in one phase, the phase matching of the respective beams are easy to perform for coupling of the output light, etc.

An intersection (cross line) 420i is an intersection of the second edge face 420c and second side face 420b. An intersection (cross line) 421i is an intersection of the third edge face 421c and third side face 421a.

An intersection (cross line) 420j is an intersection of the second edge face 420c and first side face 420a. An intersection (cross line) 421j is an intersection of the third edge face 421c and fourth side face 421b. An intersection (cross line) 411i is an intersection of the first edge face 411c and the side face 416b. An intersection (cross line) 411j is an intersection of the first edge face 411c and the side face 416a. The distance between the line 411i and line 411j is Wt (μm), the distance between the line 420i and line 421j is (2W+A) (μm), distance Wt is greater than (2W+A). The distance (A) is defined by the space between the second core member 420 and third core member 421. More precisely, the distance (A) is defined by the distance between the line 420j and line 421j.

Figure 17:
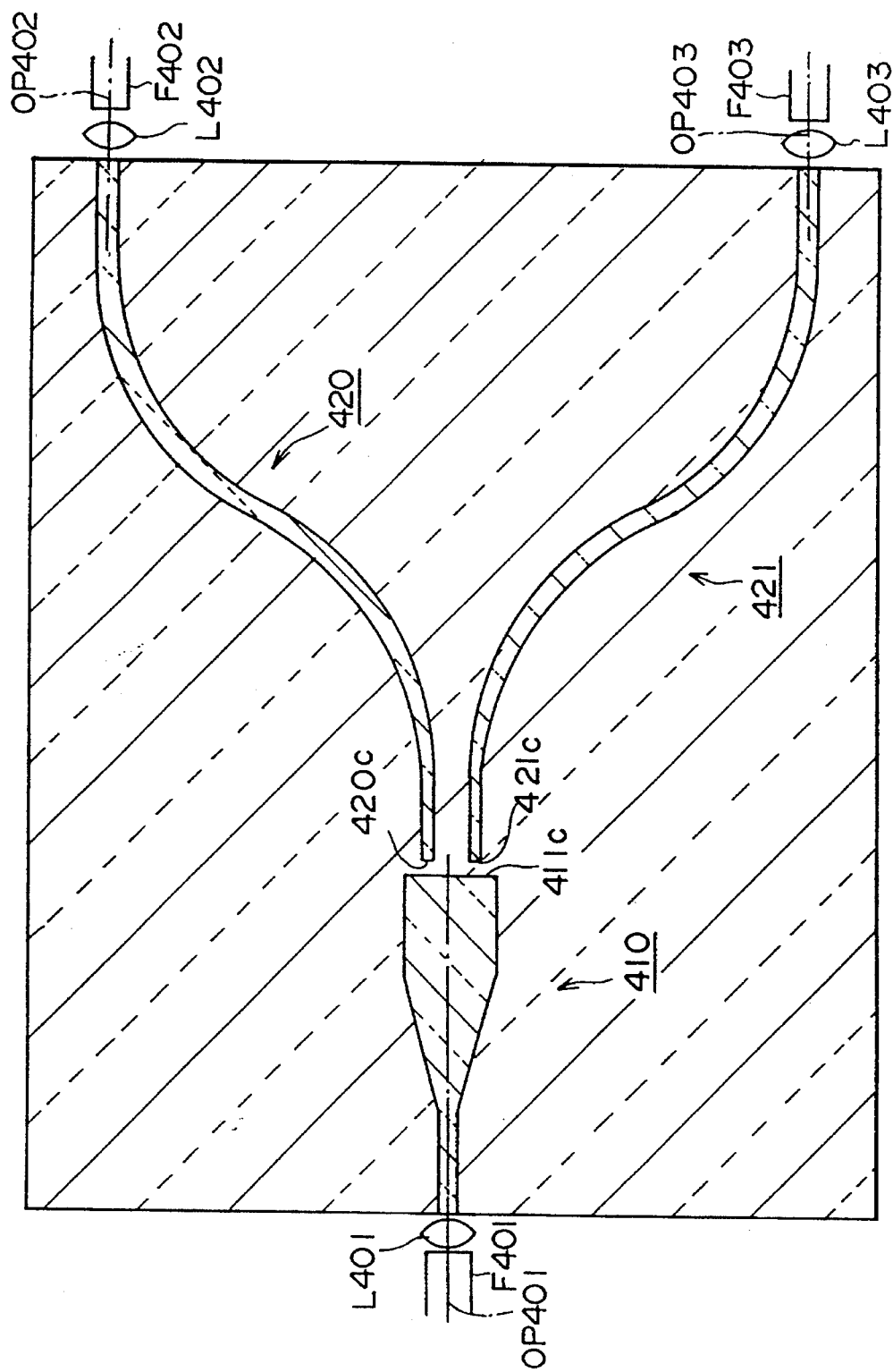
FIG. 17 is a section view of a modification of the optical branching device shown in FIG. 15A with improvements made on the edges 420d, 421d of the second core member 420 and third core member 421.

FIG. 17 shows a modification of the optical branching device shown in FIG. 15A with improvements made on the edge faces 420d, 421d of the second core member 420 and third core member 421. The edge faces 420d, 421d of the optical branching device shown in FIG. 15A is exposed. The direction of the normal to the exposed edge face 120d forms a given angle with the direction of movement of the light (direction of the optical axis) propagated in the third core member 421. Also, the direction of the normal to the exposed edge face 421d forms a given angle with the direction of movement of the light propagated in the third core member 421. More particularly, the second core member 120 and the third core member 121 are S-shaped waveguides. As mentioned above, the present inventors have noted, based on their previous research, that for the improvement in coupling efficiency of light propagated between two optical components it is effective to make the opposing edge faces of the respective optical components perpendicular to the direction of light propagation (direction of the optical axis). For this finding, as shown in FIG. 17, the optical branching device according to the present embodiment is positioned so that the output edge face 420d of the second core member 420 is perpendicular to the optical axis OP402 (indicated by an alternating long and short dash line) of the second core member 420. Optical fiber F402 is located opposite to the edge face 420d of the second core member 420 via a lens L402. Additionally, the third core member 421 is located so that the output edge face 421d of the third core member 421 is perpendicular to the optical axis OP3 (indicated by an alternating long and short dash line) of the third core member 421. Optical fiber F403 is located opposite to the edge face 121d of the third core member 121 via a lens L103. Additionally, the first core member 110 is located so that the input edge face 112c of the first core member 110 is perpendicular to the optical axis OP401 (indicated by an alternating long and short dash line) of the first core member 121. Optical fiber F101 is located opposite to the edge face 112c of the first core member 110 via a lens L101.

Figure 18:
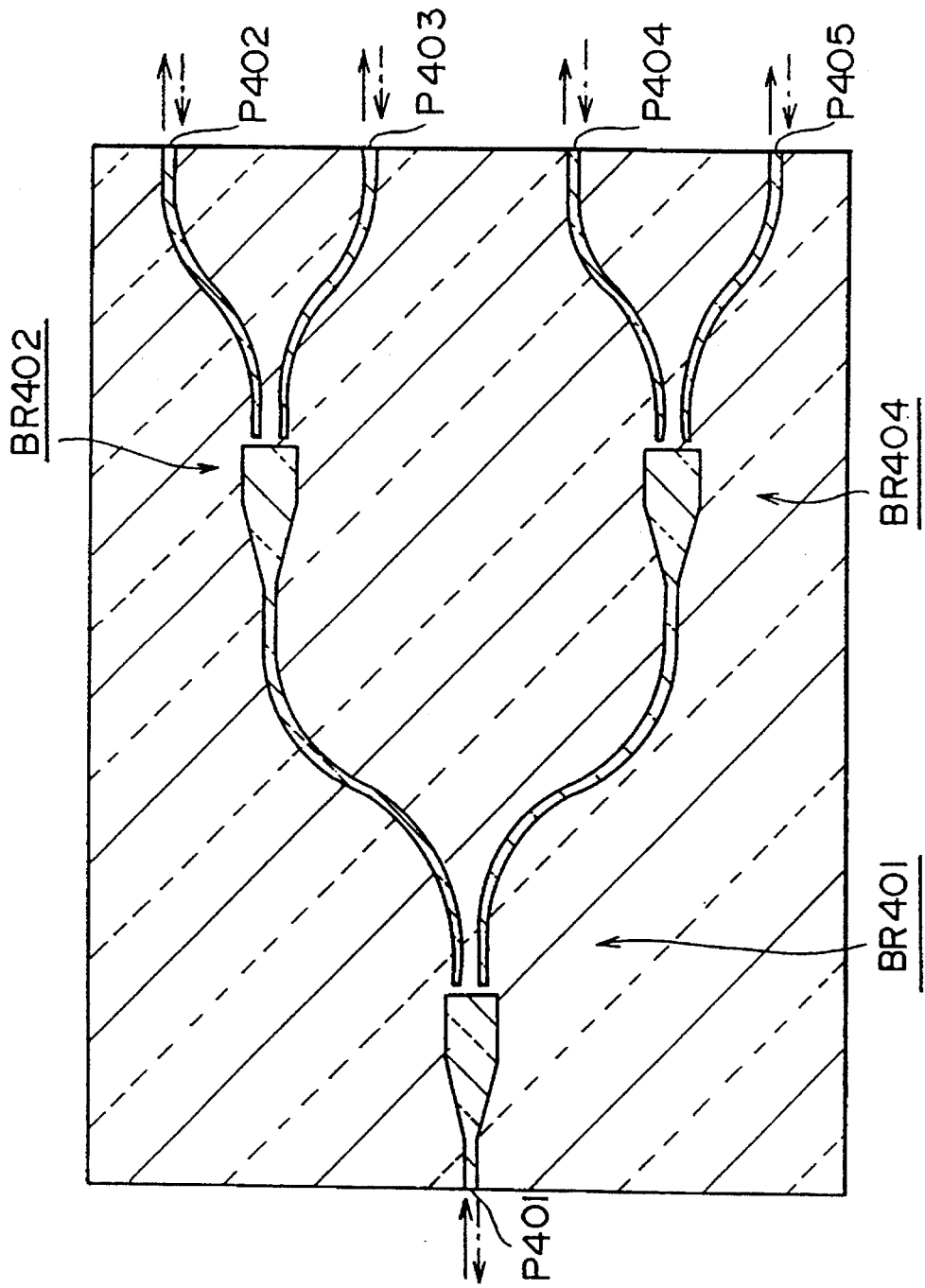
FIG. 18 is a section view of an optical branching device assembly with a 1×4 structure which consists of 3 connected optical branching devices BR401, BR402 and BR403 of the type shown in FIG. 17.

FIG. 18 is an optical branching device assembly with a 1×4 structure which consists of 3 connected optical branching devices BR401, BR402 and BR403 of the type shown in FIG. 17. This optical branching device assembly comprises the first optical branching device BR401, the second optical branching device BR402 whose input edge face 412c is connected to the output edge face 420d of the first optical branching device BR401, and the third optical branching device BR403 whose input edge face 412c is connected to the output edge face 421d of the first optical branching device BR401. The optical signal (indicated by a solid arrow in the drawing) input into the first optical branching device BR401 through the edge face P401 is divided with this optical branching device, and output through the edge faces P402, P403 of the second optical branching device BR402, and through the edge faces P404, P405 of the third optical branching device BR403. Conversely, the respective optical signals (indicated by alternating long and short dash arrows) input at the edge faces P402–P405 are coupled with the optical branching device, and output from the edge face P401.

Figure 20:
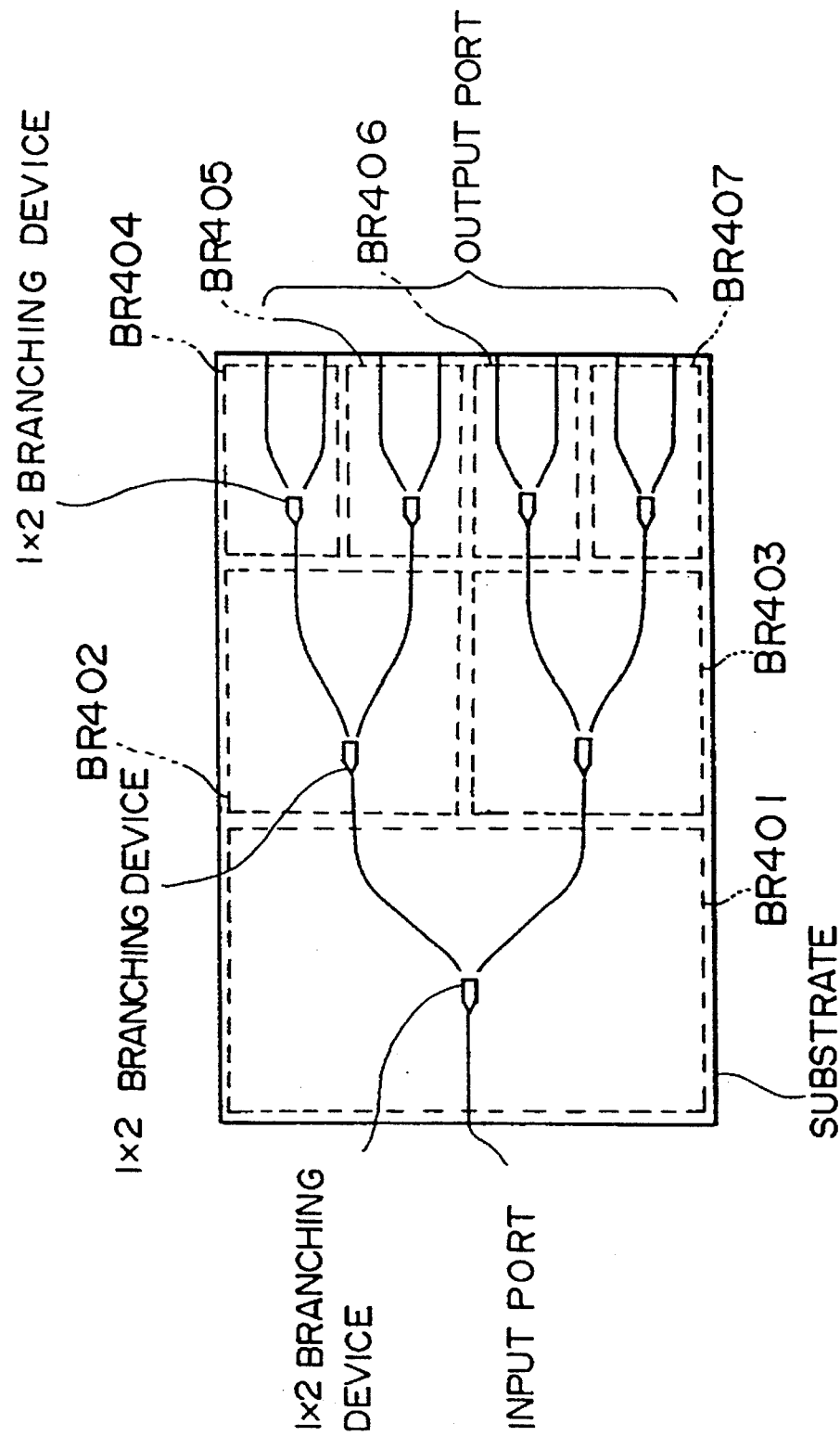
FIG. 20 shows an optical branching device assembly with a 1×8 structure which consists of 7 connected optical branching devices BR401, BR402, BR403, BR404, BR405, BR406 and BR407 of the type shown in FIG. 17.

FIG. 20 is an optical branching device assembly with a 1×8 structure which consists of 7 connected optical branching devices BR401, BR402, BR403, BR404, BR405, BR406 and BR407 of the type shown in FIG. 4. This optical branching device assembly comprises the first optical branching device BR401 with an input edge face (input port), the second optical branching device BR402 whose input edge face 412c is connected to the output edge face 420d of the first optical branching device BR401, and the third optical branching device BR403 whose input edge face 412c is connected to the output edge face 421d of the first optical branching device BR401. In addition, this optical branching device assembly comprises a fourth optical branching device BR404 whose input edge face 412c is connected to the output edge face 420d of the second optical branching device BR402, the fifth optical branching device BR405 whose input edge face 412c is connected to the output edge face 421d of the second optical branching device BR401, the sixth optical branching device BR406 whose input edge face 412c is connected to the output edge face 420d of the third optical branching device BR403, and the seventh optical branching device BR407 whose input edge face 412c is connected to the output edge face 421d of the third optical branching device BR403.

Figure 19:
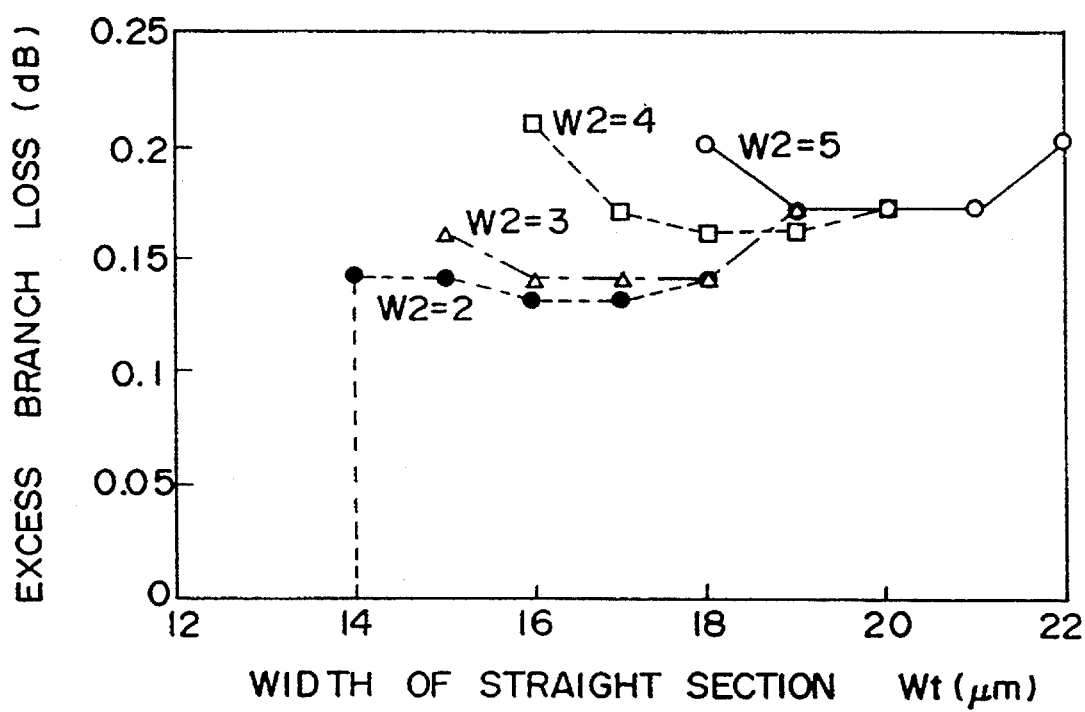
FIG. 19 is a graph showing the results of calculation of the excess branch loss of guided light at a wavelength of 1.55 µm, for the Y-shaped device according to the embodiment shown in FIGS. 14–16, using as the parameters the width (=Wt) of the straight section 416, and the terminal widths (=W2) of the branch waveguides 420, 421.

Accordingly, this optical branching device assembly may branch single light beam input into the assembly, into eight beams, and reversely may couple eight beams input into this assembly into single beam. In this connection, all the optical branching devices BR401, BR402, BR403, BR404, BR405, BR406, and BR407 are formed on the same substrate. FIG. 19 is a graph showing the results of calculation of excess branch loss for guided light at a wavelength of 1.55 μm, using as the parameters the width of the straight section 416, and the terminal widths of the branch waveguides 420, 421 (=W2), with a Y-shaped device of the present embodiment shown in FIGS. 14–16. The calculation of the excess branch loss was conducted by the beam propagation method. For this calculation, the dimensions of the respective parts shown in FIG. 16 were set as A=4 μm, B=4 μm, W1=8 μm, Lt=1200 μm, and R=50 mm, and the specific refractive index difference between the core and cladding at 0.3%. Data at the respective values of the terminal width was obtained for five samples each of the devices which had different widths (=Wt) in 1 μm intervals. From the graph of FIG. 19, it is recognized that the smaller the terminal widths (=W2) of the branch waveguides 420, 421, the smaller the width (=Wt) of the straight section 416 which provides a minimum excess branch loss, with a tendency of the minimum value itself to lower.

However, the excessively shortened terminal widths causes a lower level of function of confining the electric fields, thereby spreading the electric fields, increasing the radiation loss, and lowering the processability. According to the findings of the present inventors, in order to produce significant effects due to the reduction in the terminal widths which exceeds an increased radiation loss and to ensure satisfactory processing stability, desirably the widths of the terminals 420c, 421c of the branch waveguides 420, 421 are ½–⅘ the widths of the proximal ends 420x, 421x. Here, it is assumed that the wavelength of the guided light is about 1.3–1.55 μm. For confirmation of the effects of the Y-shaped device of the embodiment, the present inventors prepared branch waveguides with a 1×8 structure as shown in FIG. 20. The device shown in FIG. 20 is an optical component prepared by three-stepped combination of the Y-shaped device shown in FIG. 17. The transmission characteristics of the optical component shown in FIG. 20 were measured. Further, for comparison, a 1×8 device assembly comprising a three-stepped combination of the Y-shaped device shown in FIG. 28 (Comparison) was also prepared for measurement of transmission characteristics.

The 1×8 device assembly was prepared by forming a $SiO_2$ layer (cladding) on a silicon substrate 401 by the flame hydrogen deposition (FED), depositing a layer of doped, highly refractive $SiO_2$ glass thereon, etching the core, and depositing a $SiO_2$ layer as the upper cladding.

The dimensions of the respective parts of the Y-shaped device constructing the 1×8 device assembly follow, using the reference characters in FIG. 16 and FIG. 28.

A=4 μm;
B=4 μm;
W1=8 μm;
Lt=1200 μm; and
R=50 mm.

The terminal widths of the branch waveguides 420, 421 (=W2), the terminal width Wt of the straight section 416, and the length Ls of the straight section 416 were as follows: For the device of FIG. 20: W2=4 μm; Wt=18 μm; Ls=150 μm For the device of FIG. 28 (Comparison): W2=W1=8 μm; Wt =20 μm; Ls=0 μm For all the devices, the specific refractive index difference between the core and cladding was 0.3%, while the thickness of the waveguide was 8 μm. The above-noted dimensions were selected on the basis of the data shown in FIG. 19. More specifically, they were selected on the fact that the optical branching device of the above-noted dimensions provided a relatively small excess branch loss among the data at W2=4 μm shown in FIG. 19.

Laser diode light at a wavelength of 1.55 μm was input into and output from the Y-shaped devices shown in FIGS. 20, 28 for measurement of the excess branch loss (the value calculated by subtracting the total of the essential loss with a 1×8 branching structure of 9 dB, the coupling loss with the input, output fiber, and the transmission loss of the waveguide from the entire loss with the device).

The outputs from the 8 output ports of the 1×8 device assembly were averaged to determine the mean excess branch loss. As a result, the value was 1.53 dB for the 1×8 device assembly of the type shown in FIG. 28 (Comparison), whereas a mean excess branch loss of 0.80 dB was observed with the 1×8 device assembly shown in FIG. 20 (comprising the device of FIG. 14), and thus the device of the present invention demonstrated exceptionally excellent properties as compared with the comparison device. This effect is believed to have resulted from the use of the structure of branch waveguides 420, 421 with reduced terminal widths.

Figure 29:
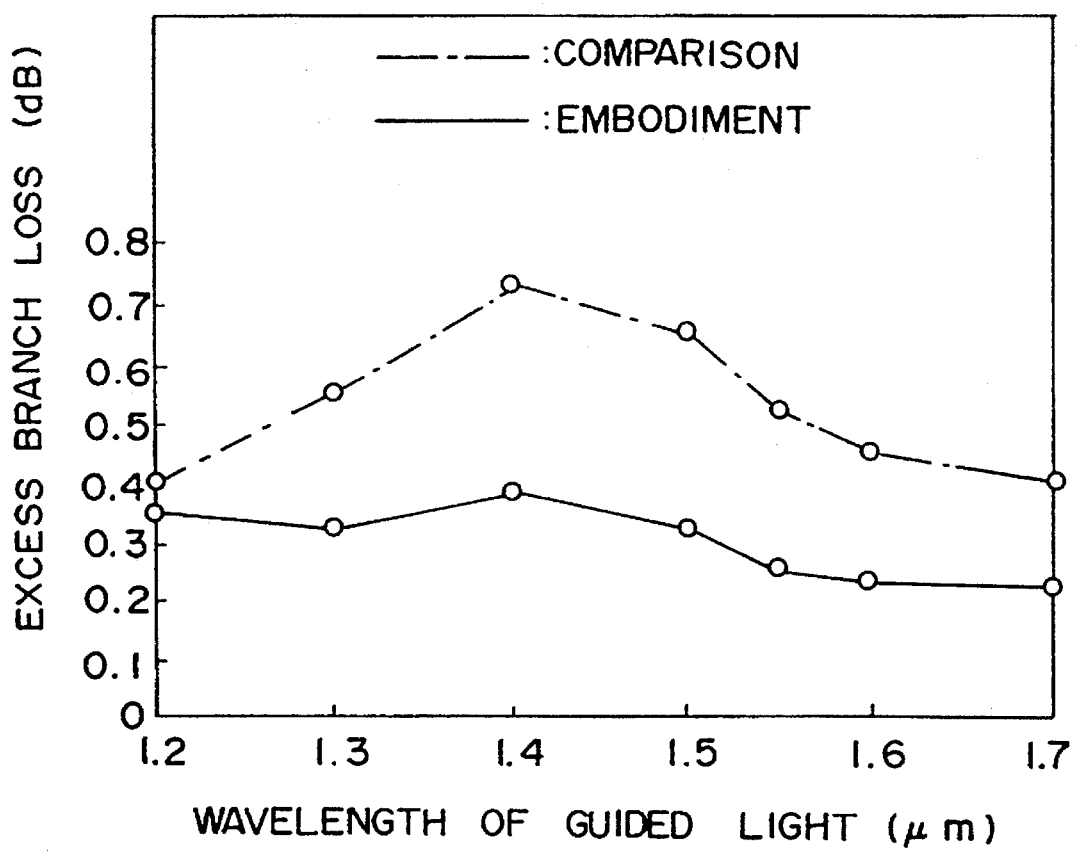
FIG. 29 is a graph showing the results of measurement of wavelength-dependency of the excess branch loss with the 1×8 device assembly shown in FIG. 20 (Embodiment), and the 1×8 device assembly shown in FIG. 28 (Comparison).

FIG. 29 is a graph showing the results of measurement of wavelength-dependency of the excess branch loss with the 1×8 device assembly of FIG. 20 (Embodiment), and another 1×8 device assembly of FIG. 28 (Comparison). Here, the excess branch loss is per branching step, and actually calculated by dividing the excess branch loss of the entire 1×8 assembly by 3.

From FIG. 29, it is apparent that the device shown in FIG. 4 (Embodiment) provides a lower loss over the full range of wavelengths, and particularly in the range of long wavelengths, the loss of light is roughly half that caused with the comparison device. It is understood that the device of the embodiment is more excellent than the comparison device over a rather wide range of wavelengths of guided light. In addition, the device of the embodiment is less susceptible to variance of the level of loss depending on the change in wavelengths of guided light. In conclusion, as compared with the comparison type, the waveguide type optical branching device according to the present invention has an additional advantage in that it may be used satisfactorily even for optical measurement systems which sweep light over a rather wide wavelength range.

Figure 21:
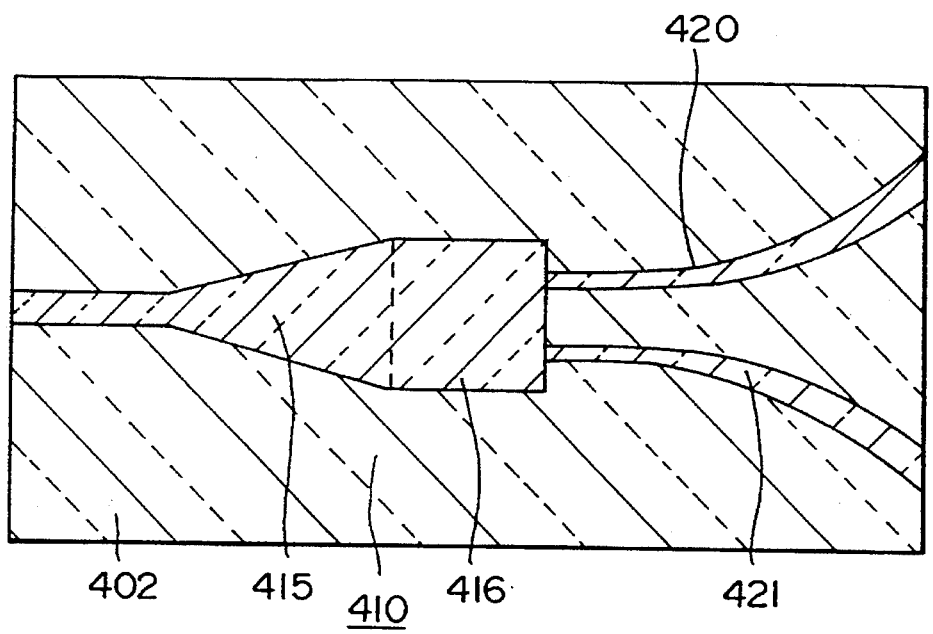
FIG. 21 is an illustration of another optical branching device of the invention wherein two branch waveguides are contiguous with a non-branch waveguide.

Incidentally, the second core member 420 and third core member 421 may be contiguous with the first core member 410, as shown in FIG. 21.

Figure 22:
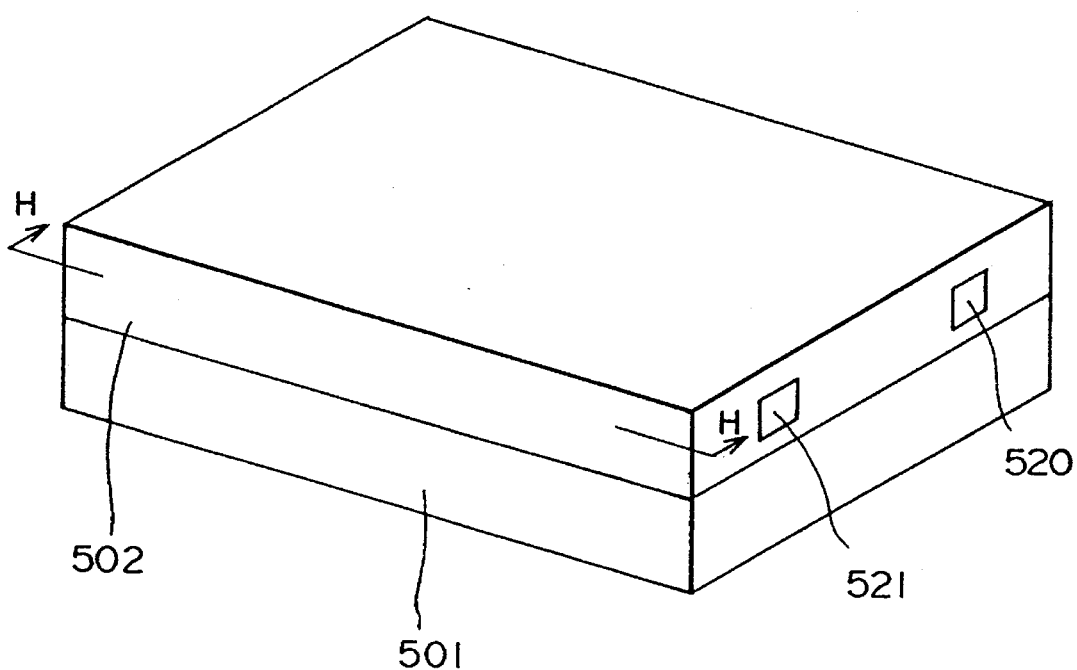
FIG. 22 is a perspective view of an directional coupler.
Figure 23:
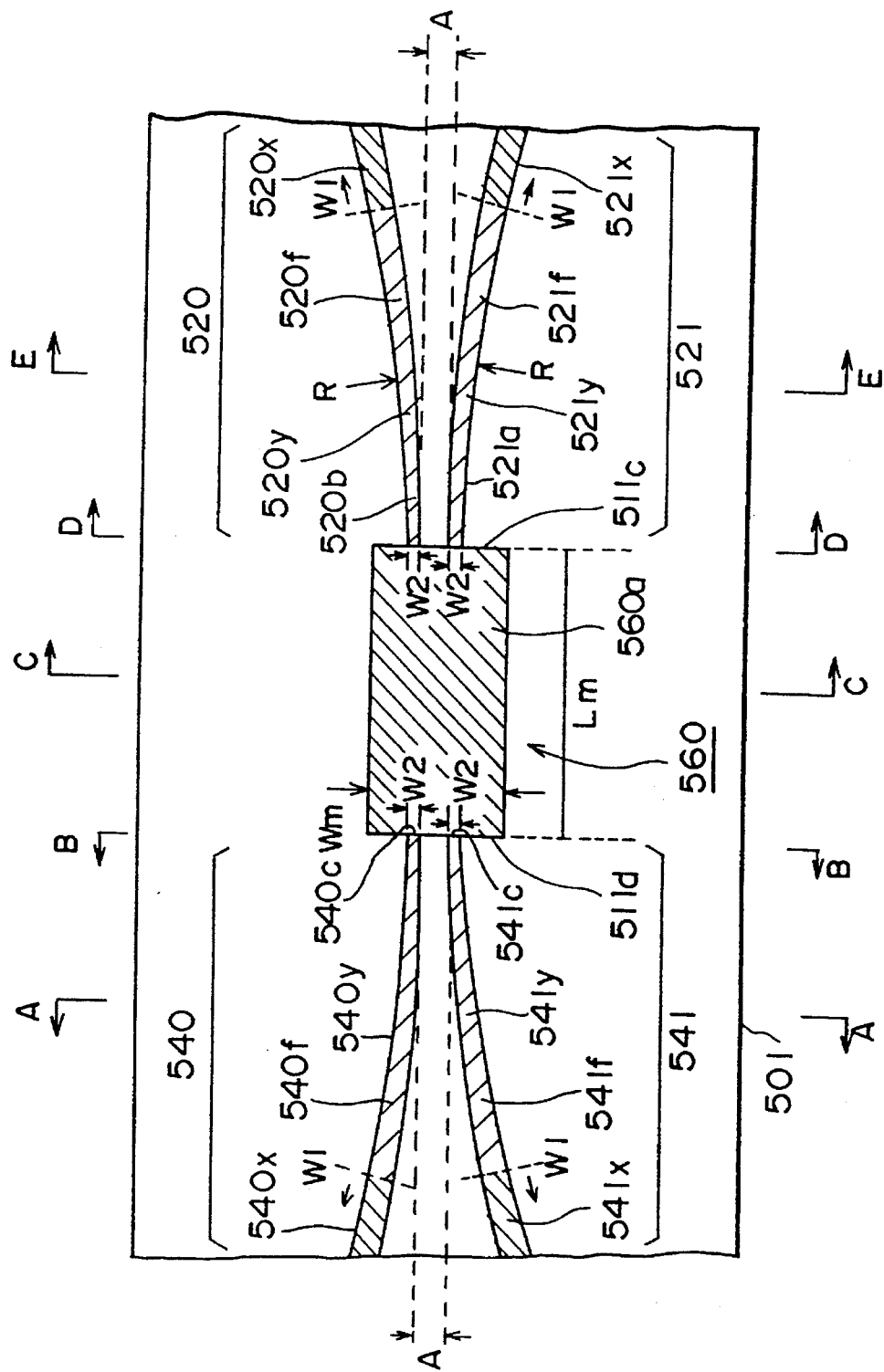
FIG. 23 is a section view of the device shown in FIG. 22, taken along the plane indicated by the arrows H—H in FIG. 22.
Figure 24A:
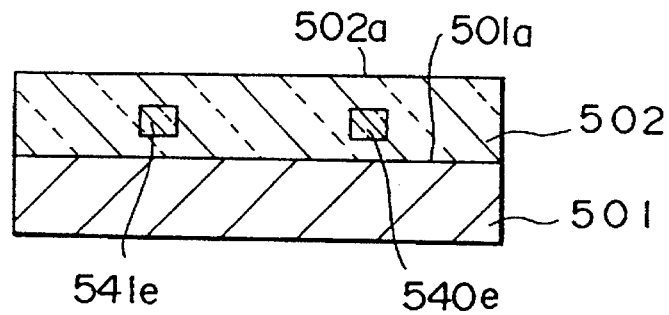
FIG. 24A is a section view of the device shown in FIG. 23, taken along the plane indicated by the arrows A—A in the drawing.
Figure 24B:
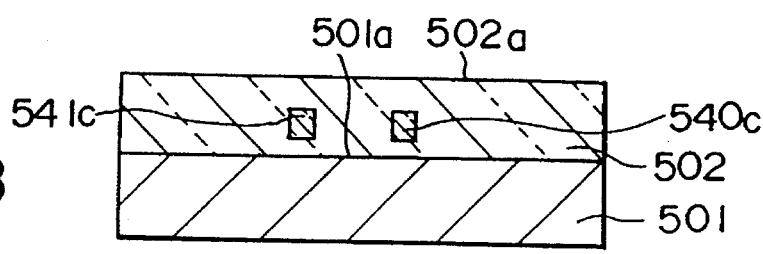
FIG. 24B is a section view of the device shown in FIG. 23, taken along the plane indicated by the arrows B—B in the drawing.
Figure 24C:
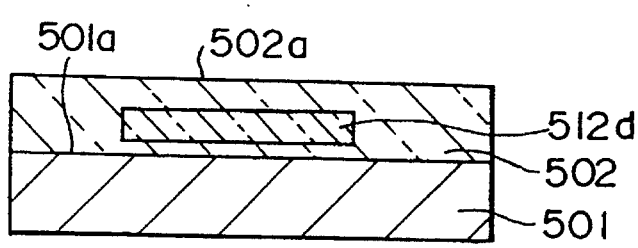
FIG. 24C is a section view of the device shown in FIG. 23, taken along the plane indicated by the arrows C—C in the drawing.
Figure 24D:
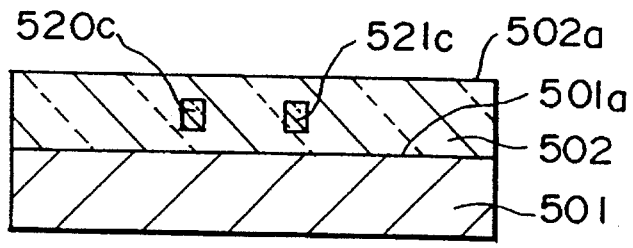
FIG. 24D is a section view of the device shown in FIG. 23, taken along the plane indicated by the arrows D—D in the drawing.
Figure 24E:
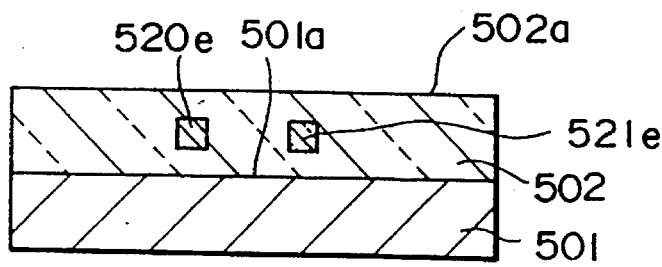
FIG. 24E is a section view of the device shown in FIG. 23, taken along the plane indicated by the arrows E—E in the drawing.

Hereunder, the directional coupler according to the present invention will be explained. FIG. 22 is a perspective view of a directional coupler according to the present invention. FIG. 23 is a section view of the device shown in FIG. 22, taken along the plane indicated by the arrows H—H in FIG. 22. FIG. 24A is a section view of the device shown in FIG. 23, taken along the plane indicated by the arrows A—A in the drawing. FIG. 24B is a section view of the device shown in FIG. 23, taken along the plane indicated by the arrows B—B in the drawing. FIG. 24C is a section view of the device shown in FIG. 23, taken along the plane indicated by the arrows C—C in the drawing. FIG. 24D is a section view of the device shown in FIG. 23, taken along the plane indicated by the arrows D—D in the drawing. FIG. 24E is a section view of the device shown in FIG. 23, taken along the plane indicated by the arrows E—E in the drawing.

The directional coupler according to the present embodiment comprises a silicon substrate 501, a cladding member 502 formed on the supporting substrate 501, a first core member 560, a second core member (second waveguide) 520, and a third core member (third waveguide) 521.

The first core member 560 is embedded in the cladding member 502. The second core member 520 is embedded in the cladding member 502. The second core member 520 comprises an interface (second edge face) 520c which is contiguous with the first edge face 511c of the first core member 560. The third core member 521 is also embedded in the cladding member 502. The third core member 521 comprises an interface (third edge face) 521c which is contiguous with the first edge face 511c of the first core member 560.

The first core member 510 comprises a fourth edge face 511d facing the first edge face 511c.

The fourth core member 540 is embedded in the cladding member 502. The fourth core member 540 comprises an interface (fifth edge face) which is contiguous with the fourth edge face 511c of the first core member 560. Also, the fifth core member 502 is embedded in the cladding member 502. The fifth core member 541 comprises an interface 521c (sixth edge face) which is contiguous with the fourth edge face 511d of the first core member 560.

The cladding member 502 (cladding 502, cladding layer 502) has a first surface 502a. The first surface 502a is parallel to the main surface 501a of the substrate 501. "Direction of the width" is defined to be the direction perpendicular to both the direction perpendicular to the first surface 502a, and to the direction of light propagation. "Direction of the thickness" is defined to be the direction perpendicular to the first surface 502a. The first core member 560 has given width and thickness.

The first core member 560 has a first perpendicular section 512d which is defined by intersection with a first plane (plane indicated by the arrows B—B in FIG. 23) which is perpendicular to the first surface 502a. The width of the first perpendicular section 512d is constant.

The first core member 560 has a first horizontal section (560a in FIG. 23) which is defined by intersection with a third plane (plane indicated the arrows H—H in FIG. 22) parallel to the first surface 502a.

The second core member 520 has a third perpendicular section 520e which is defined by intersection with a fourth plane (plane indicated by the arrows E—E in FIG. 23) which is perpendicular to the first surface 102a. The second core member 520 has a second horizontal section (520f in FIG. 23) which is defined by intersection with the third plane (H—H plane).

The third core member 521 has a fourth perpendicular section 521e which is defined by intersection with the fourth plane (E—E plane). The third core member 521 has a third horizontal section 521f which is defined by intersection with the third plane (H—H plane).

The fourth core member 540 has a fifth perpendicular section 540e which is defined by intersection with a fifth plane (plane indicated by the arrows A—A in FIG. 23) which is perpendicular to the first surface 102a. The fourth core member 540 has a fourth horizontal section (540f in FIG. 23) which is defined by intersection with the third plane (H—H plane).

The fifth core member 541 has a sixth perpendicular section 541e which is defined by intersection with the fifth plane (A—A plane). The fifth core member 541 has a fifth horizontal section 541f which is defined by intersection with the third plane (H—H plane).

In other words, the branch waveguide shown in FIGS. 22–24E comprises a substrate 501, straight waveguide (mixer) 560, second waveguide 520, third waveguide 521, fourth waveguide 540, and fifth waveguide 541.

The width of the first edge face 511c is the length of the first edge face 511c along the direction (direction of the width) perpendicular to both the direction of the normal to the substrate surface 501a (direction of the thickness), and the direction of the normal to the first edge face 511c (direction of the optical axis). The width of the first edge face 511c is greater than the distance between the second side 520c and the third side 521c. The width of the first edge face 511c is greater than the distance between the second side 520b and the third side 521a.

The width of the second waveguide 520 lowers toward the mixer 560. Accordingly, the area of the section 520e is greater than the area of the second edge face 520c.

The width of the third waveguide 521 lowers toward the mixer 560. Accordingly, the area of the section 521e is greater than the area of the third edge face 521c.

The width of the fourth waveguide 540 lowers toward the mixer 560. Accordingly, the area of the section 540e is greater than the area of the fifth edge face 540c.

The width of the fifth waveguide 541 lowers toward the mixer 560. Accordingly, the area of the section 521e is greater than the area of the sixth edge face 521c.

The first core member 560 is positioned so that the light input into the first core member 560 via the fourth waveguide 540 and fifth waveguide 541, is output from the optical branching device through the second waveguide 520 and third waveguide 521.

The directional coupler shown in FIG. 23 comprises, in the same manner as the Y-shaped device of the present embodiment, a core formed on a silicon substrate 501-that is, single mode waveguides 520, 521, 540, 541, and a multimode waveguide 560, and a cladding 502 with the core embedded therein.

To either terminal 511c of the multimode waveguide 560 there are connected the single mode waveguides 520, 521, while the single mode waveguides 540, 541 are connected to the other terminal 511d. The single mode waveguides 520, 521, 540, and 541 are located close at a space A, and are positioned symmetrically with respect to the center line (optical axis) of the multimode waveguide 560. Above described A is minimum distance between the second core member 520 and 521, or minimum distance between the second interface 520c and third interface 521c. The space between the single mode waveguides 520, 521 increases with distance from the first core member 560. The space between the single mode waveguides 540, 541 increases with distance from the first core member 560.

The single mode waveguides 520, 521 are identical to the branch waveguides 220, 221 of the Y-shaped device shown in FIG. 1. These waveguides comprise proximal ends of constant width from which tapering sections extend smoothly toward the multimode waveguide, and connect to single mode waveguides 520y, 521y with peripheral curvature radius R. The proximal ends 520x, 521x are bent waveguides with width W1, and curvature radius R. The widths of the terminals 520c, 521c of the single mode waveguides 520y, 521y at the side of the multimode waveguide 560 are W2.

Proximal ends 540x, 541y of constant width taper gently toward the multimode waveguide 569, and are connected to single mode waveguides 540y, 541y with peripheral curvature radius R. The proximal ends 540x, 541x are bent waveguides with width W1, and curvature radius R. The widths of the terminals 540c, 541c of the single mode waveguides 540y, 541y at the side of the multimode waveguide 560 are W2.

The waveguide widths of the proximal ends 520x, 521x, 540x and 541x (=W1) are set to meet the following relation:

$$(\mathrm{\%})\pi \leq V \leq (\mathrm{\%}) \ldots (1)$$

In this type directional coupler, the widths of the terminals 520c, 521c, 540c, 541c of the single mode waveguides 520, 521, 540, 541, which are branch waveguides, at the side of the multimode waveguide 560 are smaller than the widths (=w1) of the proximal ends 520x, 521x, 540x, 541x.

That is, a characteristic aspect resides in the fact that the widths W2 of the terminals 520c, 521c, 540c, 541c of the single mode waveguides 520, 521, 540, 541 is smaller than at the side of the multimode waveguide 560 are smaller than the widths W1 of the proximal ends 520x, 521x, 540x, 541x.

With this reduced widths, the directional coupler shown in FIG. 23 have shortened spaces between the centers of the single mode waveguides 520, 521, 540, 541 which contribute to establishment of favorable processing stability. Of course, the coupling efficiency of guided light at the branching section of this optical branching device is improved as compared with conventional ones. As a result, the loss of guided light resulting from branching or coupling with the directional coupler of the present embodiment is smaller than that experienced with the directional coupler shown in FIG. 27.

Additionally, in order to both ensure the significant effects of the reduced terminal widths which far overweigh the increased radiation loss, and maintain enough processing stability, the widths (W2) of the terminals 520c, 521c, 540c, 541c of the single mode waveguides 520, 521, 540, 541 are desired to be ½–⅘ the widths (=W1) of the proximal ends 520x, 521x, 540x, 541x. In short, $$(W1) \times (\mathrm{½}) \leq W2 \leq (W1) \times (\mathrm{⅘})$$

Next, an explanation will be made regarding a directional coupler according to one embodiment of the present invention.

Figure 32:
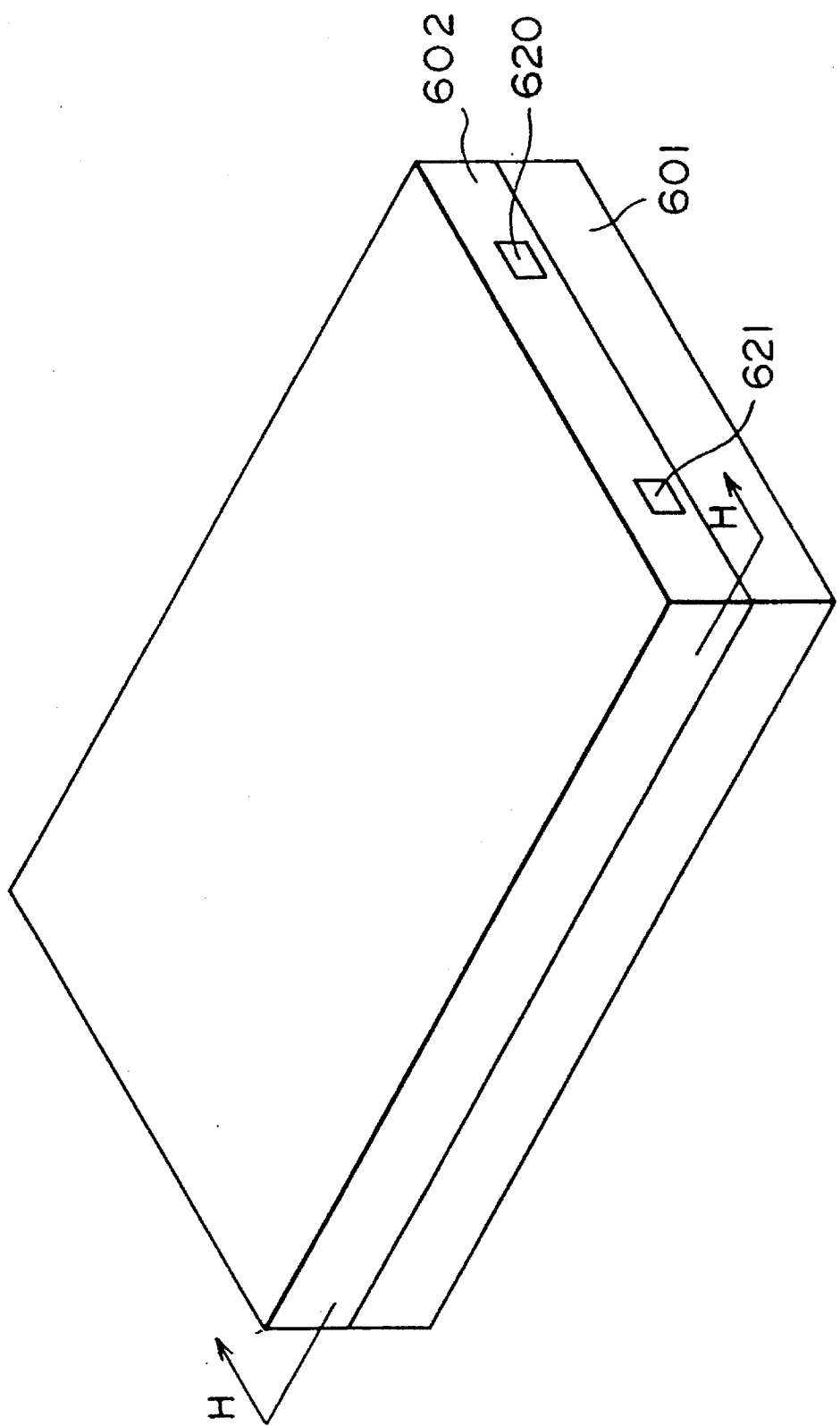
FIG. 32 is a perspective view of an directional coupler.
Figure 34A:
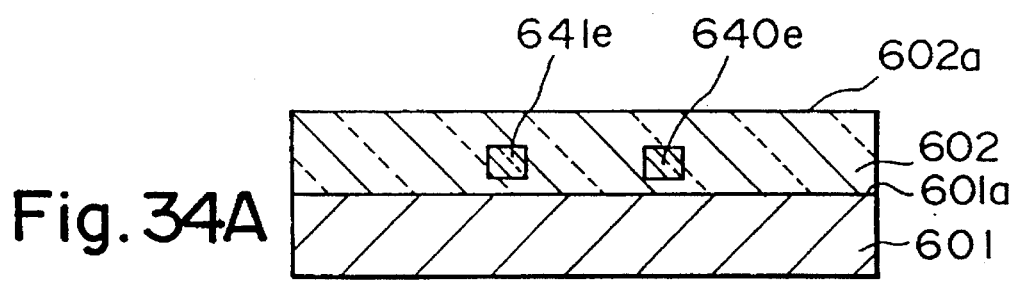
FIG. 34A is a section view of the device shown in FIG. 33, taken along the plane indicated by the arrows A—A in the drawing.
Figure 34B:
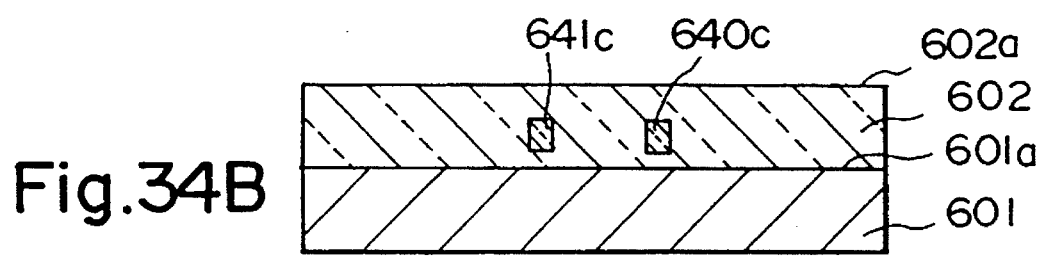
FIG. 34B is a section view of the device shown in FIG. 33, taken along the plane indicated by the arrows B—B in the drawing.

FIG. 32 is a perspective view of this directional coupler. FIG. 33 is a section view of the device shown in FIG. 32, taken along the plane indicated by the arrows H—H in FIG. 32. FIG. 34A is a section view of the device shown in FIG. 33, taken along the plane indicated by the arrows A—A in the drawing. FIG. 34B is a section view of the device shown in FIG. 33, taken along the plane indicated by the arrows B—B in the drawing.

Figure 34C:
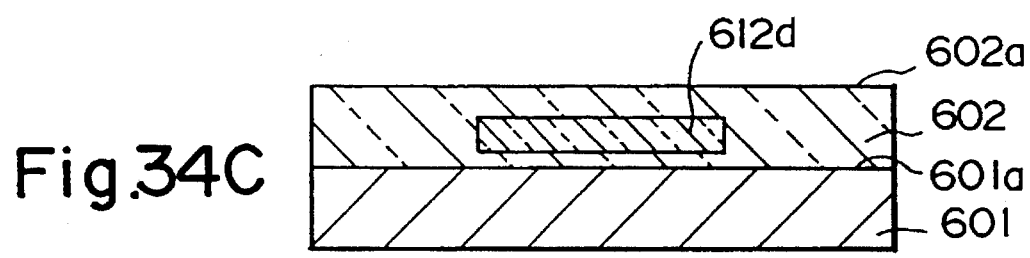
FIG. 34C is a section view of the device shown in FIG. 33, taken along the plane indicated by the arrows C—C in the drawing.
Figure 34D:
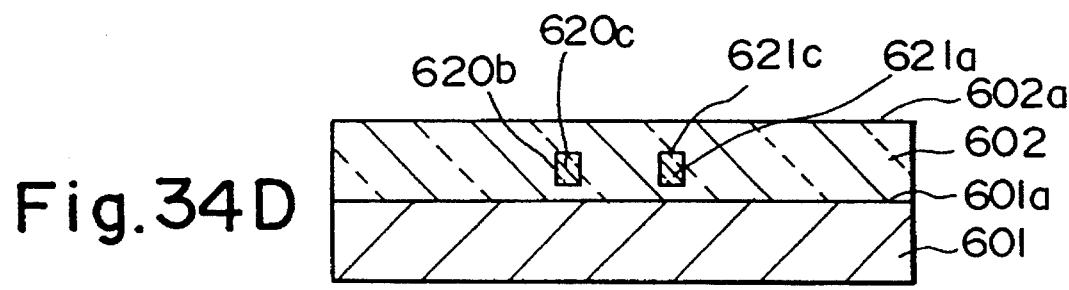
FIG. 34D is a section view of the device shown in FIG. 33, taken along the plane indicated by the arrows D—D in the drawing.
Figure 34E:
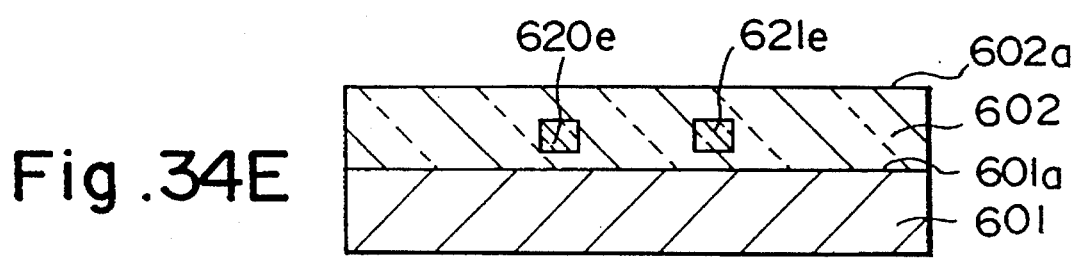
FIG. 34E is a section view of the device shown in FIG. 33, taken along the plane indicated by the arrows E—E in the drawing.

FIG. 34C is a section view of the device shown in FIG. 33, taken along the plane indicated by the arrows C—C in the drawing. FIG. 34D is a section view of the device shown in FIG. 33, taken along the plane indicated by the arrows D—D in the drawing. FIG. 34E is a section view of the device shown in FIG. 33, taken along the plane indicated by the arrows E—E in the drawing.

The directional coupler according to the present embodiment comprises a silicon substrate 601, a cladding member 602 formed on the supporting substrate 601, a first core member 660, a second core member (second waveguide) 620, and a third core member (third waveguide) 621.

The first core member 660 is embedded in the cladding member 602. The second core member 620 is embedded in the cladding member 602. The second core member 620 comprises a second edge face 620c which faces the first edge face 611c of the first core member 660 at a given space (B). The third core member 621 is also embedded in the cladding member 602. The third core member 621 comprises a third edge face 621c which faces the first edge face 611c of the first core member 660.

The first core member 660 comprises a fourth edge face 611d facing the first edge face 611c.

The fourth core member 640 is embedded in the cladding member 602. The fourth core member 640 comprises a fifth edge face facing the fourth edge face 611c of the first core member 660 at a given space.

Also the fifth core member 641 is embedded in the cladding member 602. The fifth core member 641 comprises a sixth edge face facing the fourth edge face 611d of the first core member 660 at a given space (B).

The cladding member 602 (cladding 602, cladding layer 602) has a first surface 602a. The first surface 602a is parallel to the main surface 601a of the substrate 601. "Direction of the width" is defined to be the direction perpendicular to both the direction perpendicular to the first surface 602a, and to the direction of light propagation. "Direction of the thickness" is defined to be the direction perpendicular to the first surface 602a. The first core member 660 has given width and thickness.

The first core member 660 has a first perpendicular section 612d which is defined by intersection with a first plane (plane indicated by the arrows C—C in FIG. 33) which is perpendicular to the first surface 602a. The width of the first perpendicular section 612d is constant.

The first core member 660 has a first horizontal section (660a in FIG. 33) which is defined by intersection with a third plane (plane indicated the arrows H—H in FIG. 32) parallel to the first surface 602a.

The second core member 620 has a third perpendicular section 620e which is defined by intersection with a fourth plane (plane indicated by the arrows E—E in FIG. 33) which is perpendicular to the first surface 602a. The second core member 620 has a second horizontal section (620f in FIG. 33) which is defined by intersection with the third plane (H—H plane).

The third core member 621 has a fourth perpendicular section 621e which is defined by intersection with the fourth plane (E—E plane). The third core member 621 has a third horizontal section 621f which is defined by intersection with the third plane (H—H plane).

The fourth core member 640 has a fifth perpendicular section 640e which is defined by intersection with a fifth plane (plane indicated by the arrows A—A in FIG. 33) which is perpendicular to the first surface 602a. The fourth core member 640 has a fourth horizontal section (640f in FIG. 33) which is defined by intersection with the third plane (H—H plane).

The fifth core member 641 has a sixth perpendicular section 641e which is defined by intersection with the fifth plane (A—A plane). The fifth core member 641 has a fifth horizontal section 641f which is defined by intersection with the third plane (H—H plane).

In other words, the branch waveguide shown in FIGS. 32–34 comprises a substrate 601, straight waveguide (mixer) 660, second waveguide 620, third waveguide 621, fourth waveguide 640, and fifth waveguide 641.

The width of the first edge face 611c is the length of the first edge face 611c along the direction (direction of the width) perpendicular to both the direction of the normal to the substrate surface 601a (direction of the thickness), and the direction of the normal to the first edge face 611c (direction of the optical axis). The width of the first edge face 611c is greater than the distance between the second side 620c and the third side 521c. The width of the first edge face 611c is greater than the distance between the second side 620b and the third side 621a.

The width of the second waveguide 620 lowers toward the mixer 660. Accordingly, the area of the section 620e is smaller than the area of the second edge face 620c.

The width of the third waveguide 621 lowers toward the mixer 660. Accordingly, the area of the section 621e is greater than the area of the third edge face 621c.

The width of the fourth waveguide 640 lowers toward the mixer 660. Accordingly, the area of the section 640e is greater than the area of the fifth edge face 640c.

The width of the fifth waveguide 641 lowers toward the mixer 660. Accordingly, the area of the section 641e is greater than the area of the sixth edge face 641c.

The first core member 660 is positioned so that the light input into the first core member 660 via the fourth waveguide 640 and fifth waveguide 641, is output from the optical branching device through the second waveguide 620 and third waveguide 621.

The directional coupler shown in FIG. 33 comprises, in the same manner as the Y-shaped device of the present embodiment, a core formed on a silicon substrate 601—that is, single mode waveguides 620, 621, 640, 641, and a multimode waveguide 660, and a cladding 602 with the core embedded therein.

To either terminal 611c of the multimode waveguide 660 there are connected the single mode waveguides 620, 621, while the single mode waveguides 640, 641 are connected to the other terminal 611d. The single mode waveguides 620, 621, 640, and 641 are located close at a space A, and are positioned symmetrically with respect to the center line (optical axis OP660) of the multimode waveguide 660. Above described A is minimum distance between second core member 620 and third core member 621, or minimum distance between second edge face 620c and third edge face 621c. The space between the single mode waveguides 620, 621 increases with distance from the first core member 660. The space between the single mode waveguides 640, 641 increases with distance from the first core member 660.

This directional coupler differs from the optical coupling device shown in FIG. 23 only in that the edge faces 640c, 641c of the single mode waveguides 640, 641 face the edge face 660d of the multimode waveguide 660 at a given space (B), and the edge faces 620c, 621c of the single mode waveguides 620, 621 face the edge face 660c of the multimode waveguide 660 at a given space (B).

For a more detailed explanation about the structure shown in FIG. 23, the edge faces 640c, 641c of the single mode waveguides 640, 641 face the edge face 660d of the multimode waveguide 660 at space B. This spacing is the same for the single mode waveguides 620, 621. To acquire excellent processing stability and enough lowered loss, the spaces B between the edge faces 640c, 641c of the single mode waveguides 640, 641, or the edge faces 620c, 621c of the single mode waveguides 620, 621 and the edge face 660d or 660c of the multimode waveguide 660 are all preferred to be on the order of 2–8 μm.

In the branching structure of the directional coupler shown in FIG. 33, the single mode waveguides 620, 621, 640 641 are separate from the multimode waveguide 660. Therefore, this coupler is free from sections susceptible to rounding during the preparation, such as the gap section 1080 in the vicinity of the branching section of the directional coupler shown in FIG. 27. Accordingly, the device shown in FIG. 33 has more excellent processing stability than the device shown in FIG. 27, and my be prepared in high yields on a large scale more suitably for the construction of a large scale communication system, etc.

To verify the effects of the directional coupler shown in FIG. 33 (Example 4), the present inventors prepared it for measurement of the light transmission characteristics. For comparison, also the directional coupler shown in FIG. 27 was prepared for measurement of the light transmission characteristics. The method for the preparation of these couplers was the same as that used for the devices noted above. The dimensions of the respective parts are represented as follows, using the reference characters employed in FIGS. 10 and 13.

A=4 μm
B=4 μm
W1=8 μm
R=50 mm (The above dimensions are common to the two types shown in FIGS. 33 and 27. )

On the other hand, the terminal widths (=W2) of the single mode waveguides 640, 641 and the single mode waveguides 620, 621, and the width Wm and the length Lm of the multimode waveguide 60 were various as follows: For the device shown in FIG. 33, W2=4 μm, Wm=18 μm, and Lm=1.5 mm.

For the device shown in FIG. 27, W2=W1=8 μm, Wm=20 μm, and Lm=1.8 mm.

In all the cases, the specific refractive index difference between the core and cladding was 0.3%, and the thickness of the waveguide was 8 μm. In view of the same branching structure of the device shown in FIG. 33 as of the device shown in FIG. 16, the branching structure of the device in FIG. 33 was sized as noted above on the basis of the sizes which were found to provide relatively small excess branch loss from the data for W2=4 μm which is represented in the graph in FIG. 19.

The measurement of light transmission characteristics, intended for determination of the branch ratio and insertion loss, was carried out with laser diode light at a wavelength of 1.55 μm which was input into and output from each of the directional couplers shown in FIG. 33 and FIG. 27, through single mode fiber. As a result, the branch ratios were found to be roughly the same in the two cases, and about 51:49, whereas the insertion loss of the device of FIG. 27 was 0.65 dB, and that of the device of FIG. 33 was 0.42 dB, demonstrating the superiority of the device of the present embodiment.

Since the branching structure of the device of the present embodiment is identical to that of the Y-shaped device in FIG. 16, it is believed that in the same manner as the Y-shaped device in FIG. 26, also the directional coupler according to the present invention produces only a small loss of light over a wide range of wavelengths of guided light, with a low level of variance of the loss depending on the change in wavelengths of guided light. In conclusion, also the directional coupler according to the present invention may be used suitably for the construction of an optical measurement system which sweeps light over a rather wide wavelength range.

The present invention is not limited to the embodiments described above, and may be modified in various ways. For example, so long as the structure where the terminal width of the single mode branch waveguide is smaller than the proximal width, is maintained, the composition of the waveguide type optical branching device, forms and dimensions of the respective parts thereof, etc. are not limited to those of the above-noted embodiments. In addition, the configuration of the waveguide type optical branching device is not limited to the embedded configuration of the present embodiments, and any other configuration including ridge type, loading type, etc. may be used.

Furthermore, the single mode branch waveguides need not be placed symmetrically with respect to the center line of the multimode waveguide. The present inventors believe that the same excellent processing stability and loss reduction as noted above may be accomplished even with asymmetrical optical branching devices.

Y-shaped devices and directional couplers were referred to as examples of optical coupling devices which further include star couplers, and all these devices are within the scope of the present invention so long as they have the branching structure characteristic of the present invention.

Furthermore, a plurality of the optical branching devices of the present invention may be combined to form a waveguide type device assembly by situating the output terminal of each waveguide so as to connect to the input terminal of the waveguide positioned directly downstream therefrom. With the resulting waveguide type device assembly, the respective constituent devices produce satisfactory effects in a cumulative manner, thereby allowing drastic suppression of the loss while keeping excellent processing stability, for the output of guided light which has been subjected to branching or coupling.

Another characteristic aspect of the present invention is in the reduced space between the centers of two single mode waveguides which is a fruit of provision of single mode waveguides with terminals less wide than the proximal ends, at the side of the multimode waveguide, and waveguide type devices with this characteristic structure fall within the scope of the present invention.

Figure 35:
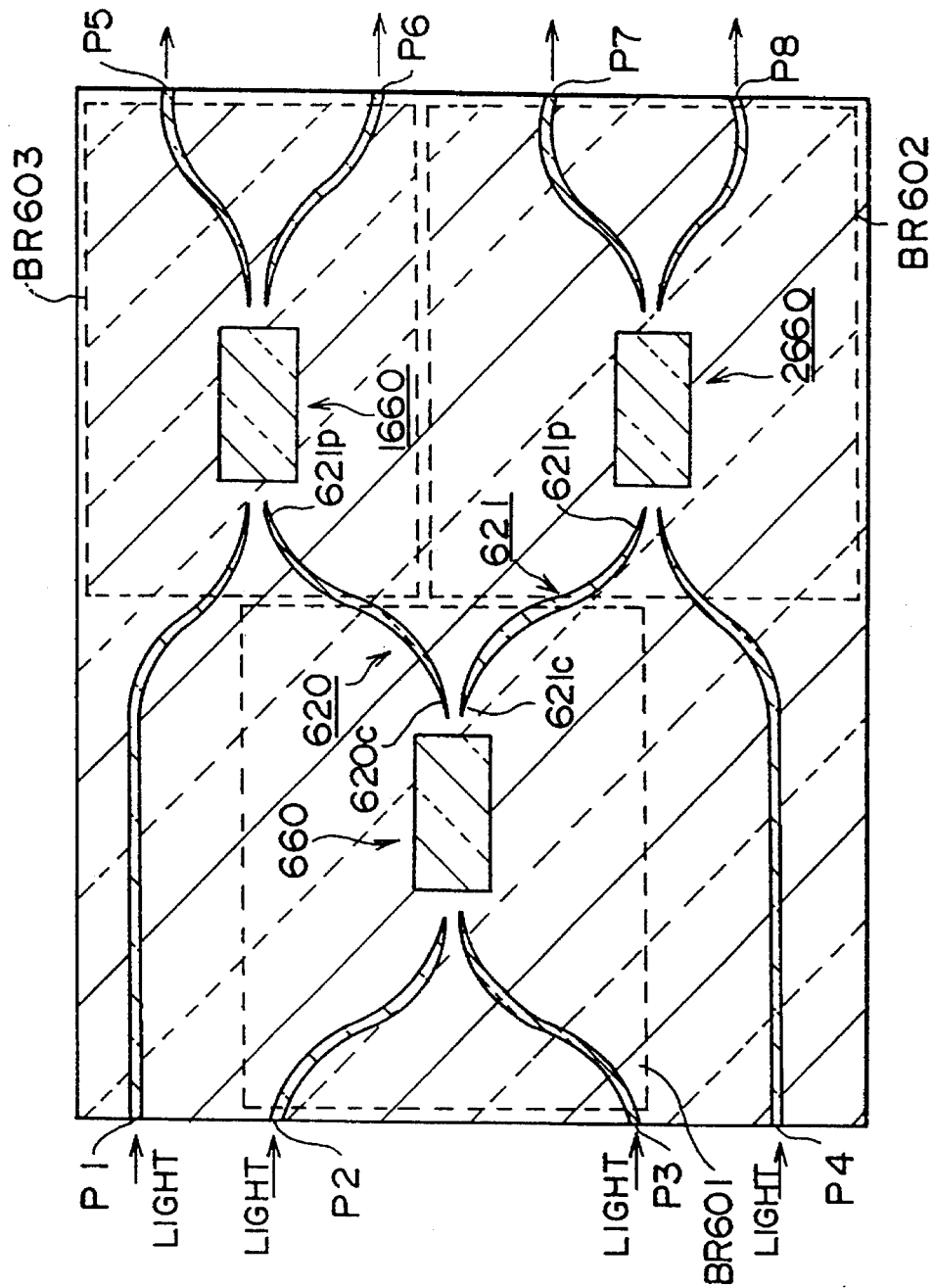
FIG. 35 is a section view of an optical component consisting of 3 connected optical branching devices of the type shown in FIG. 33.

FIG. 35 is an optical component comprising 3 connected optical branching devices of the type shown in FIG. 33. The optical branching devices are designated as BR601, BR602 and BR603, respectively.

This optical component is provided with a first optical mixer 660, an S-shaped waveguide 621 with a first end 621c and a second end 621p, an S-shaped waveguide 620 with a first end 620c and a second end 620p, a second optical mixer 1660, and a third optical mixer 2660.

The first end 621c faces the first mixer 660. The second end 621p faces the third mixer 2660. The first end 620c faces the first mixer 660. The second end 620p faces the second mixer 1660.

The beams of light input through the ports P1–P4 are coupled and output via ports P5–P8.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Application No. 5-273288 filed on Nov. 1, 1993 is hereby incorporated by reference.

What is claimed is:

1. An optical branching device comprising:

(a) a substrate;

(b) a cladding member disposed on said substrate;

(c) a first core member having an optical axis and an edge face embedded in said cladding member, said edge face being simultaneously perpendicular to the optical axis and an interface between said substrate and said cladding member; and (d) second and third core members embedded in said cladding member, said second and third core members separated from one another and each becoming gradually narrower toward said first core member.

2. An optical branching device according to claim 1, wherein each of said second and third core members are in contact with said edge face, and wherein said first core member has:

a tapered waveguide with a first end including said edge face; and a straight waveguide continued to a second end of said tapered waveguide.

3. An optical branching device according to claim 1, wherein each of said second and third core members are arranged apart from said edge face via a portion of said cladding member, and wherein said first core member has:

a tapered waveguide with a first end including said edge face; and a straight waveguide continued to a second end of said tapered waveguide.

4. An optical branching device according to claim 1, wherein each of said second and third core members are in contact with said edge face, and wherein said first core member has:

a wide straight waveguide including said edge face;

a tapered waveguide with a first end continued to said wide straight waveguide; and a straight waveguide continued to a second end of said tapered waveguide and narrower than said wide straight waveguide.

5. An optical branching device according to claim 1, wherein each of said second and third core members are in contact with said edge face, and wherein said first core member consists of a straight waveguide.

6. An optical branching device according to claim 5, further comprising fourth and fifth core members embedded in said cladding member.

7. An optical branching device according to claim 1, wherein each of said second and third core members are arranged apart from said edge face via a portion of said cladding member, and wherein said first core member consists of a straight waveguide.

8. An optical branching device according to claim 7, further comprising fourth and fifth core members embedded in said cladding member.

9. An optical branching device according to claim 1, wherein said first core member lowers the energy density of light to be input thereinto by diverging an electric field distribution of said light, and makes a wave front of said light parallel to said edge face.

10. An optical component comprising a plurality of optical branching devices, each optical branching device comprising:

(a) a substrate;
   (b) a cladding member disposed on said substrate;
   (c) a first core member having an optical axis and an edge face embedded in said cladding member, said edge face being simultaneously perpendicular to the optical axis and an interface between said substrate and said cladding member; and
   (d) second and third core members embedded in said cladding member, said second and third core members separated from one another and each becoming gradually narrower toward said first core member.

11. An optical branching device comprising:

(a) a substrate;
   (b) a cladding member disposed on said substrate;
   (c) a first core member having an optical axis and an edge face embedded in said cladding member, said edge face being simultaneously perpendicular to the optical axis and an interface between said substrate and said cladding member, and said first core member further comprising:
      (i) a wide straight waveguide including said edge face;
      (ii) a tapered waveguide with a first end continued to said wide straight waveguide; and
      (iii) a straight waveguide continued to a second end of said tapered waveguide and narrower than said wide straight waveguide; and
   (d) second and third core members embedded in said cladding member, said second and third core members separated from one another, arranged apart from said edge face via a portion of said cladding member, and each becoming gradually narrower toward said first core member.

* * * * *